US012159499B1

(12) United States Patent
Lemberger et al.

(10) Patent No.: US 12,159,499 B1
(45) Date of Patent: *Dec. 3, 2024

(54) GARAGE SECURITY AND CONVENIENCE FEATURES

(71) Applicant: Amazon Technologies, Inc., Seattle, WA (US)

(72) Inventors: Elliott Lemberger, Santa Monica, CA (US); John Modestine, Redondo Beach, CA (US); Mark D Siminoff, Mountain View, CA (US); Peter Gerstberger, Laguna, CA (US); Spiro Sacre, Los Angeles, CA (US); Christopher Loew, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,239

(22) Filed: Jul. 11, 2023

Related U.S. Application Data

(63) Continuation of application No. 17/102,376, filed on Nov. 23, 2020, now Pat. No. 11,741,766, which is a
(Continued)

(51) Int. Cl.
G06Q 30/06 (2023.01)
B60K 35/00 (2024.01)
(Continued)

(52) U.S. Cl.
CPC ......... G07C 9/00896 (2013.01); G06V 20/63 (2022.01); H04N 7/183 (2013.01); G07C 2009/00928 (2013.01)

(58) Field of Classification Search
CPC ...... G07C 9/00896; G07C 2009/00928; G07C 9/00571; G07C 9/0069; G07C 2209/64;
(Continued)

(56) References Cited

U.S. PATENT DOCUMENTS 6,448,894 B1    9/2002 Desai
7,193,644 B2    3/2007 Carter
(Continued)

OTHER PUBLICATIONS

Office Action for U.S. Appl. No. 17/102,376 mailed on Nov. 18, 2021, "Elliot Lemberger, Garage Security and Convenience Features", 17 pages.
(Continued)

Primary Examiner — Howard D Brown, Jr.
(74) Attorney, Agent, or Firm — Lee & Hayes, P.C.

(57) ABSTRACT

A garage door is controlled to open using an audio/video (A/V) recording and communication device. The device detects a vehicle within an area about the garage door and receives, using a camera, image data representative of an object associated with the vehicle. The device also compares the image data representative of the object associated with the vehicle with previously stored image data and identifies the object based on the comparing of the image data representative of the object with the previously stored image data. The device also authenticates an electronic device within the vehicle that is associated with the object by wirelessly communicating with the electronic device and determines, based at least in part on the authenticating of the electronic device within the vehicle, that the vehicle is an authorized vehicle. The device also transmits an actuation command to the garage door to cause the garage door to open.

20 Claims, 26 Drawing Sheets

Related U.S. Application Data continuation of application No. 16/124,859, filed on Sep. 7, 2018, now Pat. No. 10,846,960.

(51) Int. Cl.
*E05F 15/73* (2015.01)
*G06V 20/62* (2022.01)
*G07C 9/00* (2020.01)
*H04N 7/18* (2006.01)

(58) Field of Classification Search
CPC ............ G06K 9/3258; G06K 9/00288; G06K 9/00771; H04N 7/183; H04N 7/186
See application file for complete search history.

(56) References Cited

U.S. PATENT DOCUMENTS

| | | |
|---|---|---|
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,879,466 B1 | 1/2018 | Yu |
| 10,573,106 B1 * | 2/2020 | Brady ................ G06V 40/1365 |
| 10,846,960 B1 * | 11/2020 | Lemberger ........... G06V 40/172 |
| 2006/0190836 A1 * | 8/2006 | Ling Su .............. G06F 3/04883 715/773 |
| 2011/0130134 A1 * | 6/2011 | Van Rysselberghe ....................... A47G 29/141 455/422.1 |
| 2015/0277735 A1 * | 10/2015 | Gibson .................... H04R 5/00 715/716 |
| 2015/0302737 A1 | 10/2015 | Geerlings et al. |
| 2016/0288647 A1 * | 10/2016 | Baur ........................ B60Q 9/00 |
| 2016/0337614 A1 * | 11/2016 | Siminoff .............. H04M 11/025 |
| 2017/0236193 A1 * | 8/2017 | Zundel .................... G06Q 20/20 705/16 |
| 2017/0280112 A1 * | 9/2017 | Siminoff ................. G06V 20/52 |
| 2018/0158265 A1 * | 6/2018 | Lyman ..................... G07C 9/20 |
| 2018/0245395 A1 | 8/2018 | Huggins et al. |
| 2019/0063140 A1 * | 2/2019 | Trundle ............. G07C 9/00571 |
| 2019/0325681 A1 * | 10/2019 | Bresson ................ E05F 15/681 |

OTHER PUBLICATIONS

Office Action for U.S. Appl. No. 17/102,376, mailed on Dec. 1, 2022, Lemberger, "Garage Security and Convenience Features", 22 pages.

Office Action for U.S. Appl. No. 17/102,376, mailed May 9, 2022, Lemberger, "Garage Security and Convenience Features", 21 pages.

* cited by examiner

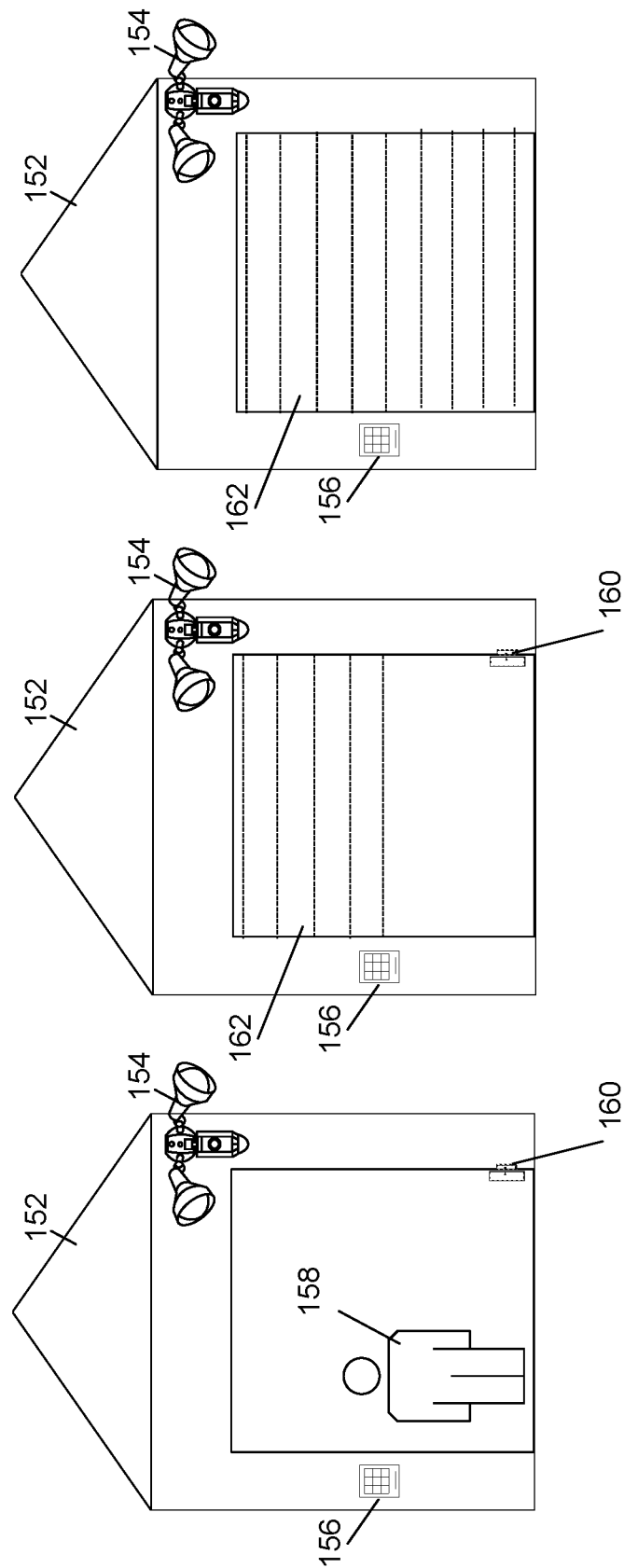

GARAGE SECURITY AND CONVENIENCE FEATURES

CROSS-REFERENCE TO RELATED APPLICATION

This application is a continuation of and claims priority to U.S. patent application Ser. No. 17/102,376, filed on Nov. 23, 2020, which claims priority to U.S. patent application Ser. No. 16/124,859, filed on Sep. 7, 2018, the entire contents of which is hereby incorporated by reference.

BACKGROUND

Home security is a concern for many homeowners and renters. Those seeking to protect or monitor their homes often wish to have video and audio communications with visitors, for example, those visiting an external door or entryway. Audio/video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present garage security and convenience features now will be discussed in detail with an emphasis on highlighting the advantageous features. These embodiments depict the novel and non-obvious garage security and convenience features shown in the accompanying drawings, which are for illustrative purposes only. These drawings include the following figures, in which like numerals indicate like parts:

FIGS. 1D-1F are schematic diagrams of examples of a front view of a garage with a garage door in an open state, a partially open state, and a closed state, respectively, according to various aspects of the present disclosure;

DETAILED DESCRIPTION

Figure 1A:
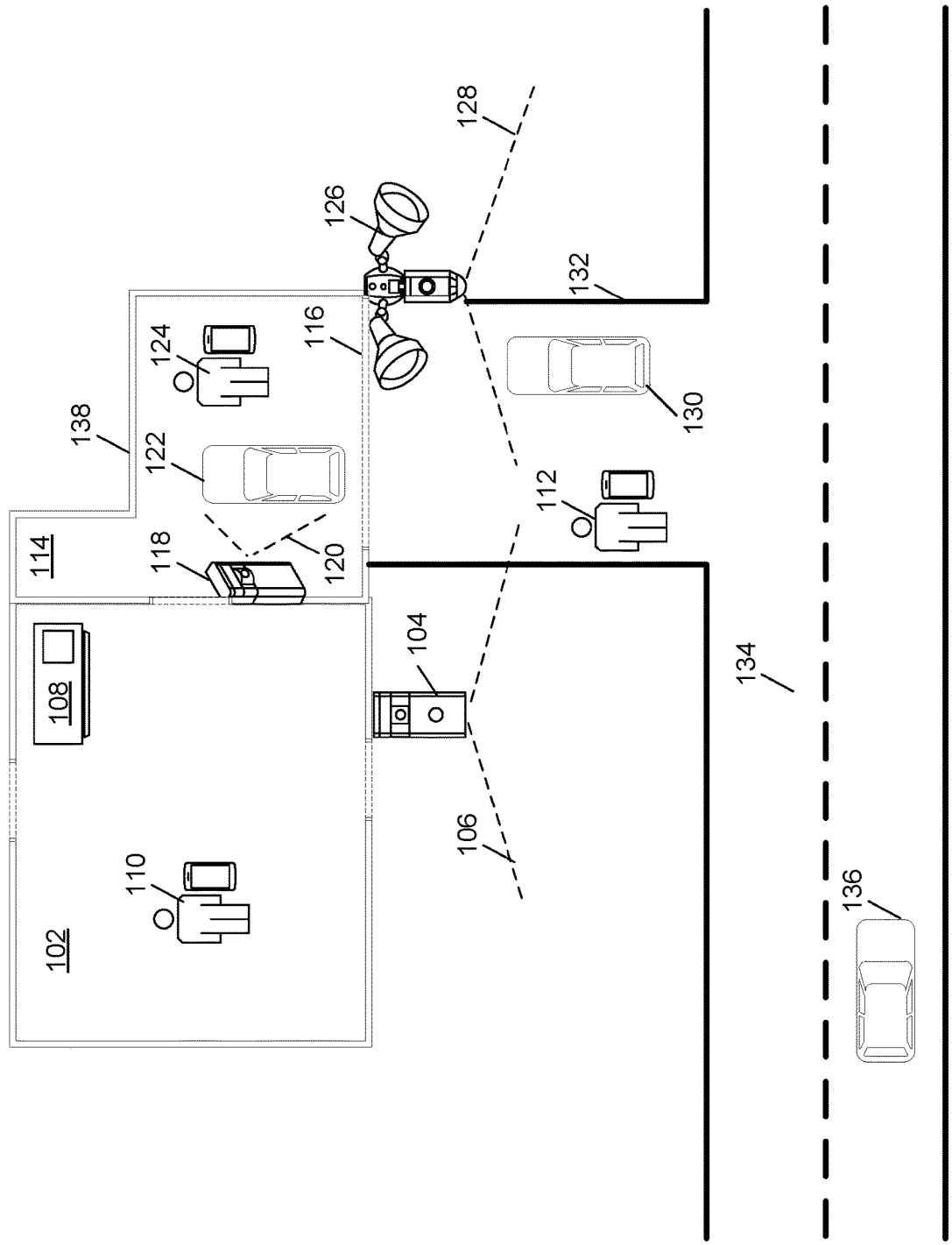
FIG. 1A is a schematic diagram of an example of A/V recording and communication devices used to monitor a garage and an area about a garage, according to various aspects of the present disclosure.

The various embodiments of the present garage security and convenience features have several features, no single one of which is solely responsible for their desirable attributes. Without limiting the scope of the present embodiments as expressed by the claims that follow, their more prominent features now will be discussed briefly. After considering this discussion, and particularly after reading the rest of the Detailed Description, one will understand how the features of the present embodiments provide the advantages described herein.

Access points to buildings can be more vulnerable to intruders than other parts of a home. For example, a door is more likely to be breached from a break-in than a wall. However, access points should also be easily accessible to those authorized to enter a building. For example, an authorized person may have a key to unlock a locked door and access a building. Accordingly, access points to a building should have features that balance providing convenient and easy access to authorized parties, while also providing security features that help prevent access to a building by unauthorized parties. Embodiments of the present disclosure provide convenient yet safe access to a building and are described herein. For example, various embodiments described herein relate to accessing a garage through a garage door in safe and convenient ways.

In an example embodiment, an A/V recording and communication device is attached to the outside of a garage, such that a field of view of the A/V recording and communication device includes an area about the garage (e.g., in front of, around, near, next to). The area about the garage may include a driveway leading to the garage and the garage's garage door. Thus, when a vehicle is approaching the garage or is otherwise in the driveway, the vehicle will be in the field of view of the A/V recording and communication device. The A/V recording and communication device captures image data. From this image data, the A/V recording and communication device or another component of the system detects that a vehicle is approaching and/or present. The system may also determine whether the vehicle is authorized to access the garage. Image data may be, for example, captured by a camera. Such image data is not limited to images captured by visible light cameras. Image data may, for example, be captured by night vision cameras, infrared cameras, motion sensors, depth sensors, and/or by any other type of sensor or camera as described herein.

The determination whether the vehicle is authorized to access the garage may be made in various ways. For example, the image data may be analyzed by the A/V recording and communication device or another component of the system to identify the vehicle. For example, identification of the vehicle may include a determination of a type of the vehicle (including year, make, and/or model), a color of vehicle, a license plate number, a license plate state of issue, a license plate renewal date, custom features of a vehicle, any other aspect of a vehicle that may be determined from images captured of a vehicle by the A/V recording and communication device, or any combination thereof. If a vehicle is detected approaching a garage and that vehicle has attributes that match the known attributes of an authorized vehicle, then an actuation command is transmitted to an actuator of the garage door to open it. In another example, a computing device in a vehicle may be able to communicate with the A/V recording and communication device. In this way, the vehicle computing device communicates authorization information to the A/V recording and communication device. If the A/V recording and communication device recognizes the authorization information, then the actuation command is transmitted to the actuator of the garage door to open the garage door.

In another example embodiment, the A/V recording and communication device is used to determine when a garage door should be closed. For example, the A/V recording and communication device may determine from image data that a vehicle has left the garage and the area about the garage (e.g., the driveway). Once the vehicle is gone, if the garage door is still open, an actuation command is transmitted to the actuator of the garage door to close the garage door.

Various embodiments are described herein for improving the convenience of accessing a building and improving the security in and around the building, including access points of a building (e.g., a garage door). For example, a garage may have an A/V recording and communication device attached to the outside, such that a field of view of the A/V recording and communication device includes an area about the garage. The area about the garage may include a driveway leading to the garage and the garage's garage door. Thus, when a vehicle is approaching the garage or is otherwise in the driveway, the vehicle will be in the field of view of the A/V recording and communication device. The A/V recording and communication device captures image data. Based on the captured image data, the A/V recording and communication device or another component of the system determines that the vehicle is approaching the garage or is otherwise in the driveway. This image data is used to determine whether the vehicle is authorized to access the garage. If the vehicle is authorized to access the garage, an actuation command to open the garage door is transmitted.

In various embodiments, other methods for determining that a vehicle is approaching a garage may be used instead of or in addition to using the image data captured by the A/V recording and communication device. For example, geolocation may be used to determine the location of an authorized vehicle. A vehicle electronic device may be equipped with a geolocation module (e.g., a global positioning system (GPS) unit) so that a specific vehicle's location may be determined. Other client devices may also have a geolocation module. These various client devices may determine their geolocation using satellite-based positioning system (e.g., Global Positioning System, Global Navigation Satellite System, BeiDou, Galileo, etc.), a Wi-Fi positioning system (WFPS), or an Internet Protocol (IP) based geolocation lookup service, among other possible geolocation determination techniques. The location of a vehicle is therefore be used to determine if a vehicle is approaching a particular garage. Geolocation of a vehicle and the A/V recording and communication device may also be used in combination to determine whether a vehicle is approaching a garage and determine whether that vehicle is authorized to enter the garage. For example, the A/V recording and communication device may recognize that a vehicle is approaching a garage in a driveway. The A/V recording and communication device or another component of the system determines, using geolocation, whether any vehicles authorized to enter the garage are in the general location of the garage. If so, the vehicle is authorized to enter the garage, and an actuation command may be transmitted to open the garage door.

In other embodiments, client devices associated with an authorized vehicle or client/user may communicate authorization information so that the garage will be opened. Such communications may occur wirelessly (e.g., through near field communications (NFC), Bluetooth Low Energy (BLE), radio-frequency identification (RFID), or other types of wireless communications devices). In this way, a client device communicates wirelessly that it is authorized to enter a garage and cause an actuation command to be transmitted to open a garage door. Such communication methods may also be used, alone or in combination with identification of a vehicle from image data captured by an A/V recording and communication device, to determine the presence of a vehicle or person in an area about a garage for which the garage door may be opened.

The A/V recording and communication device may also be used to determine when a garage door should be closed. For example, the A/V recording and communication device determines from image data that a vehicle has left the garage and the area about the garage (e.g., the driveway). Once the vehicle is gone, if the garage door is still open, an actuation command may be transmitted to the actuator of the garage door to close the garage door. Additionally, wireless communication devices may be used in addition to or instead of image data from an A/V recording and communication device to determine that a vehicle has left a garage.

In some implementations, an authorized client device may also be used to generate or send scannable codes that allow a visitor to access a garage. For example, a scannable visual code, such as a QR code, may be generated or sent to a visitor to provide limited access to a garage for that visitor. The visitor may receive or retrieve the scannable visual code on an electronic device, then scan the code at a specialized scanner at the garage to allow access. In some implementations, the scannable code may be presented to a camera of an A/V recording and communication device. The scannable code may then be determined based on image data captured by the A/V recording and communication device. In some implementations, a visitor's electronic device may be equipped with wireless communication capabilities. For example, a smart phone or other device may have BLE, NFC, RFID, or other wireless communication capabilities. In such an embodiment, the scannable code may be wirelessly communicated rather than via scanning a visual code such as a QR code. These scannable codes may give a visitor limited access to the garage. For example, the scannable code may permit a visitor to access the garage a predetermined number of times. In another example, the scannable code may permit a visitor to access the garage during a predetermined amount of time, such as within a certain amount of time from when the visitor receives the scannable code or in a certain predetermined time window. The parameters of the limited access may be set by the authorized party that generated or sent the scannable code.

An A/V recording and communication device in a garage may have a field of view such that objects in a garage may be identified from image data captured by the A/V recording and communication device. Such objects may include vehicles, boxes, power tools, appliances, lawn mowers, skis, or any other object. Accordingly, the A/V recording and communication device may be used over time to track when objects in the garage are moved and record images or video of such events. In some implementations, the system may determine whether an authorized party is present when the object is moved. If an authorized party is not present when the A/V recording and communication device detects movement within the garage of a tracked object (or otherwise detects movement), the A/V recording and communication device may capture video and/or audio of the movement. In this way, authorized parties may be alerted to the movement in real time and/or review images and video of the movement at a later time to determine what happened in the garage. Since objects in the garage may be identified, the system may also keep an inventory of what is stored in the garage. When an object is removed from the garage, the inventory may reflect that the item is no longer there. Such an inventory may be checked by an authorized party when they are looking for an object to determine if it is still in the garage.

The image data captured by the A/V recording and communication device may also be used to assist a party in parking a vehicle (e.g., cars, trucks, mowers, all-terrain vehicles, snowmobiles, farm equipment) inside a garage. For example, the A/V recording and communication device may monitor the location of a car as it pulls into the garage. As the car pulls in, the A/V recording and communication device may determine whether the car is fully in the garage so that the garage door may be closed. If it is not, an audio message may be broadcast by the A/V recording and communication device or transmitted to a speaker in the car to advise the driver that the car is not completely in the garage (e.g., "Please pull forward, the vehicle is not clear of the garage door."). The A/V recording and communication device may also monitor the vehicle to ensure that the vehicle does not hit another object or vehicle in the garage or a wall of the garage. For example, the A/V recording and communication device may broadcast or transmit an audio message indicating that the car is getting close to a wall (e.g., "Be careful, you are close to the wall."). In another implementation, the A/V recording and communication device may be used to make sure objects and vehicles are stored in a predesignated location within the garage. Some people store many things in their garage, and their vehicles and objects may not fit (or may not fit well to allow access to everything) if things are not arranged within the garage properly. The A/V recording and communication device may be used to ensure that things are placed where they are supposed to be. For example, if someone leaves a lawn mower in a space where a car is supposed to be stored, an audio message may be broadcast by the A/V recording and communication device or transmitted to another device that the lawn mower should be moved to a different location within the garage.

The remaining detailed description describes the present embodiments with reference to the drawings. In the drawings, reference numbers label elements of the present embodiments. These reference numbers are reproduced below in connection with the discussion of the corresponding drawing features.

FIG. 1A is a schematic diagram of an example of A/V recording and communication devices used to monitor a garage 114 and an area about a garage, according to various aspects of the present disclosure. FIG. 1A shows a building 138 from a top view. The building 138 includes a living area 102 and the garage 114. The garage 114 has an opening 116 where a garage door may open and close, allowing ingress and egress to and from the garage 114 for vehicles, people, animals, objects, etc.

A driveway 132 provides a path into the garage 114 and to a road 134. A first car 122 is in the garage 114, a second car 130 is in the driveway 132, and a third car 136 is in the road 134. Each of the first car 122, the second car 130, and the third car 136 may include a client vehicle device, such as a client vehicle device 230 described herein and shown in at least FIGS. 2 and 6B. A person 112 with a client device is in the driveway 132, a person 124 with a client device is in the garage 114, and a person 110 with a client device is in the living area 102. The mobile client devices may be, for example, smartphones, laptops, or other computing devices such as the client devices 214 and 216 described herein and shown in at least FIGS. 2 and 6A. A smart-home hub device 108 is in the living area 102. An example of the smart-home hub device 108 may be, for example, a smart-home hub device such as the smart-home hub device 202 described herein and shown in at least FIGS. 2 and 7.

Attached in and on the building 138 are multiple A/V recording and communication devices. A security camera 118 is located in the garage 114, a light camera 126 (e.g., a floodlight camera, a spotlight camera, etc.) is located on the outside of the building 138 on the garage 114, and a video doorbell 104 (e.g., a wall powered and/or battery powered video doorbell) is located at a front door of the living area 102 of the building 138. Each of the security camera 118, the light camera 126, and the video doorbell 104 are A/V recording and communication devices as described herein, such as the A/V recording and communication devices 210 shown in FIGS. 2-4 or any other devices capable of recording audio data and/or image data. In various embodiments, those devices may be interchanged, and there may be more, less, and/or different A/V recording and communication devices than are shown in FIG. 1A.

The light camera 126 has a field of view 128 in which a camera of the light camera 126 may capture image data. That image data may be still frames of image data, or may be a plurality of frames of image data such as a video. In FIG. 1A, the vehicle 130 and the person 112 are in the field of view 128 of the light camera 126. As described herein, the vehicle 130 may be identified based on image data captured by the light camera 126. After identifying the vehicle 130, the light camera 126 (and/or another device in the system that is in communication with the light camera 126) may determine whether to change the state of the garage door of the garage 114 (e.g., open or close the garage door). For example, if the vehicle 130 is pulling into the driveway 132, the garage door may be opened so the vehicle 130 may pull through the opening 116 of the garage 114. If the vehicle 130 is pulling out of the driveway 132, the garage door may be closed. If the vehicle 130 is parked or stationary, the garage door may remain unchanged in its current state.

The person 112 is also in the driveway 132 and in the field of view of the light camera 126. The system may also take into account the presence of the person 112 when determining whether to change the state of the garage door. Image data captured by the light camera 126 may also be stored or sent to various devices to alert a client of what is happening in their driveway. For example, the system may determine, from image data captured by the light camera 126, that the vehicle 130 and/or the person 112 moved onto the driveway. In response, the system may save that image data or begin streaming that image data to a client device associated with the light camera 126 (e.g., the smart-home hub device 108, the client devices of the person 110 and/or 124, a client vehicle device). In this way, a client may see what is going on in their driveway. The system may be configured to store and/or stream movement of vehicles or people that are outside the driveway 132 as well (e.g., the vehicle 136 in the road 134). Alternatively, the system may be configured to ignore movement of vehicles and/or people outside the driveway 132 (e.g., the vehicle in the road 134).

The video doorbell 104 has a field of view 106. The field of view 106 of the video doorbell 104 also covers at least a portion of the driveway 132. Accordingly, image data captured by the video doorbell 104 may also be used to implement various garage safety and convenience features as described herein. For example, the image data captured by the video doorbell 104 and/or the light camera 126 may be used to identify vehicle information about the vehicle 130. The image data captured by the video doorbell 104 and/or the light camera 126 may also include information encoded into scannable visual codes, such as QR codes. For example, the person 112 may have a QR code displayed on their client device. The person 112 may then present the QR code to the video doorbell 104 and/or the light camera 126. The image data captured will then include the QR code, which is read to determine whether the garage door should be opened or closed for the person 112 as described herein. A level of certainty of identifying vehicle information (e.g., of the vehicle 130) may also be increased by capturing image data of a vehicle from more than one A/V recording and communication device (e.g., the video doorbell 104 and the light camera 126).

Inside the garage 114 is the security camera 118. A field of view 120 of the security camera 118 demonstrates that the security camera 118 may capture images data of what is in the garage 114, including the vehicle 122 and the person 124. The opening 116 is also in the field of view 120 of the security camera 118. In this way, image data captured by the security camera 118 may be used to determine if the garage door is open or closed, determine if anything or anyone is in the opening 116 when the garage door is open, and/or determine if anything or anyone is in the driveway 132 when the garage door is open.

The image data captured by the security camera 118 may also be used to determine other things. For example, the image data captured by the security camera 118 may be used to determine when to open the garage door. The person 124 may have come from the living area 102 and may get in the vehicle 122. Image data captured by the security camera 118 could show this behavior and indicate that the person wants to leave, thus an actuation command may be transmitted to open the garage door. Further examples for how image data may be used to determine when a garage door is opened are described herein, including with respect to FIG. 8 discussed below. The image data may also indicate that a car, such as the vehicle 122 is safely parked within the garage 114, and the garage door may therefore be closed. Further examples for how image data may be used to determine when a garage door is closed are described herein, including with respect to FIGS. 10 and 11 discussed below. The image data captured by the security camera 118 may also be used to provide instructions for parking a vehicle in the garage 114, such as the vehicle 122. Further examples for how image data may be used to provide instructions or take actions for placing an object or vehicle in the garage are described herein, including with respect to FIGS. 9 and 15 discussed below. The image data captured by the security camera 118 may also be used to determine how objects, vehicles, and/or people have moved in and out of the garage 114. Examples may include keeping an inventory of objects in a garage, alerting a client device of suspicious movement and/or a missing object in the garage, and/or recognize new objects being put in a garage. Further examples of how image data is used to track movement of people, objects, and vehicles move in a garage are described herein, including with respect to FIG. 12.

In the living area 102 of the building 138 is the person 110 and the smart-home hub device 108. The person 110 may be able to give voice commands to the smart-home hub device 108, such as instructing the garage door to be opened or closed. The smart-home hub device 108 is connected (either through a wired or wireless connection) to a controller of an actuator of the garage door. In this way, the person 110 may control the garage door from inside the living area 102. The person 110 may also control the garage door with their client device, which may transmit an actuation command to the controller of the actuator of the garage door. That actuation command may be routed through the smart-home hub device 108, a wireless network, a cellular network, and/or any other device. The actuation command may also be sent directly to the controller of the actuator of the garage door. The person 112 and the person 124 may similarly communicate with and/or control the garage door according to the various embodiments described herein.

Client devices (e.g., the client devices of the persons 110, 112, and/or 124), the smart-home hub device 108, the security camera 118, the video doorbell 104, the light camera, and client vehicle devices (e.g., client vehicle devices of the vehicles 122, 130, and/or 136) may all be wirelessly connected. Accordingly, functions described herein as occurring on a particular device may be performed on any one of the devices. For example, while image data of objects in the garage 114 is captured by the security camera 118, the smart-home hub device 108 may keep track of an inventory in the garage and determine if/when an alert should be sent to a client device about an object leaving the garage 114 or some other suspicious movement. Information may be also stored on a remote server or servers not shown that are in communication with any and/or all of the devices shown in FIG. 1A. Methods described herein may also be performed on a remote server or servers not shown that are in communication with any and/or all of the devices shown in FIG. 1A.

Figure 1C:
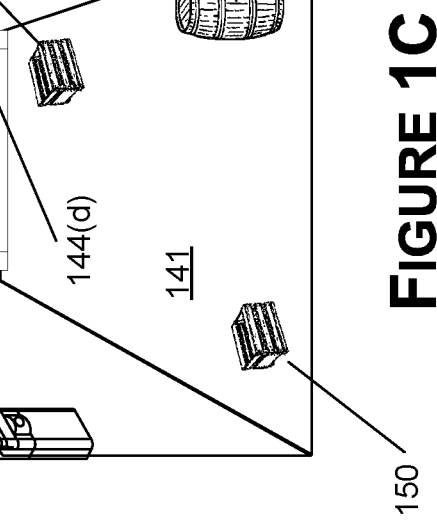
FIGS. 1B and 1C are schematic diagrams of examples of an A/V recording and communication device used to monitor the movement of objects in a room, according to various aspects of the present disclosure.
Figure 1B:
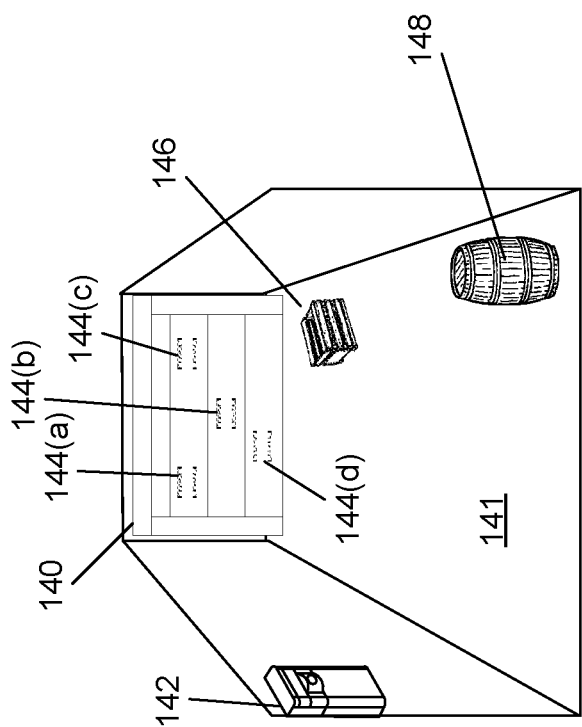

FIGS. 1B and 1C are schematic diagrams of examples of an A/V recording and communication device used to monitor the movement of objects in a room, according to various aspects of the present disclosure. Although objects are shown and discussed with respect to FIGS. 1B and 1C, people and vehicles may also be monitored using similar methods as described herein. FIGS. 1B and 1C shows a room with a security camera 142 mounted in the corner. In various embodiments, the security camera may be any type of A/V recording and communication device.

In various embodiments, more than one A/V recording and communication device may be mounted or otherwise used in a room. Multiple A/V recording and communication devices may be used to better capture image data of all portions of a room. Multiple A/V recording and communication devices may also be used to better identify objects and determine exact locations of objects in a room. For example, image data captured by an A/V recording and communication device may be used to determine depth data (e.g., how far away an object is from the A/V recording and communication device). By having multiple A/V recording and communication devices in the room, that depth data may be used to triangulate precise locations of objects in the room and/or better determine the shape of objects in the room. A/V recording and communication devices may also be used to watch different parts of a room. For example, if the room in FIGS. 1B and 1C had multiple cameras, one camera may be oriented such that the field of view captures shelves 140, while a second camera is oriented such that the field of view captures a floor 141 of the room. In this way, the A/V recording and communication devices may better keep inventory, track changes, watch for movement, etc. as described herein.

The security camera 142 is oriented such that its field of view captures the entire room of FIGS. 1B and 1C. The room in FIGS. 1B and 1C specifically is the inside of a garage. Although FIGS. 1B and 1C show a garage, the objects of any room may be monitored according to the various embodiments described herein. Additionally, a security camera may be able to monitor objects in outside areas (e.g., a yard, a parking lot, a sports field, a park, a driveway, farm land) or in structures that may not be classified as a room or garage (e.g., a storage shed lacking one or more walls). The field of view of the security camera 142 therefore captures the shelves 140 and any objects stored thereon, as well as the floor 141 of the garage and any objects stored thereon. The field of view of the security camera 142 also captures an opening opposite the shelves in the garage where a garage door may open and shut. In this way, the security camera 142 may also be used to determine what state the garage door is in (e.g., open, closed, somewhere in between). The security camera 142 may also be used to capture image data of anything outside the garage when the garage door is at least partially open. The image data captured by the security camera 142 may be used to perform any of the methods described herein.

FIG. 1B shows the inside of a garage at a first time. FIG. 1C shows an inside of a garage at a second time. In FIG. 1B, boxes 144(*a*)-(*d*) are stored on the shelves 140. A crate 146 and a barrel 148 are stored on the floor 141 of the garage. The presence of these objects are determined to be within the garage, and an inventory of the objects is stored in a memory of the security camera 142 or another device (e.g., the smart-home hub device 108 of FIG. 1, a server). The specific location of the objects within the garage is also determined from image data captured by the security camera 142. The inventory may then also reflect where in the garage each of the objects is located.

FIG. 1C shows the inside of a garage at a second time. Comparing FIG. 1C to FIG. 1B, the boxes 144(*a*), 144(*b*), and 144(*d*) remain on the shelves 140. However, the box 144(*c*) has been removed from the shelves 140. This may be determined from image data captured by the security camera 142 at the first time (FIG. 1B) and the second time (FIG. 1C). That removal may be indicated in the inventory kept of the objects in the garage. In addition, the security camera 142 may capture image data relating to the movement of the box 144(*c*) itself. For example, if the security camera 142 captures motion within the garage and/or movement of the box 144(*c*), image data of that movement is captured and stored in a memory of the security camera 142 and/or another device. The image data of the motion within the garage and/or movement of the box 144(*c*) may also be streamed to another device. For example, video of the motion and/or movement may be streamed to a client device or client vehicle device as described herein (e.g., one of the devices shown in 6A or 6B). In this way, if an item goes missing, an owner of the item may review or see the video to be alerted of a theft or be able to investigate the theft.

Comparing FIGS. 1B and 1C, the box 144(*d*) has been moved. Although the box 144(*d*) was not taken out of the garage, the security camera 142 still captures image data of the movement of the box 144(*d*). Similar to the movement of the box 144(*c*), the image data captured of the movement of the box 144(*d*) may be stored in the memory of an electronic device and/or may be streamed to an electronic device. Additionally, the inventory of the objects within the garage is adjusted to reflect the new location of the box 144(*d*). For example, a two or three-dimensional grid may be used to identify locations of objects on a shelving unit, on the floor, or anywhere else an object may be located. The coordinates indicating the location of the box 144(*d*) within the garage according to the grid system are updated after the box 144(*d*) moves from its location in FIG. 1B to a new location in FIG. 1C.

Similar to the boxes 144(*a*) and 144(*b*), the crate 146 and the barrel 148 on the floor 141 do not move between the first time reflected in FIG. 1B and the second time reflected in FIG. 1C. Accordingly, the inventory regarding the crate 146 and the barrel 148 would not be changed based on image data captured by the security camera 142 from the first time to the second time. However, a crate 150 has been added to the floor 141 in the time between FIGS. 1B and 1C. As with the movement of the boxes 144(*c*) and 144(*d*), the security camera 142 captures movement relating to the crate 150 being placed on the floor 141. That image data may be stored and/or streamed to an electronic device. The inventory kept by the system is also updated to reflect that the new crate 150 has been added to the garage, and the specific location/coordinates of the crate 150 within the garage may also be indicated in the inventory.

The image data from the security camera 142 may also be used for other purposes. For example, the system may determine that the crate 150 has been placed where a vehicle would normally park. In response to this determination, an alert (e.g., a text message, an email) may be sent to a client device, client vehicle device, or smart-home hub device that the crate 150 is in the way of parking a vehicle in the garage. An audio message may also be played alerting a person that the crate 150 should not be placed in that location on the floor. For example, the security camera 142 may include a speaker through which the audio message may be played (e.g., "Please move the crate to the shelving unit or place it near the opposite wall."). The audio message may also be transmitted to and played by another device, such as a client vehicle device (e.g., "Warning, there is an object obstructing the parking place in your garage."), a smart-home hub device (e.g., "An object in the garage should be moved before the driver of your vehicle returns home."), or any other electronic device.

A system may make a determination from image data whether the movement (particularly when objects are removed from the garage) of an object is authorized. If the movement of an object is not authorized, alerts may be sent to a client device and/or client vehicle device. The system may incorporate location information of client devices and/or client vehicle devices to determine whether object movement is authorized or not. For example, if a client device is located in the garage when an object is taken out of the garage, the movement of that object may be classified as authorized. If a client device is located more than a predetermined distance from the garage (e.g., 30 meters, 50 meters, 100 meters, 500 meters, 1 kilometer, 5 kilometers), the movement of the object may be classified as unauthorized.

The time of day may also be incorporated into a determination of whether the movement of an object is authorized. For example, if an object is moved during a predetermined time of day (e.g., when people are likely to be asleep between 11 PM and 7 AM), the movement of the object may be classified as unauthorized. A client may also set an away or vacation status, such that any movement of objects during that time is classified as unauthorized. Such a setting may be recurring or a one-time setting. For example, if a person is away at work each day from 8:30 AM to 6 PM, the system is configured by the client to classify any movement of objects in the garage during that time of day (on a recurring basis) to be unauthorized. In another example, a client may input information that they will be on vacation for the next 7 days, and that any movement of objects in the garage for those 7 days (a one-time setting) should be classified as unauthorized. A flexible recurring setting may also be used. For example, a client may set the system to monitor the garage and classify movement as unauthorized while they are at work during the day. However, the client may not go to work and/or arrive home at exactly the same time each day. Image data captured by the security camera 142 (e.g., showing the client's vehicle leaving the garage) and/or location data associated with a client device and/or client vehicle device may be used to determine that a client has left the house in the morning regardless of the specific time at which the client left the house. Once it is determined that the client has left the house, any movement in the garage may be classified as unauthorized. Similarly, the location data of the client device and/or client vehicle device and/or image data captured by the security camera 142 (e.g., showing the client's vehicle arriving back at the garage) may be used to stop considering any movement of objects within the garage to be unauthorized. An example method for monitoring objects in a garage is further described below and illustrated with respect to FIG. 12.

FIGS. 1D-1F are schematic diagrams of examples of a front view of a garage 152 with a garage door 162 in an open state, a partially open state, and a closed state, respectively, according to various aspects of the present disclosure. A garage 152 is shown in FIGS. 1D-1F. In FIG. 1D, the garage is open and a person 158 is standing in the opening of the garage 152. Mounted on the garage is a light camera 154. The light camera 154 may be used as described herein to capture image data that may be used at least in part to determine when the garage door 162 should be opened and/or closed. In FIG. 1E, the garage door 162 is shown in an intermediate state, where the garage door 162 is not fully closed but not fully open. In various embodiments, the garage door 162 as shown in FIG. 1E may be closing, opening, or may be suspended in the intermediate state shown.

The garage 152 also has a keypad 156. The keypad 156 is mounted on the outside of the garage 152, such that the keypad 156 may be accessed by a person outside of the garage 152 even if the garage door 162 is closed (e.g., as shown in FIG. 1F). The keypad 156 has buttons that a person, such as the person 158, may press to enter authorization codes to cause the garage door 162 to open, close, and/or stop moving. As described herein, for example with respect to FIG. 19 below, the keypad 156 may be used for a single press open of a garage door. For example, the person 158 may press a button on the keypad 156 when the garage door 162 is closed (e.g., as shown in FIG. 1F). If the person is carrying a client device that communicates with the keypad 156, the light camera 154, or another device to authorize entry to the garage 152, the single button press may cause the garage door 162 to open (e.g., as shown in FIG. 1D). The keypad 156 may also include a scanner such as an optical scanner. Such a scanner may be used to allow access to the garage, such as a guest access with a scannable code as described below with respect to FIG. 14. In various embodiments, the keypad 156 may also be used to enter a distress code, for example as described below with respect to FIG. 20. For example, if a person is under duress, that person may enter a specific distress code into the keypad 156. The distress code causes the garage door 162 to open (or close) normally so that anyone else nearby or observing the person entering the codes behavior thinks that nothing is happening other than the opening (or closing) of the garage door 162. However, the distress code may also trigger a transmission of an alert to security monitoring services and/or authorities. In this way, someone could alert security monitoring service and/or authorities to a problem without it appearing that they have actually reported a problem.

In some embodiments, the keypad 156 may also be equipped with a camera similar to the A/V devices described herein. Similarly, a keypad may be incorporated into various A/V devices described herein. For example, a camera or other visual scanning system in the keypad 156 may be used to scan visual codes (e.g., a QR code) presented on a display of a client device. These codes may be scanned and authorize to access a garage (e.g., have the garage door open).

A sensor 160 is also shown at the bottom of the opening of the garage 152. The sensor 160 may be a photoelectric sensor that detects if something is in the opening of the garage 152, or may be a motion sensor that detects motion. The sensor 160 is used to determine if anything is in the way of the garage door 162 closing. The sensor 160 may also be tied into a broader security system. For example, if a security system is armed, the sensor 160 detecting motion triggers an alarm condition for the security system. The sensor 160 may also be used to determine that image data should be captured by light camera 154. For example, if a car is backing out of the garage 152, the sensor 160 will detect motion, and the light camera 154 begins capturing image data to help determine that the vehicle has fully left the garage 152. In another example, the sensor 160 detecting motion may trigger a camera inside the garage to begin capturing image data. Information from the sensor 160 may further be used to determine when the garage door should be closed. For example, if something is in the opening (e.g., the person 158), the sensor 160 detects its presence and prevents the garage door 162 from being closed. Further examples of how the sensor 160 may be used are described herein, for example with respect to FIG. 21 described below.

Figure 2:
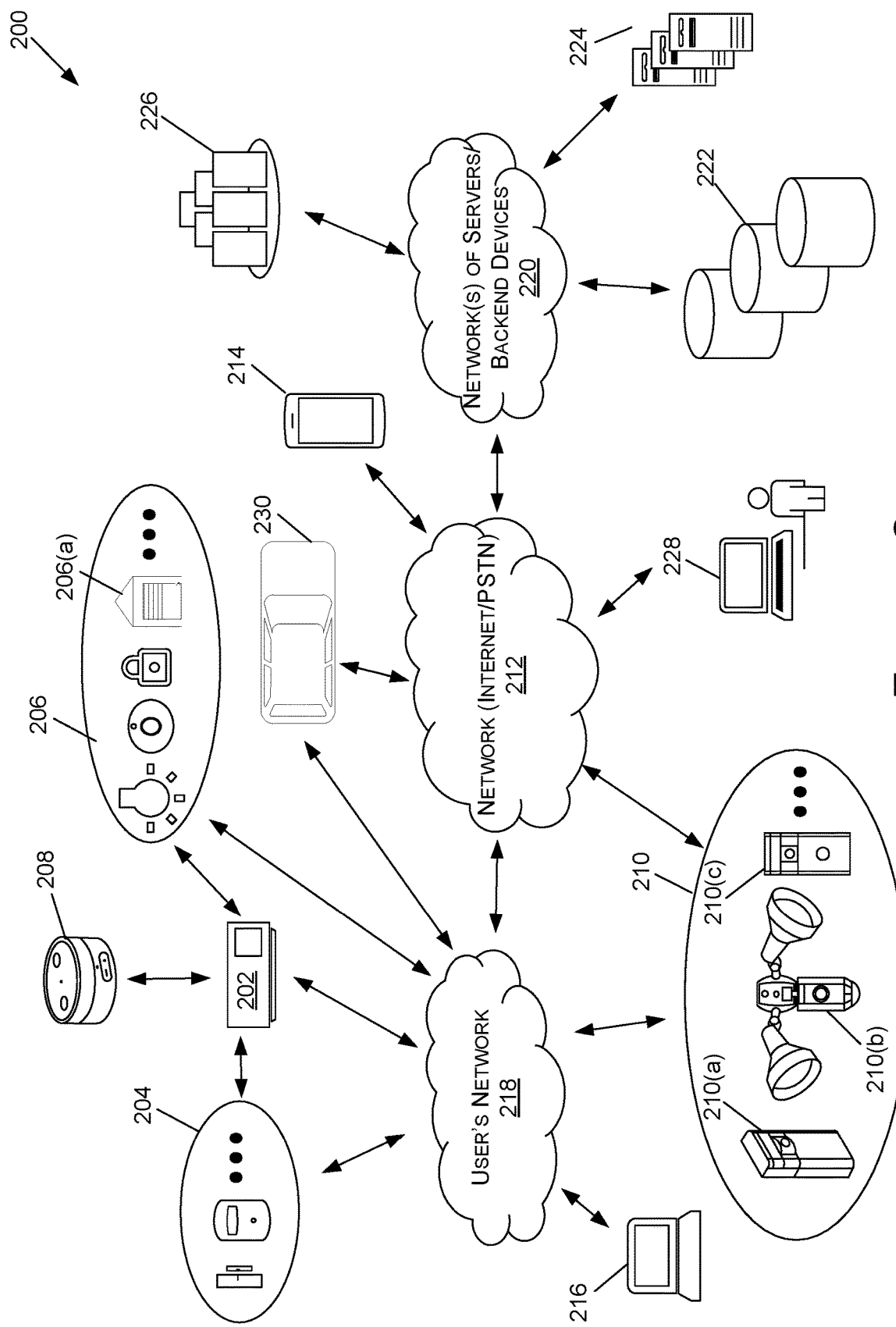
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, garage door openers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216, 230 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input. The keypad 156 of FIGS. 1D-1F may include similar components and functionality as the user interfaces described herein.

The hub device 202, the VA device 208, the sensors 204, the automation devices 206, the A/V recording and communication devices 210, and/or client devices 214, 216, 230 may use one or more wired and/or wireless communication protocols to communicate, including, for example and without limitation, Wi-Fi (e.g., the user's network 218), X10, Ethernet, RS-485, 6LoWPAN, Bluetooth LE (BLE), Zig-Bee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN. The devices, sensors, and actuator (e.g., opener) of a garage door of FIGS. 1A-1F may communicate with similar components and functionality as the user's network 218.

The system 200 may include one or more A/V recording and communication devices 210 (alternatively be referred to herein as "A/V devices 210" or "A/V device 210") (which may represent, and/or be similar to, the A/V recording and communication devices 104, 118, 126, 142, and 154 of FIGS. 1A-1F). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3. The devices, sensors, and actuator (e.g., opener) of a garage door of FIGS. 1A-1F may communicate with similar components and functionality as the network (Internet/PSTN) 212.

The system 200 may further include a smart-home hub device 202 (which may alternatively be referred to herein as the "hub device 202") connected to the user's network 218 and/or the network (Internet/PSTN) 212. The smart-home hub device 108 of FIG. 1A may include similar components and functionality as the smart-home hub device 202 described herein. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, 230, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a carbon dioxide sensor, a photoelectric sensor, a smoke detector, a light sensor, a glass break sensor, a freeze sensor, a flood sensor, a moisture sensor, a motion sensor, and/or other sensors that may provide the user/owner of the security system a notification of a security event at his or her property. The sensor 160 of FIGS. 1D and 1E may include similar components and functionality as the one or more sensors 204 described herein.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, a garage door opening/actuating system 206(*a*) and/or other automation devices. The garage door actuators and opener systems described herein throughout may include similar components and functionality as the garage door opening/actuating system 206(*a*) described herein.

As described herein, in some of the present embodiments, some or all of the client devices 214, 216, 230 the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216, 230 (which may represent, and/or be similar to, the client devices of the persons 110, 112, 124 of FIG. 1A and/or the client vehicle devices of vehicles 122, 130, 136 of FIG. 1A). The client devices 214, 216, 230 may communicate with and/or be associated with (e.g., capable of access to and control of) the A/V devices 210, a smart-home hub device 202, the VA device 208, sensors 204, and/or automation devices 206. In various embodiments, the client devices 214, 216, 230 communicate with other devices using one or more wireless and/or wired communication protocols, the user's network, and/or the network (Internet/PSTN) 212, as described herein. The client devices 214, 216, 230 may comprise, for example, a mobile device such as a smartphone or a personal digital assistant (PDA), or a computing device such as a tablet computer, a laptop computer, a desktop computer, etc. In some embodiments, the client devices 214, 216, 230 includes a connected device, such as a smart watch, Bluetooth headphones, another wearable device, or the like. In such embodiments, the client devices 214, 216, 230 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216, 230 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226. The devices, sensors, and actuator (e.g., opener) of a garage door of FIGS. 1A-1F may communicate with one another via similar components and functionality as the network 220 and may communicate with the various components of FIG. 2 via the network 220 as described herein.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216, 230. This architecture is called the client-server model. The client devices 214, 216, 230 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216, 230.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216, 230). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi● networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The devices, sensors, and actuator (e.g., opener) of a garage door of FIGS. 1A-1F may communicate with one another and/or the components of FIG. 2 via similar components and functionality as the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
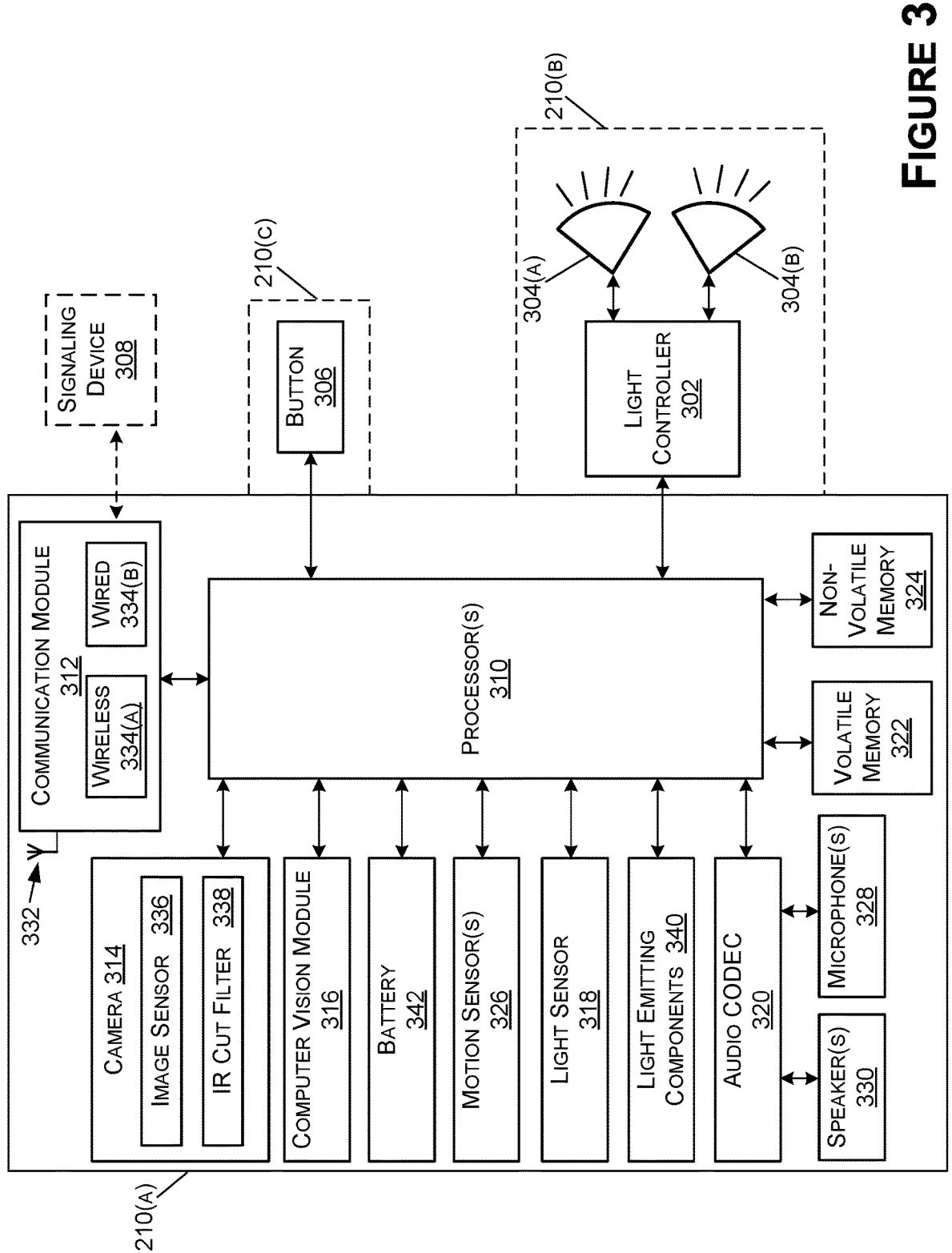
FIG. 3 is a functional block diagram of an A/V recording and communication device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol). The video doorbell 104, the light cameras 126, 154, and the security cameras 118, 142 of FIGS. 1A-1F may include similar components and functionality as the A/V devices 210 described herein.

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216, 230 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210. The barometer, the humidity sensor, and the temperature sensor may measure atmospheric conditions that yield atmospheric data. Such sensors may be used, for example, in a method such as the method described below with respect to FIG. 23.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). In some embodiments, motion of an entity that is to be captured by the camera 314 may be a vehicle so as to implement the various methods and processes described herein. Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. This metadata may be used, for example, to track an inventory of a garage or create an access log of who/what has entered or exited a garage as described herein (e.g., with respect to FIGS. 1B, 1C, 12). The metadata may also be used to open or close a garage door as described herein (e.g., with respect to FIGS. 8, 10, 11, 13-19). In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory.

Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation. Detection of vehicles, objects, persons, etc. can be used to implement the various systems, methods, and processes described herein throughout.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). OCR may be used, for example, for determining characters on a license plate (e.g., license plate number, state of licensure, expiration of license) or on a vehicle (e.g., the make, model, and/or trim package of a vehicle). 2D Code Reading—Reading of 2D codes such as data matrix and QR codes. Facial Recognition. Shape Recognition Technology (SRT)—Differentiating human beings (e.g., head and shoulder patterns) from objects and/or vehicles.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. For example, physical measures (e.g., depth information) may be used according to various methods and processes described herein. For example, physical measures (e.g., depth information) may be used to determine vehicles that are approaching, leaving, entering, exiting, or otherwise moving in or around a garage and/or garage door as described herein throughout (e.g., with respect to FIGS. 1A-1F, 8-12, and/or 22). Physical measures (e.g., depth information) may also be used to keep track of objects in a garage, such as described herein with respect to FIGS. 1B, 1C, and/or 12. Physical measures (e.g., depth information) may also be used to give instructions for placing an object or parking a vehicle within a garage, such as described herein with respect to FIGS. 1A-1C and 9. Physical measures (e.g., depth information) may also be used to prevent a garage door from closing as a person moves out of a garage, such as described herein with respect to FIG. 15.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics. Similarly, the present embodiments may use any one, or a combination of more than one, of the foregoing recognition methods and/or algorithms to identify and/or authenticate a vehicle that is suspicious or that is authorized to access a property and/or a garage as described herein.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216, 230 to indicate to the user(s) of the client device(s) 214, 216, 230 that a person is present at the A/V device 210 (in some embodiments, via at least one of the hub device 202, the VA device 208, and/or one or more component of the network of servers/backend devices 220). In some embodiments, the button for a single button press method to open a garage (e.g., with respect to FIG. 19) may be the button 306 of an A/V device 210.

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
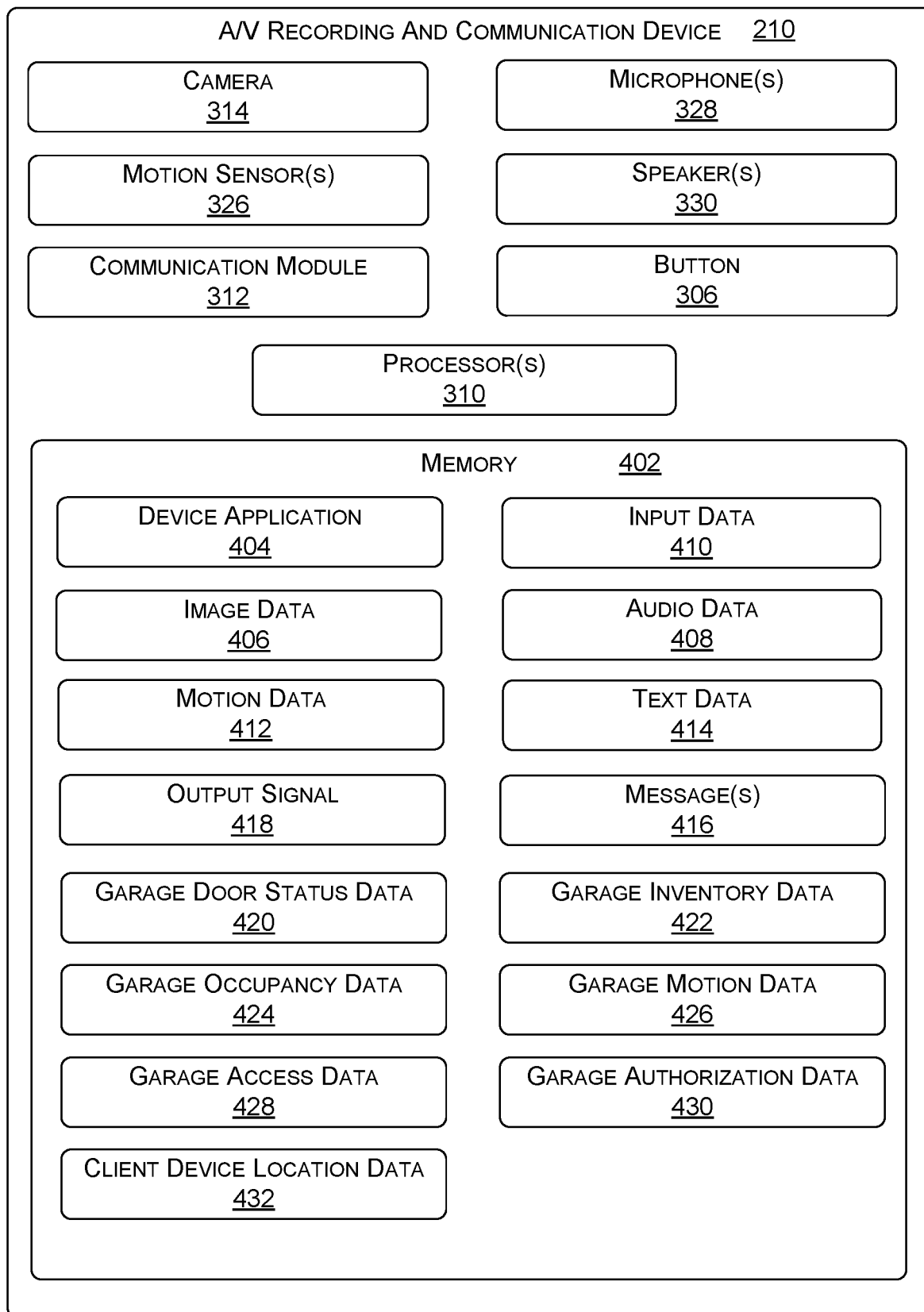
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In various embodiments, the device application 404 may configured the processor(s) 310 to generate, store, and/or use data such as garage door status data 420, garage inventory data 422, garage occupancy data 424, garage motion data 426, garage access data 428, garage authorization data 430, client device location data 432, or any combination thereof. Some of this data may be determined based image data captured by the camera 314 and/or the motion sensor(s) 326 (e.g., the image data 406 and/or the motion data 412). For example, the garage door status data 420 (e.g., whether the garage is open, closed, or somewhere in between), may be determined by capturing image data of a garage door and determined its state. The garage inventory data 422 (e.g., an inventory of objects and/or vehicles in the garage) may be determined by capturing image data of the contents of a garage and creating an inventory of those contents, for example as described with respect to FIGS. 1B, 1C and 12 herein. The garage occupancy data 424 may indicate whether any persons are present in and/or around the garage, and may also be determined based on captured image data.

The garage motion data 426 may also be determined based on captured image data. The garage motion data 426 includes information stored about any movement captured in or around a garage, including movement of people, vehicles, objects, the garage door itself, and any other movement captured by the camera 314 and/or the motion sensor(s) 326. The garage access data 428 may also be determined based on captured image data. The garage access data 428 is a list that ties together some of the garage motion data 426 with information from the garage authorization data 430. The garage access data 428 is a log that keeps track of who has accessed a garage and when. For example, if a garage door is open for a car in the driveway that is recognized as an authorized vehicle, the time, date, and images of that car accessing the driveway may be stored as garage access data 428. An entry in the garage access data 428 may also include or link to information about that vehicle and/or party that accessed the garage. For example, the name of the party linked to an authorized vehicle may be saved along with the access data for that incident of the garage being accessed. In this way, a log of who has accessed a garage and when may be kept as the garage access data 428.

The garage authorization data 430 may also be adjusted over time. For example, a client device may add guest and/or guest vehicle information to the garage authorization data 430 so that guests may access a garage, such as described with respect to FIG. 13. A client device may also generate and/or receive scannable codes that allow anyone to access a garage. Information about which scannable codes have been activated and for how long they are activated may be stored in the garage authorization data 430, such as described with respect to FIG. 14. In this way the AV recording and communication device 210 may determine from image data it captures when someone is authorized to access a garage. The client device location data 432 may include information about the geolocation of various client devices, including client vehicle devices. This client device location data 432 may be used as described herein to determine when to allow access to a garage and transmit an actuation command to an actuator of a garage door. For example, if a car that looks like a client's car is in the driveway, but the client device location data 432 indicates that a client vehicle device associated with the client's car is 20 miles away, the system may not grant access to the garage.

In addition, the device application 404 may configure the processor(s) 310 to transmit the image data 406, the audio data 408, the motion data 412, the input data 410, the text data 414, message(s) 416, the garage door status data 420, the garage inventory data 422, the garage occupancy data 424, the garage motion data 426, the garage access data 428, the garage authorization data 430, and/or the client device location data 432 to the client devices 214, 216, 230, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, the motion data 412, the garage door status data 420, the garage inventory data 422, the garage occupancy data 424, the garage motion data 426, the garage access data 428, the garage authorization data 430, and/or the client device location data 432. In some of the present embodiments, the output signal 418 may be transmitted to the backend server 224 and/or the hub device 202 using the communication module 312. The backend server 224 may then transmit (or forward) the output signal 418 to the client device(s) 214, 216, 230, and/or the hub device 202 may then transmit (or forward) the output signal 418 to the client device(s) 214, 216, 230, and/or the hub device 202 may then transmit (or forward) the output signal 418 to the backend server 224, and the backend server 224 may then transmit (or forward) the output signal 418 to the client device(s) 214, 216, 230. In other embodiments, the output signal 418 may be transmitted directly to the client device(s) 214, 216, 230 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, 230, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, the motion data 412, the garage door status data 420, the garage inventory data 422, the garage occupancy data 424, the garage motion data 426, the garage access data 428, the garage authorization data 430, and/or the client device location data 432.

As described herein, the message(s) 416 may include messages, signals, data, notifications, and/or any type of electronic communication that electronic devices (e.g., the A/V device 210, the client device 214, 216, 230, the hub device 202, and/or one or more components of the network (s) of servers/backend devices 220) may transmit and receive with other electronic devices (e.g., the A/V device 210, the client device 214, 216, 230, the hub device 202, and/or one or more components of the network(s) of servers/ backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device may send to another electronic device.

The image data 406, the audio data 408, the text data 414, the motion data 412, the garage door status data 420, the garage inventory data 422, the garage occupancy data 424, the garage motion data 426, and/or the garage access data 428 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, motion data 412, garage door status data 420, garage inventory data 422, garage occupancy data 424, garage motion data 426, and/or garage access data 428 representative of the detection of motion, or motion event. As a result, when a request for data pertaining to particular motion event, or a particular time period, is received (e.g., by the client device 214, 216, 230, the backend server 224, and/or the hub device 202), the image data 406, the audio data 408, the text data 414, the motion data 412, the garage door status data 420, the garage inventory data 422, the garage occupancy data 424, the garage motion data 426, and/or the garage access data 428 associated with a particular motion event, and/or associated with motion event(s) within the particular time period, may be transmitted, retrieved, and/or received.

Although examples discuss the A/V device 210 generating and transmitting the image data 406, the audio data 408, the text data 414, the motion data 412, the garage door status data 420, the garage inventory data 422, the garage occupancy data 424, the garage motion data 426, and/or the garage access data 428 when motion is detected (e.g., in the message 416), in other examples the data may be generated and/or transmitted at other times. For example, the image data 406, the audio data 408, the text data 414, the motion data 412, the garage door status data 420, the garage inventory data 422, the garage occupancy data 424, the garage motion data 426, and/or the garage access data 428 may be generated and transmitted continuously (e.g., in a streaming manner), periodically, upon request, etc. In examples where the image data 406, the audio data 408, the text data 414, the motion data 412, the garage door status data 420, the garage inventory data 422, the garage occupancy data 424, the garage motion data 426, and/or the garage access data 428 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, the motion data 412, the garage door status data 420, the garage inventory data 422, the garage occupancy data 424, the garage motion data 426, and/or the garage access data 428. As a result, even though the image data 406, the audio data 408, the text data 414, the motion data 412, the garage door status data 420, the garage inventory data 422, the garage occupancy data 424, the garage motion data 426, and/or the garage access data 428 may be continuously generated by the A/V device 210, the image data 406, the audio data 408, the text data 414, the motion data 412, the garage door status data 420, the garage inventory data 422, the garage occupancy data 424, the garage motion data 426, and/or the garage access data 428 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, the motion data 412, the garage door status data 420, the garage inventory data 422, the garage occupancy data 424, the garage motion data 426, and/or the garage access data 428 that is not associated with motion events.

As described herein, at least some of the processes of the backend server 224, the hub device 202, and/or the client device 214, 216, 230 may be executed by the A/V device 210. In various embodiments, any of the processes shown and described with respect to FIGS. 8-23 may be executed by any of the backend server 224, the hub device 202, the client device 214, 216, 230, the A/V device 210, or any combination thereof.

Figure 5:
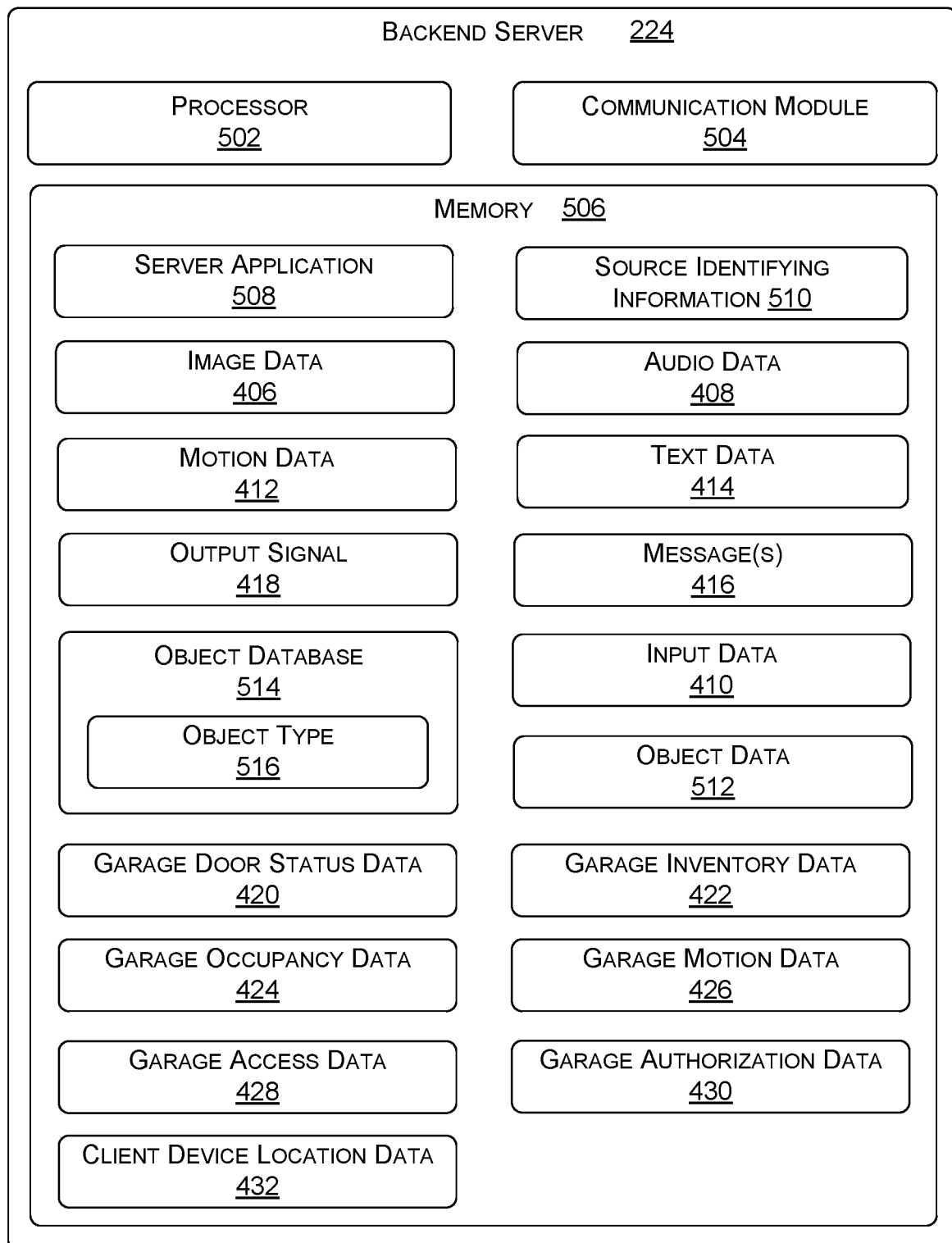
FIG. 5 is a functional block diagram illustrating one example embodiment of a backend device according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, 230, a device controlled by the security monitoring service 228, the A/V devices 230, and/or the client devices 232).

The backend server 224 may store, similar to the A/V device 210, garage door status data 420, garage inventory data 422, garage occupancy data 424, garage motion data 426, garage access data 428, garage authorization data 430, and/or client device location data 432. This information may be received from A/V devices 210, and may be used according to the embodiments described herein. For example, the backend server 224 may determine when a garage door should be opened, and transmit an actuation command to a garage door actuator either directly or indirectly. That determination to transmit the actuation command may be based on the garage authorization data 430, the client device location data 432, and/or any other information as described herein. The garage door status data 420, the garage inventory data 422, the garage occupancy data 424, the garage motion data 426, and/or the garage access data 428 may be stored on the backend server 224 so that it is easily accessible/requestable by client devices 214, 216, 230, smart-home hub devices 202, and/or any other device.

The memory 402 may also include a server application 508 that configures the processor(s) 502 to receive and/or retrieve the audio data 408, the text data 414, the input data 410, the messages 416, the image data 406, the motion data 412, the garage door status data 420, the garage inventory data 422, the garage occupancy data 424, the garage motion data 426, the garage access data 428, the garage authorization data 430, and/or the client device location data 432 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, the motion data 412, the garage door status data 420, the garage inventory data 422, the garage occupancy data 424, the garage motion data 426, the garage access data 428, the garage authorization data 430, and/or the client device location data 432 to the client devices 214, 216, 230 using the communication module 504. Furthermore, the server application 508 may configure the processor(s) 502 to receive, using the communication module 504, image data 512 (also referred to as "second image data 512") generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216, 230. In addition, the source identifying data 510 may be used by the processor(s) 502 of the backend server 224 to determine the client devices 214, 216, 230 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, the second image data 512, the garage door status data 420, the garage inventory data 422, the garage occupancy data 424, the garage motion data 426, the garage access data 428, the garage authorization data 430, and/or the client device location data 432.

As described herein, at least some of the processes of the A/V device 210, the hub device 202, and/or the client device 214, 216, 230 may be executed by the backend server 224. In various embodiments, any of the processes shown and described with respect to FIGS. 8-23 may be executed by any of the backend server 224, the hub device 202, the client device 214, 216, 230, the A/V device 210, or any combination thereof.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that may be depicted by the image data 406 and/or cause motion that may be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512, the garage door status data 420, the garage inventory data 422, the garage occupancy data 424, the garage motion data 426, and/or the garage access data 428. In some of the present embodiments, one or more of the image data 406, the motion data 412, and the audio data 408 may be used to determine the object data 512, the garage door status data 420, the garage inventory data 422, the garage occupancy data 424, the garage motion data 426, and/or the garage access data 428. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or superquadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Comparing the image data 406 to the image data stored in the object database 514 may inform information stored as the garage door status data 420, the garage inventory data 422, the garage occupancy data 424, the garage motion data 426, and/or the garage access data 428. For example, if a vehicle is recognized and accesses the garage, that information may be stored as garage motion data 426 and/or garage access data 428. If an object within a garage is moved, that object may be recognized and the removal of that object may be stored as garage inventory data 422. If a garage door opening is recognized, that may be stored as garage door status data 420.

Although described as being performed in the backend server 224, in some embodiments, the image data 406 may be analyzed by any of the A/V recording and communication device 210, the hub device 202, and/or the client device 214, 216, 230 in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6A:
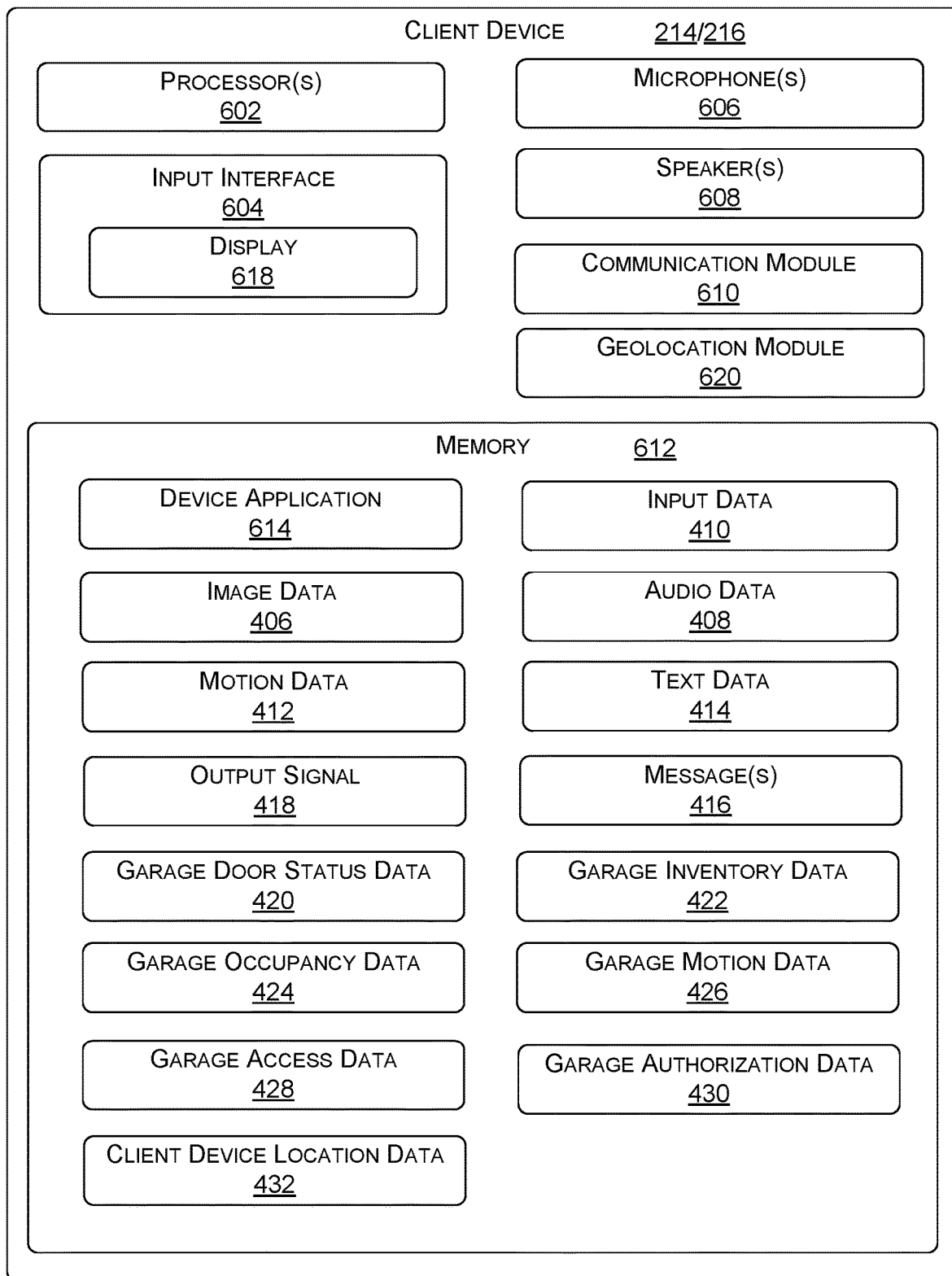
FIG. 6A is a functional block diagram illustrating one example embodiment of a client device according to various aspects of the present disclosure.
Figure 6B:
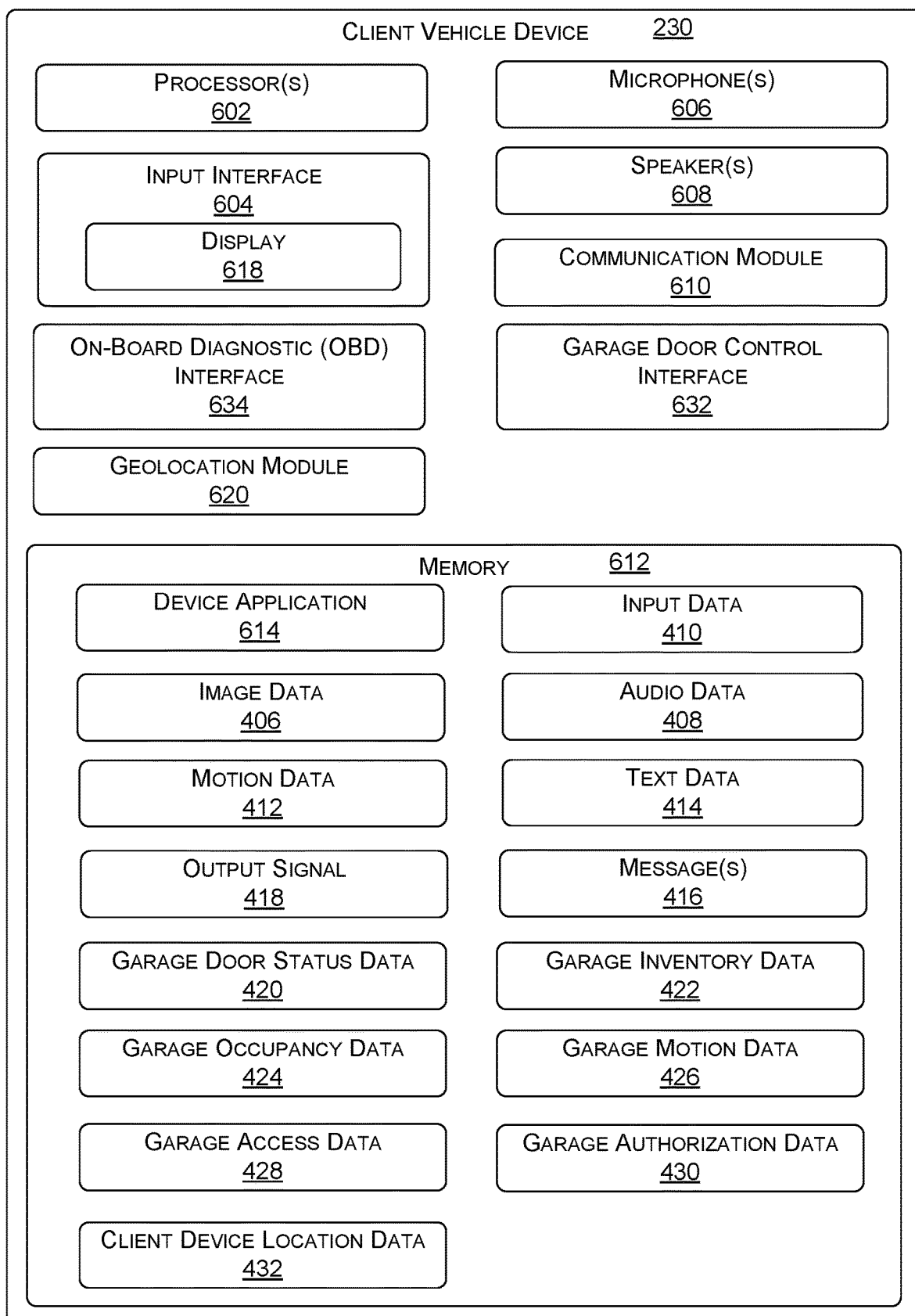
FIG. 6B is a functional block diagram illustrating one example embodiment of a client automobile device according to various aspects of the present disclosure.

Now referring to FIGS. 6A and 6B, FIGS. 6A and 6B are a functional block diagrams illustrating one embodiment of the client devices 214, 216, 230 according to various aspects of the present disclosure. The client devices 214, 216, 230 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216, 230 may further comprise a camera (not shown) operatively connected to the processor(s) 602. The client devices 214, 216 may be, for example, a smart phone, tablet, or laptop computer. The client vehicle device 230 may be, for example, a computing system on-board a vehicle.

The memory 612 may store a device application 614. In various embodiments, the device application 614 may configure the processor(s) 602 to receive input(s) to the input interface 604 (e.g., a request to open or close a garage door, a request to generate a scannable code, a request to add a guest license plate to the garage authorization data 430). In addition, the device application 614 may configure the processor(s) 602 to receive, using the communication module 610, the input data 410, the image data 406, the audio data 408, the output signal 418, messages 416, the garage door status data 420, the garage inventory data 422, the garage occupancy data 424, the garage motion data 426, the garage access data 428, the garage authorization data 430, and/or the client device location data 432 from one or more of the A/V device 210, the hub device 202, or the backend server 224.

With further reference to FIG. 6, the input interface 604 may include a display 618. The display 618 may include a touchscreen, such that the user of the client device 214, 216, 230 may provide inputs directly to the display 618 (e.g., a request to open or close a garage door, a request to generate a scannable code, a request to add a guest license plate to the garage authorization data 430). In some embodiments, the client device 214, 216, 230 may not include a touchscreen. In such embodiments, and in embodiments where the client device 214, 216, 230 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion (e.g., of a garage door, in a garage, in a driveway, in an area about a garage), detected the presence of an object (e.g., a vehicle, an object as shown in FIG. 1B or 1C), received an input (e.g., to the button 306, to the keypad 156), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

The client vehicle device 230 also includes a garage door control interface 632 and an on-board diagnostic (OBD) interface 634. A garage door control interface may be displayed on the display 618 of any of the client devices 214, 216, 230, and interacted with via the input interface 604 (e.g., to transmit an actuation command to an actuator of a garage door). However, the client vehicle device 230 may also have the garage door control interface 632, which is a separate interface for controlling a garage, gate, lights, or other programmable aspects of a smart home. For example, the garage door control interface 632 may include physical buttons on the interior of a car, such as in the dash, in a sun visor, and/or in a rear-view mirror. These physical buttons may be used to actuate a garage door, and the button presses may further be used to determine garage motion data 426, the cause of observed garage motion (e.g., who or what vehicle opened the garage door, which may be stored as garage access data 428), and/or garage door status data 420 (e.g., whether door is closed—if button on the garage door control interface is pressed the garage door status 420 may be changed accordingly).

The OBD interface 634 is connected to status sensors and other electronic devices of a vehicle. For example, inputs from a vehicle to the OBD interface 634 may include any metric or aspect of a car measured by OBD systems. Such information may be used to determine, for example, if a car is running or not. Information from the OBD interface 634 may be used in various embodiments as described herein. For example, before determining that a garage door should be closed after a vehicle pulls into the garage, the system may wait until the vehicle's engine has been shut off. In this way, emissions from the vehicle will not be trapped inside the garage. Information from the OBD interface 634 may indicate whether the vehicle's engine is still running or not. In various embodiments, information from the OBD interface 634 may also be used according to the process shown and described with respect to FIG. 16.

As described herein, at least some of the processes of the A/V device 210, the hub device 202, and/or the backend server 224 may be executed by the client device 214, 216, 230. In various embodiments, any of the processes shown and described with respect to FIGS. 8-23 may be executed by any of the backend server 224, the hub device 202, the client device 214, 216, 230, the A/V device 210, or any combination thereof.

Figure 7:
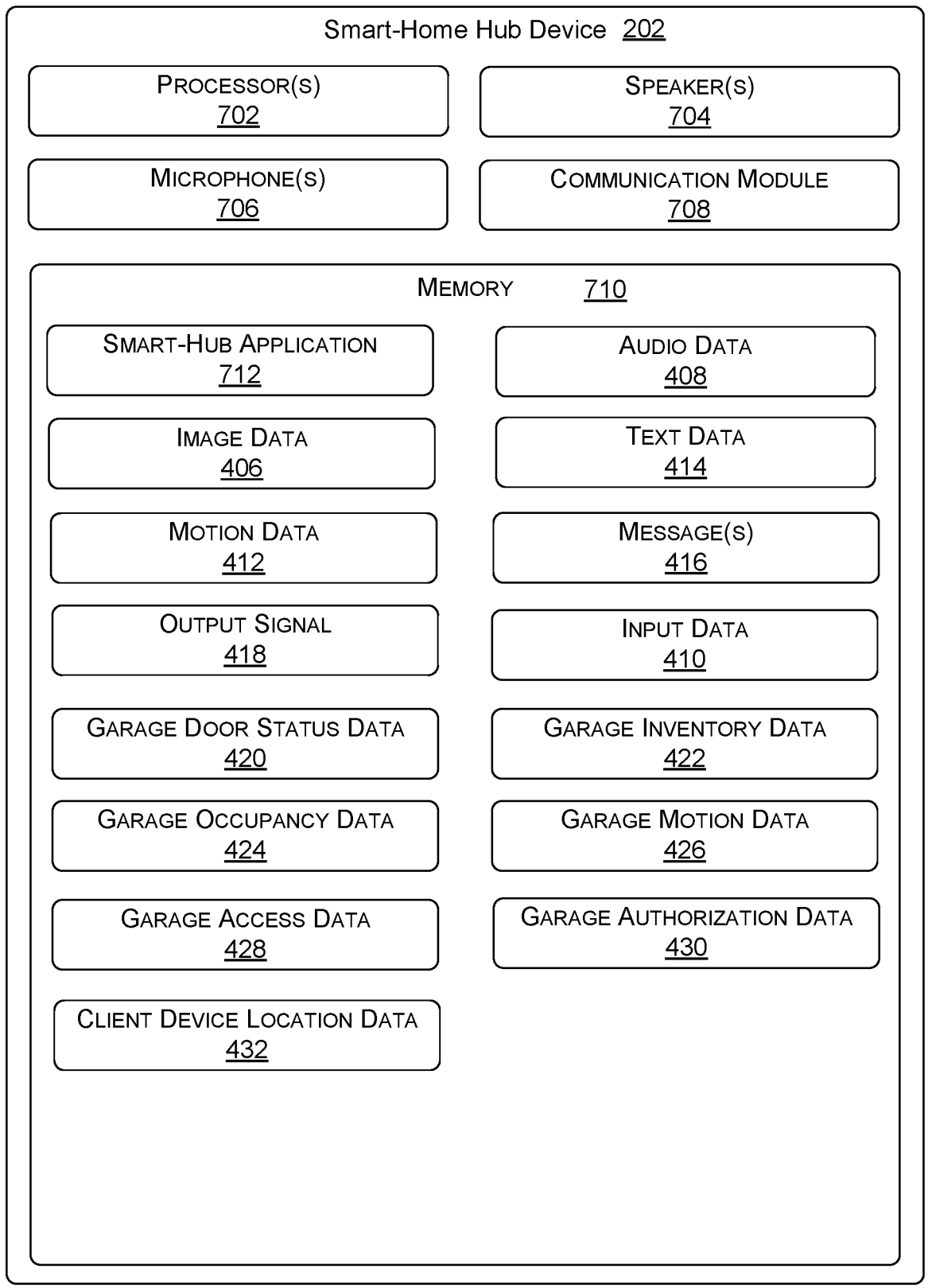
FIG. 7 is a functional block diagram illustrating one example embodiment of a smart-home hub device according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, garage door open/closed etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, garage door opening/closing etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, the messages 416, the garage door status data 420, the garage inventory data 422, the garage occupancy data 424, the garage motion data 426, the garage access data 428, the garage authorization data 430, and/or the client device location data 432 from the A/V device 210 and/or client devices 214, 216, 230 (in some embodiments, via the backend server 224) using the communication module 708. For example, the hub device 202 may receive and/or retrieve (e.g., after receiving a signal from the A/V device 210 that the A/V device 210 has been activated) the image data 406, the input data 410, the motion data 412, the garage door status data 420, the garage inventory data 422, the garage occupancy data 424, the garage motion data 426, the garage access data 428, the garage authorization data 430, and/or the client device location data 432 from the A/V device 210 and/or the backend server 224 in response to motion being detected by the A/V device 210. The smart-hub application 712 may then configure the processor(s) 702 to transmit, using the communication module 708, the audio data 408, the text data 414, the image data 406, the motion data 412, the input data 410, the messages 416, the garage door status data 420, the garage inventory data 422, the garage occupancy data 424, the garage motion data 426, the garage access data 428, the garage authorization data 430, and/or the client device location data 432 to the client device 214, 216, 230, the backend server 224, and/or an additional electronic device (e.g., a second A/V device 210, the automation device(s) 206, the sensor(s) 204, etc.).

As described herein, at least some of the processes of the A/V device 210, the backend server 224, and/or the client device 214, 216, 230 may be executed by the hub device 202. In various embodiments, any of the processes shown and described with respect to FIGS. 8-23 may be executed by any of the backend server 224, the hub device 202, the client device 214, 216, 230, the A/V device 210, or any combination thereof.

Each of the processes described herein, including the processes 800, 900, 1000, 1100, 1200, 1300, 1400, 1500, 1600, 1700, 1800, 1900, 2000, 2100, 2200, and 2300, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
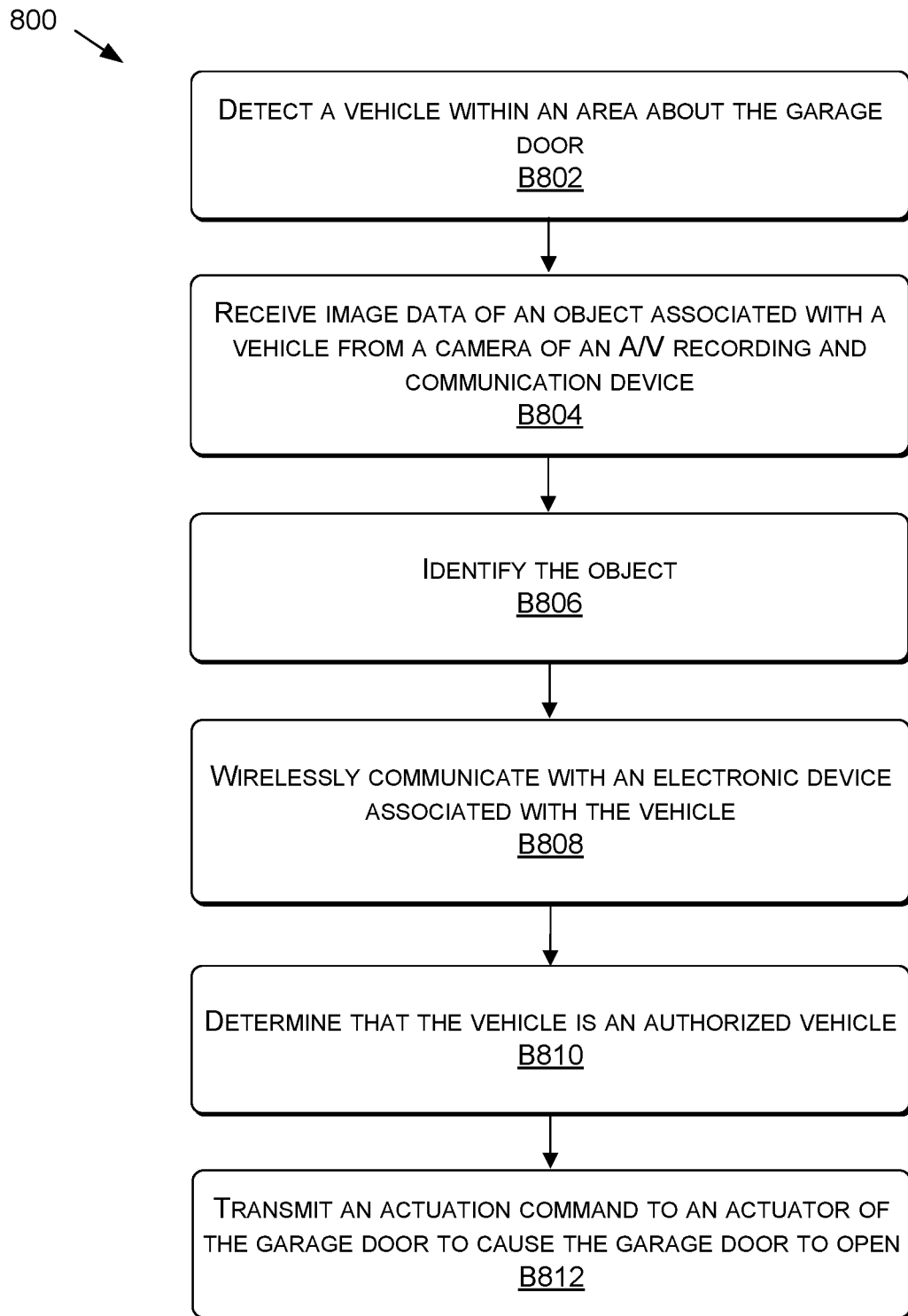
FIG. 8 is a flowchart illustrating an example process for detecting a vehicle and opening a garage door, according to various aspects of the present disclosure.

FIG. 8 is a flowchart illustrating an example process 800 for detecting a vehicle and opening a garage door, according to various aspects of the present disclosure. According to the process 800, image data and wireless communication with an electronic device is used to authorize a vehicle's access to a garage. For example, a license plate may be captured by a camera of an A/V device, and the A/V device may communicate with a client vehicle device in the vehicle to check electronic credentials. If both a license plate number and the electronic credentials match authorization/access data stored in a memory, an actuation command is transmitted to cause a garage door to open. In this way, multiple factors may be used to automatically authorize access to a garage and cause the garage door to open. Advantageously, safety and convenience factors are improved using such a process.

At block B802, a vehicle is detected within an area about the garage door. For example, the backend server 224 may receive, using the communication module 504, image data 406 generated by the A/V device 210. The image data 406 may indicate movement of a vehicle within a field of view of the A/V device 210 (e.g., a field of view of the camera 314 and/or a field of view of the motion sensor(s) 326). In some examples, the backend server 224 may receive the image data 406 from the A/V device 210, the hub device 202, and/or the client device 214, 216, 230. In some examples, the backend server 224 may receive the image data 406 based on the A/V device 210 detecting motion of the vehicle. The vehicle may be moving toward the garage door (e.g., on a driveway toward the garage door, pulling into the driveway from a road, etc.). The movement of the vehicle toward the garage door may be deduced based on the image data. For example, referring FIG. 1A, once a vehicle is in the driveway 132 (e.g., the vehicle 130) it may move directly toward garage, which may be deduced from image data captured by the A/V devices 126 and/or 104. The system may also be able to intuitively deduce that a vehicle is or will soon be moving toward a garage door. For example, the vehicle 136 may drive down the road 134 toward the driveway and slow down at a rate that suggests it will turn into the driveway 132. This motion may be captured through image data and a deduction made that the vehicle 136 will approach the garage. In other words, the system may consider the vehicle 136 as within an area about the garage door. In another example, the vehicle 136 may stop near the driveway 132, waiting for oncoming traffic to pass before turning left into the driveway 132. The vehicle also may be deduced to be within an area about the garage door in this scenario, based on image data captured by the A/V devices 104 and/or 126.

At block B804, image data of an object associated with the vehicle is received by a camera of the A/V device. For example, the backend server 224 may receive, using the communication module 504, image data 406 generated by the A/V device 210. The image data 406 may show an object associated with a vehicle that is within a field of view of the A/V device 210 (e.g., a field of view of the camera 314 and/or a field of view of the motion sensor(s) 326). In some examples, the backend server 224 may receive the image data 406 from the A/V device 210, the hub device 202, and/or the client device 214, 216, 230. In some examples, the backend server 224 may receive the image data 406 based on the A/V device 210 detecting motion of the vehicle (e.g., detecting the vehicle at the block B802). The object associated with the vehicle may be, for example, a scannable code on, in, or near the vehicle (e.g., a sticker in the windshield of a vehicle visible from outside the vehicle, a code presented on the display of a client device), a license plate of the vehicle, a feature of the vehicle, etc.

At block B806, the object is identified. The object may be identified in various ways, and the identification may be performed by various devices described herein such as the backend server 224, the A/V device 210, the hub device 202, and/or the client device 214, 216, 230. The object may be identified by an image recognition process. For example, identification of the object may be based on comparing the received image data of the object with previously stored image data. The client may take a picture of a license plate of their vehicle with their client device. This previously stored image of the client's license plate may be compared to the image data, and a degree of similarity between the images may be used to determine whether the image data shows the same license plate as the previously stored image.

In another example, a previously taken photo of the client's license plate may be OCR'd to determine the characters (e.g., license plate number, issuing state, etc.) of a license plate. Subsequent image data may also be OCR'd to determine if the characters on the previously OCR'd license plate information matches the license plate of the image data. In another example, the client may enter input into a client device the state name and exact characters of their license plate. In this way, the image data may be OCR'd to determine if a vehicle detected about a garage has a license plate that matches the license plate information entered into a client device. In another example, the object identified in the image data is a machine-readable optical label. For example, a QR code, bar code, or other scannable visual code may be affixed to the vehicle, in the vehicle, or otherwise associated with the vehicle. The machine-readable optical label may be identified as the object from the image data, and the code may then be read from the image data. In some embodiments, a scannable code associated with a vehicle may be presented by a person on a client device. For example, a QR code for accessing a garage may be presented on the display of a client device so that it may be captured by a camera of an A/V device.

At block B808, an electronic device associated with the vehicle is wirelessly communicate with. The electronic device may be in, on, or near the vehicle. For example, the electronic device may be a client vehicle device 230 in the vehicle. The electronic device may be a client device 214/216 in or near the vehicle. In some embodiments, near the vehicle may mean that the electronic device is within a predetermined distance of the vehicle (e.g., within 1 meter, 3 meters, 10 meters, 20 meters, 50 meters, etc.). In some embodiments near the vehicle may mean that the electronic device is in the field of view of the A/V device that has captured image data of the vehicle (e.g., for electronic devices for which communication uses a line-of-sight). In some embodiments, near the vehicle may mean that the electronic device is near enough to the client vehicle device and/or the A/V device that electronic device may successfully communicate. For example, if NFC or BLE devices are used, they may communicate over a limited range/distance. Thus, the electronic device must be near enough to whatever it is communicating with to actually communicate. For example, an A/V (or a smart-home hub device, a client device, a backend server, etc.) device may scan an NFC device to wirelessly communicate according to the block B808. As another example, an electronic device may communicate with a vehicle client device, which may facilitate communication between the electronic device and an A/V device (or a smart-home hub device, a client device, a backend server, etc.).

In some embodiments, the wireless communication with the electronic device at block B808 may occur in response to or based on the identification of the object. In other words, the wireless communication may not be initiated until the object is identified at block B806. For example, an A/V device may not attempt to communicate with an electronic device regarding garage access until object data that is recognized by the system is identified. The communication may not be attempted until, for example, a license plate or scannable visual code affixed to a vehicle is recognized in image data. This may add an extra layer of security, because wireless signals seeking to communicate with an electronic device are not broadcast (and therefore could not be listened to or picked up easily by unauthorized parties) without the initial visual identification of the object. Once the object is identified, the wireless communication is initiated.

In various embodiments, the wireless communication is for authenticating the electronic device. In other words, if proper credentials are communicated by the electronic device, the electronic device is authenticated. This authenticated communication may be used to determine that the vehicle is an authorized vehicle as described below with respect to block B810.

At block B810, the vehicle is determined to be an authorized vehicle. For example, the backend server 224 may receive, using the communication module 504, authentication information from the wireless communication of block B808 from the A/V device 210. The authentication information in the wireless communication may come from, for example, a client device 214, 216, 230 and be routed through the A/V device 210. The determination that the vehicle is authorized may be based on multiple factors. For example, the image data of the vehicle may be used to confirm certain visual aspects of or associated with a vehicle (e.g., correct license plate information, correct color, make, model of vehicle, correct scannable code present on window, client device, etc.). The wireless communication from the electronic device may also be authenticated to determine that the vehicle is an authorized vehicle. In some embodiments, the authorization (including the wireless communication) may occur automatically. In this way, the vehicle may be authorized without action from a user such as entering a passcode or pressing a button.

In various embodiments, authentication of the vehicle based on wireless communications with the electronic device may occur in various ways. For example, a set of attributes may be received from the electronic device within the vehicle, and those attributes may be compared to previously stored attributes associated with a set of electronic devices. The set of electronic devices may have been previously set up by a client or otherwise added to a list of electronic devices that are authorized to access a garage. The wireless communication to authorize the electronic device may be via a short-range wireless communication protocol such as NFC, BLE, or any other suitable short-range communication protocol.

At block B812, an actuation command is transmitted to an actuator of the garage door to cause the garage door to open. The transmission of the actuation command is in response to/based on a determination that the vehicle is authorized B810. In this way, a vehicle may pull up to a garage and have it open if the vehicle is authorized. Advantageously, the garage may open without any apparent volitional act from a person in the vehicle. For example, the person in the vehicle may not press a button, enter a passcode, or otherwise act to make the garage open. Instead, the vehicle approaches the garage and the door just opens, all while advantageously identifying an object and wirelessly authenticating the vehicle to improve safety. In an example, the backend server 224 may make the determination that the vehicle is authorized, and may send the actuation command to the actuator that is routed through a network, a client device 214, 216, 230, smart-home hub device 202, and/or the A/V device 210.

In some embodiments, the vehicle accessing the garage may belong to one of a variety of parties. For example, the vehicle may belong to an owner (or member of the owner's family) of a home/land that includes the garage. The vehicle may belong to someone otherwise occupying the land (e.g., lessee, renter, guest, etc.). In some embodiments, the vehicle may be a service person or delivery driver. In such instances, the vehicle may not be pulled into the garage, but the garage door may open to provide the service person or delivery driver with access to the garage. If a service person or delivery driver does try to pull their vehicle into the garage, an alert may be generated and sent to the client device 214, 216, 230 (or any other device). Access to a garage may be provided to a delivery driver so that a delivery may be placed in the garage. Once the delivery driver pulls away the garage may close again, based on the image data captured by the A/V device 210. Access to a garage may be provided to a service person so that the service person may access the interior of a home that is connected to the garage.

Figure 9:
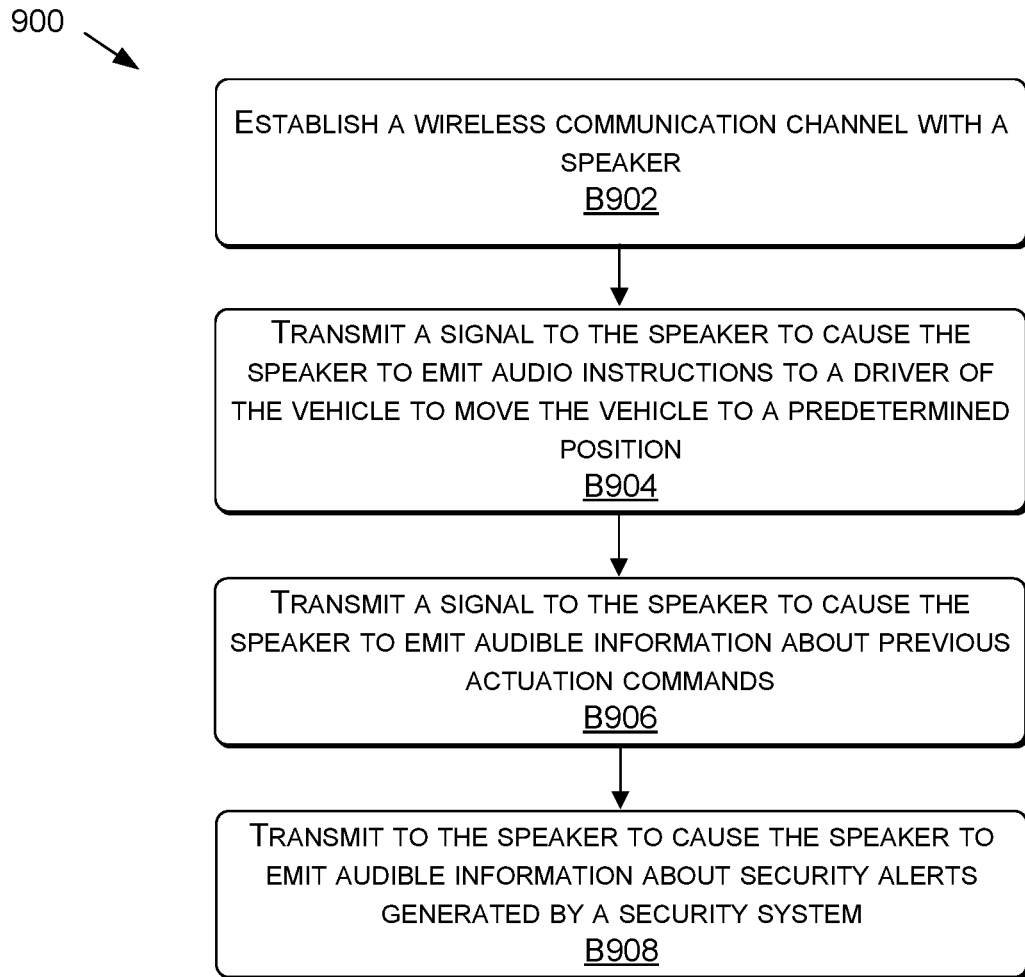
FIG. 9 is a flowchart illustrating an example process for transmitting audible information to a speaker, according to various aspects of the present disclosure.

FIG. 9 is a flowchart illustrating an example process 900 for transmitting audible information to a speaker, according to various aspects of the present disclosure. At block B902, a wireless communication channel is established with a speaker. The connection is established so that audio may be streamed to the speaker. In an alternative embodiment, a prerecorded audio clip may play from a device with a speaker, so that a wireless communication channel need not be established. In another alternative embodiment, an audio file may be transmitted to a device with a speaker. The audio file may be played on the speaker after it has fully transmitted to the device with the speaker. In this way, a wireless communication channel for streaming may not be established, but a wireless communication channel for transmitting the audio file may be established.

In various embodiments, the speaker may be the speaker 330 of the A/V device 210, a speaker of a client device 214, 216, 230, a speaker of a smart-home hub device 202, a standalone speaker, a speaker of a sound system of a vehicle, or any other device with a speaker. In embodiments where a communication channel is established, the communication may be between the speaker or device with a speaker and the A/V device 210, the client device 214, 216, 230, the smart-home hub device 202, the backend server 224, or any other electronic device.

In various embodiments, the speaker may be associated with a vehicle, such as a speaker of the vehicle's internal sound system. In this way, a person inside the vehicle would be able to hear audio played on the speaker. In various embodiments, a wireless connection may be established before or after the garage door is opened, or while the garage door is opening. Similarly, any audio message played on the speaker may also begin playing before or after the garage door is opened, or while the garage door is opening.

In various embodiments, instructions relating to an object may also be transmitted to a speaker. For example, the speaker 330 of the A/V device 210 in a garage may instruct a person where to place a particular object within the garage. For example, if an object (e.g., lawnmower) has been removed from the garage and is now being put back, the instructions may instruct on how and where to put the lawnmower back in the place it was before. In another example, a delivery driver may be instructed on where to leave a package in the garage. This may, for example, prevent a package from being left in a location where a car typically parks.

At block B904, a signal is transmitted to the speaker to cause the speaker to emit audio instructions to a driver of the vehicle to move the vehicle to a predetermined position. The signal with the audio instructions/message may be transmitted to the speaker from the A/V device 210, the client device 214, 216, 230, the smart-home hub device 202, and/or the backend server 224. The speaker may be the speaker 330 of the A/V device 210, a speaker of a client device 214, 216, 230, a speaker of a smart-home hub device 202, a standalone speaker, a speaker of a sound system of a vehicle, or any other device with a speaker. For example, when a vehicle is pulling into a garage, a signal may be transmitted to a speaker inside the vehicle that is connected to or part of the client vehicle device 230. The audio instructions played over the speaker based on the signal may instruct the driver where to park, to slow down, to speed up, to move farther, to back up, to go out of the garage and pull into another spot, to get out of the vehicle to move something out of a parking space in the garage, indicate how close the vehicle is to a wall, indicate how much further the vehicle should move, whether the vehicle (e.g., the steering wheel) should turn to the right or left, etc. These audio instructions may be determined based on image data captured by the A/V device 210 (e.g., in a field of view of the camera 314 and/or in a field of view of the motion sensor(s) 326). These audio instructions may also be determined based on a computer vision process.

The audio instructions may further be determined based on various factors, including for example user/client inputs and historical image data. For example, the audio instructions instructing a vehicle where to park may be based on a user input/configuration that previously indicated where a particular vehicle should park within a garage. Since various embodiments as described herein describe processes for recognizing particular vehicles, the audio instructions may instruct a particular vehicle or vehicles where to park within a garage. In another example, the audio instructions may be determined based on historical image data captured by the A/V device 210. For example, if the vehicle entering the garage typically parks in a particular place within the garage, the audio instructions may be configured to assist the driver in returning the vehicle to that customary location within the garage.

At block B906, a signal is transmitted to the speaker to cause the speaker to emit audible information about previous actuation commands. The signal transmitting the audible information may be transmitted to the speaker from the A/V device 210, the client device 214, 216, 230, the smart-home hub device 202, and/or the backend server 224. The speaker may be the speaker 330 of the A/V device 210, a speaker of a client device 214, 216, 230, a speaker of a smart-home hub device 202, a standalone speaker, a speaker of a sound system of a vehicle, or any other device with a speaker. Previous actuation commands are instances of a garage door being actuated. For example, information about when a garage door was opened, who it was opened by, and/or how it was authorized to be opened may be stored as the garage access data 428. The information transmitted as audible information to a speaker may also include a time of each actuation, identification of a vehicle associated with each actuation, what a person or vehicle did in the garage in the garage after each actuation, what was moved/added/removed in association with each actuation, etc.

Audible information relating to the garage access data 428 is therefore transmitted to the speaker. For example, as a person pulls into their garage when getting home from work, a speaker in their car may inform them: "Your garage was opened twice today, once by your child to get their bike out, and once by a delivery driver who left the new TV you ordered next to the door into your house." In this way, information about actuation commands may be relayed through a speaker. In such an example, the delivery driver may be automatically provided with access to the garage using the processes described herein. The location where a package was left within the garage may have also been observed by the system according to the processes described herein. In another example, the actuation commands information (e.g., information from the garage access data 428) may be played on a speaker of a smart-home hub device 202 (e.g., after a person walks into their house from the garage). In a delivery driver context, the delivery driver may also be permitted access to the garage by scanning a label, code, or electronic device affixed to or otherwise associated with a package. If the code is known to the system, access to the garage is granted. The system may then also send an alert to the client device 214, 216, 230 that their package has been delivered. In one example, a tracking number may be determined from an email receipt from when an item was purchased online. In other examples the tracking number of a package may be received from the website on which the package was ordered. Once the tracking number is known to the system, a code indicating that tracking number may be scanned by presenting the code to the A/V device 210 when the package is being delivered. If the code matches the code determined from an email receipt or received from the website, the garage door may be opened to allow a delivery driver to place the package inside. The A/V device 210 may also capture image data to determine when the delivery driver is done delivering the package(s), and subsequently send an actuation command to close the garage door. In the instance of package delivery, a code associated with a package may only permit access to the garage once. In this way, a code could not be duplicated to allow access after the package has already been delivered. That is, a code associated with a package expires after one use.

At block B908, a signal is transmitted to the speaker to cause the speaker to emit audible information about security alerts generated by a security system. The signal with the audio instructions/message may be transmitted to the speaker from the A/V device 210, the client device 214, 216, 230, the smart-home hub device 202, and/or the backend server 224. The speaker may be the speaker 330 of the A/V device 210, a speaker of a client device 214, 216, 230, a speaker of a smart-home hub device 202, a standalone speaker, a speaker of a sound system of a vehicle, or any other device with a speaker.

In various embodiments, the speaker, A/V device 210, and other devices of the system (e.g., devices shown in FIG. 2) are connected to a security system. The security system may be, for example, the security monitoring service 228. An audio announcement played on a speaker may be related to information received from the security system. For example, if there is a reported break-in, fire, shooting, or any other event in the area, an audio announcement may be transmitted to a speaker as described herein. In various embodiments, the security system may be a security system for the premises on which the garage is located. Accordingly, an audio announcement may include any information related to the state of the security system (e.g., whether any alarms have been triggered, any out of normal range sensor measurements, etc.). In some embodiments, the audio announcement may also be information received from the security system comprises a number of security alerts generated by the security system only while the vehicle was outside the garage.

In various embodiments, a signal may be transmitted to a display or other visual indicator such as a light or lights to communicate to a driver of a vehicle or a person generally. The signal may be transmitted in ways similar to the signal of FIG. 9. For example, red and green lights may be mounted inside the garage that tells the car to keep moving forward (green) when parking or to stop (red). In another example, information may be communicated to a client vehicle device that has a display. Security alerts and/or other information may therefore be displayed on a screen or interface of the display of a client vehicle device. The information displayed may include any information that may be communicated via audio instructions, such as security alerts, actuation commands, and/or instructions to move a vehicle as described herein.

Figure 10:
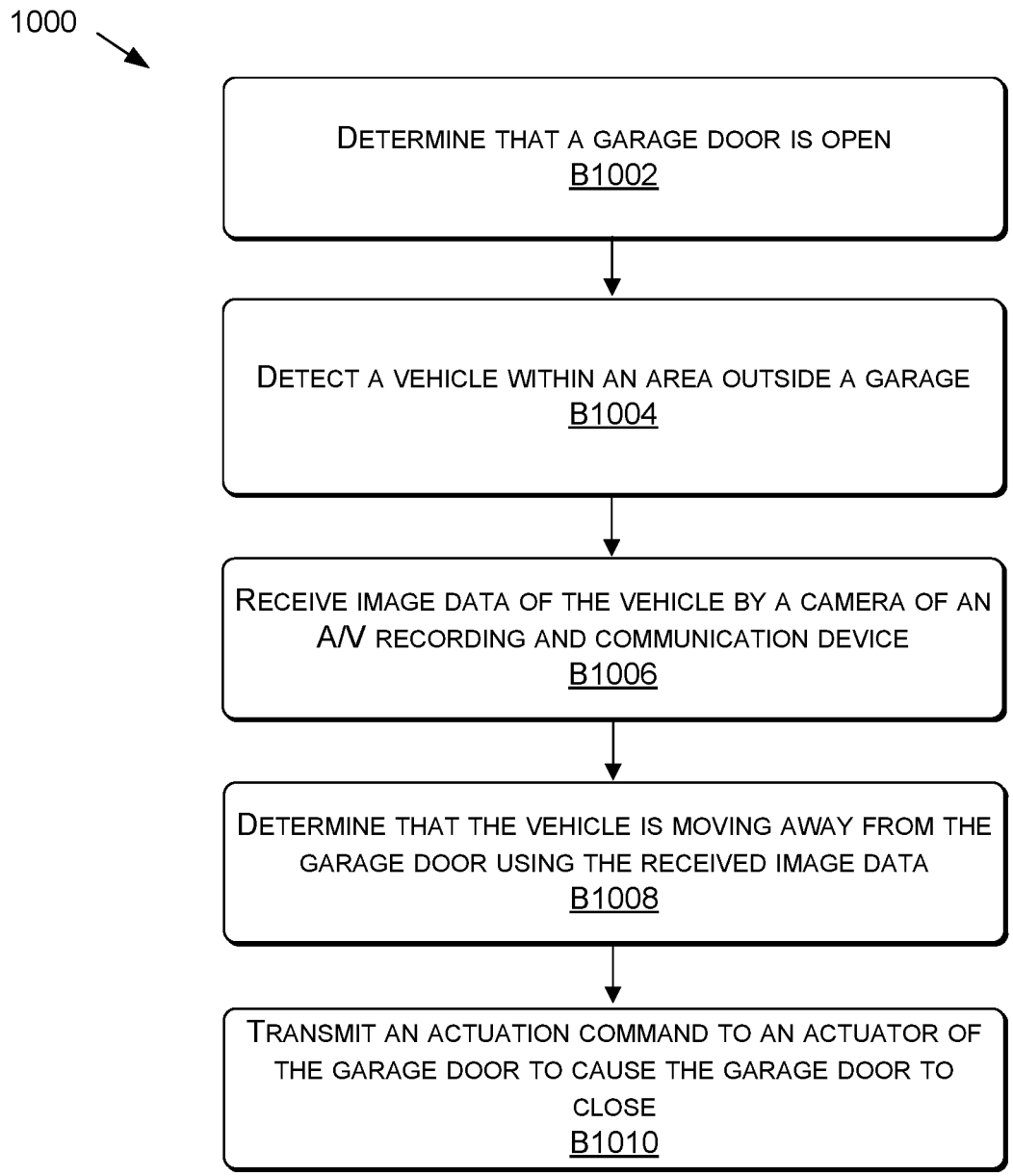
FIGS. 10 and 11 are flowcharts illustrating example processes for detecting a vehicle and closing a garage door, according to various aspects of the present disclosure.
Figure 11:
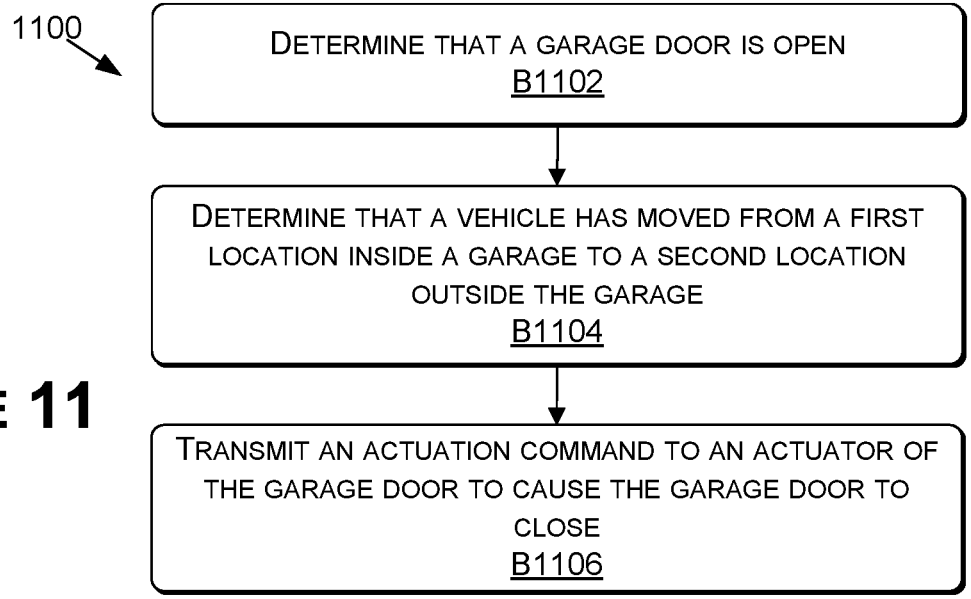

FIGS. 10 and 11 are flowcharts illustrating example processes 1000 and 1100 for detecting a vehicle and closing a garage door, according to various aspects of the present disclosure. At block B1002, a garage door is determined to be open. For example, the A/V device 210 may determine that a garage door is open based on image data 406 generated by the A/V device 210. The image data 406 may depict a garage door (e.g., the garage door 162) or an opening (e.g., the opening 116) indicating that the garage door is open within a field of view of the A/V device 210 (e.g., a field of view of the camera 314 and/or a field of view of the motion sensor(s) 326). The backend server 224 may receive, using the communication module 504, the image data 406. In some examples, the backend server 224 may receive the image data 406 from the A/V device 210, the smart-home hub device 202, and/or the client device 214, 216, 230. In some examples, the backend server 224 may receive the image data 406 based on the A/V device 210 detecting motion.

At block B1004, a vehicle is detected within an area outside a garage. The garage is associated with the garage door. For example, the vehicle detected may be the vehicle 130 as shown in FIG. 1. At block B1006, image data of the vehicle is received by a camera of the A/V device 210. The image data may be the image data 406. At block B1008, the vehicle is determined to be moving away from the garage door using the received image data (e.g., the image data 406). Optionally, the vehicle moving away from the garage may be identified by comparing the received image data of the vehicle with previously stored image data of the vehicle. In various embodiments, the vehicle may be identified using any of the various processes for identifying a vehicle according to the various embodiments described herein. In this way, the system may be able to record (e.g., in the garage access data 428), the specific vehicle that has left (or is leaving) the garage. At block B1010, an actuation command is transmitted to an actuator of the garage door to cause the garage door to close. In various embodiments, the actuation command may be transmitted after or in response to determining that the vehicle is moving away from the garage door (block B1008). In various embodiments, the actuation command may be transmitted after or in response to the vehicle being identified.

In various embodiments, the vehicle may be identified by comparing the received image data of the vehicle with previously stored image data of the vehicle. This process may use a computer vision process. A determination that the vehicle is moving away from the garage door may also include using a computer vision process on the received image data of the vehicle. Determining that the vehicle is moving away from the garage door may also be based on GPS location information or other geolocation information associated with the vehicle. The GPS and/or geolocation information may be received at the A/V device 210, the backend server 224, the smart-home hub device 202, and/or the client device 214, 216 from vehicle via an electronic device in the vehicle (e.g., the client vehicle device 230).

In various embodiments, a garage door that is unmonitored by a human may include an alarm siren and flashing lights. In this manner, the siren and flashing lights can be used to warn when the garage door is closing. The siren and flashing lights may be triggered based on a signal from an A/V device, which may cause the garage door to move and/or detect that the garage door is moving. Other alert methods may also be used to indicate that a garage door is closing, regardless of whether the garage door is monitored or not. For example, an alert signal may be sent to client devices, A/V devices, or any other type of device. The alert signal may cause a device to transmit an audio alert, a visual alert, a somatosensory alert (e.g., cause a device to vibrate), etc. The alert signals may be sent to a device or devices that are within a predetermined distance from the garage. Alert signals may be sent according to other criteria as well, for example devices that are connected to a Wi-Fi network of a home attached to the garage, devices that are within a field of view of any A/V devices, etc. In various embodiments, certain devices may be sent an alert when a garage door is opened or closed no matter how close the device is to the garage.

At block B1102, a garage door is determined to be open. Block B1102 may be similar to the block B1002 of FIG. 10. For example, the A/V device 210 may determine that a garage door is open based on image data 406 generated by the A/V device 210. The image data 406 may depict a garage door (e.g., the garage door 162) or an opening (e.g., the opening 116) indicating that the garage door is open within a field of view of the A/V device 210 (e.g., a field of view of the camera 314 and/or a field of view of the motion sensor(s) 326). The backend server 224 may receive, using the communication module 504, the image data 406. In some examples, the backend server 224 may receive the image data 406 from the A/V device 210, the smart-home hub device 202, and/or the client device 214, 216, 230. In some examples, the backend server 224 may receive the image data 406 based on the A/V device 210 detecting motion.

At block B1104, a vehicle is determined to have moved from a first location inside a garage to a second location outside the garage. The garage door is associated with the garage (e.g., the garage door 162). The determination may be made using the image data 406 captured by the A/V device 210. At block B11106, an actuation command is transmitted to an actuator of the garage door to cause the garage door to close when the vehicle is determined to be outside the garage. The first location inside the garage and the second location outside the garage may be determined relative to the garage door (e.g., the garage door 162) and/or a garage opening (e.g., the opening 116).

In various embodiments, the determination that the garage door is open (e.g., blocks B1002, B1102) is based on receiving one or more readings from one or more sensors associated with the garage door. For example, these one or more sensors may indicate a state of the garage door (e.g., open, closed, somewhere in between). In these embodiments, the garage door may be determined to be open without using the image data 406 (e.g., images captured showing the garage door and/or an opening in a garage). Sensors associated with the garage door may also be used to determine if/when the vehicle is outside the garage (and may be used instead of or in combination with determining that the vehicle is outside the garage based on the image data 406). For example, the sensor 160 of FIGS. 1D and 1E may be used to ensure that the vehicle is outside of the garage before sending an actuation command to close the garage door.

In various embodiments, the determination that the vehicle has moved from the first location in the garage to the second location outside the garage may include a determination that the vehicle has moved by performing a computer vision process on video and/or still images of the vehicle captured by the camera and/or motion sensors of the A/V device 210. In various embodiments, the determination that the vehicle has moved outside the garage may be based on captured image data of the vehicle over a specified or unspecified time interval. The first location inside the garage and the second location outside the garage may also be determined, at least in part, based on a specified or unspecified time interval. For example, a vehicle moving out of a garage may be expected to take at least a minimum amount of time to exit a garage (e.g., based on the size of the garage, a maximum speed at which the vehicle may move out of a garage, distance the vehicle must travel to exit the garage, etc.). The system may consider this minimum amount of time when determining whether the vehicle has actually moved outside the garage. If it appears that the vehicle is outside of the garage, but the minimum amount of time has not elapsed since the vehicle was inside the garage, the system may wait to transmit an actuation signal to the garage door until it has a higher level of certainty that the vehicle is actually fully outside the garage.

In various embodiments, the determination that the vehicle has moved from the first location of the vehicle and the second location of the vehicle may be determined based on comparing a current captured image data of the vehicle with a previously captured and stored image data of the vehicle. In various embodiments, the determination that the vehicle has moved from the first location of the vehicle and the second location of the vehicle may be determined based on GPS location information received from an electronic device located within the vehicle.

In various embodiments, an actuation command may be transmitted to an actuator of a garage door to close the garage door using on similar processes and components as described herein with respect to FIG. 8. For example, a process for closing a door may include making a determination that a garage door is open (e.g., similar to B1002, B1102). The process further includes detecting a vehicle within an area outside the garage (e.g., similar to B804, B1004). The process further includes determining that the vehicle is moving away from the garage door, for example based on image data captured by an A/V device (e.g., similar to B1008). The process further includes receiving, by a camera of the A/V device, image data of an object associated with the vehicle. The object may be identified based on comparing the received image data of the object with previously stored image data of the object. Other methods of identifying objects are also described herein. The process further includes transmitting an actuation command to an actuator of the garage door to cause the garage door to close based on identification of the object. For example, if an A/V device identifies a license plate of a vehicle that has left the garage, an actuation command may be transmitted to close the garage door. In some embodiments, an electronic device (e.g., the client device 214, 216, 230) may be communicated with before closing the garage door. For example, the system may determine based on information from a client's smartphone or from a client vehicle device that a vehicle and/or client has left the garage. That information may include geolocation data. A determination may also be made that the vehicle is gone based on other information related to a vehicle and/or a client device. For example, if a client device is moving away from a garage at a speed, cadence, or other factor that is typical of movement of a vehicle driving forward on a road (e.g., highway, street, etc.), the system may assume that the client is in the vehicle and that the vehicle is outside of the garage. In this way, the system may determine that it is likely that the vehicle is outside of the garage without using geolocation or image data. In some embodiments, the system may use this determination along with geolocation and/or image data to increase a level of confidence that a vehicle is outside of a garage.

Figure 12:
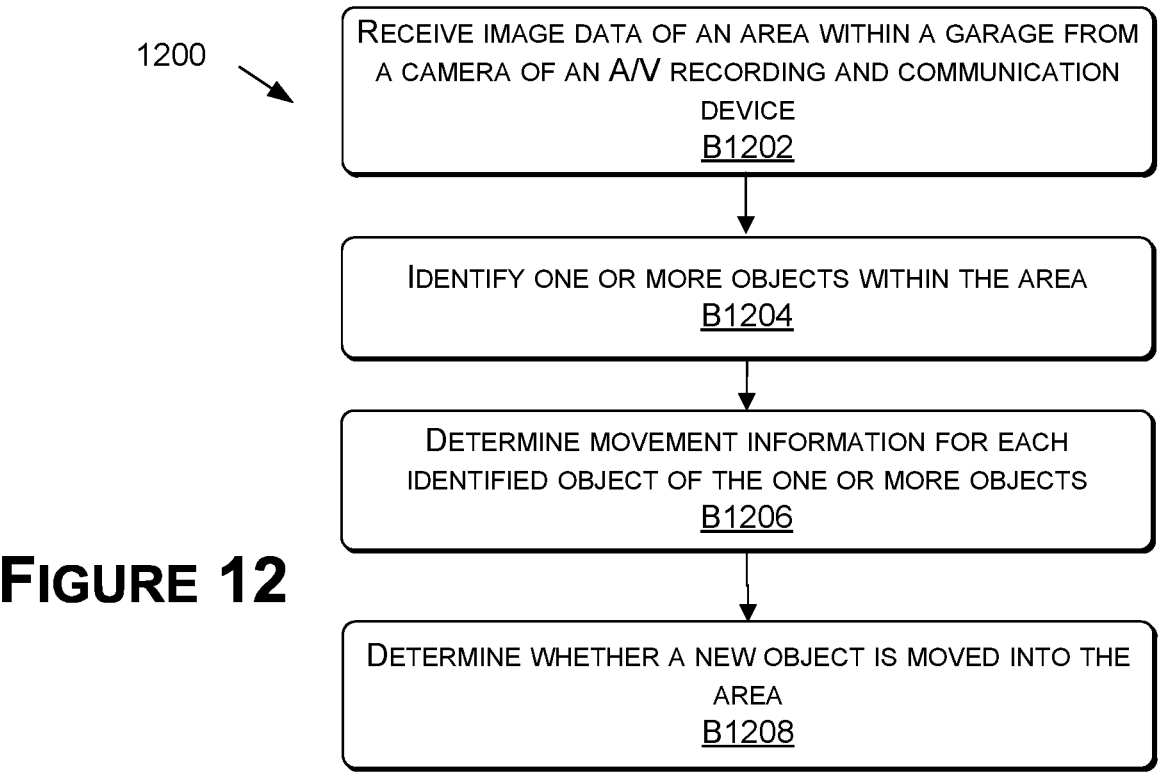
FIG. 12 is a flowchart illustrating an example process for monitoring the movement of objects inside of a room, according to various aspects of the present disclosure.

FIG. 12 is a flowchart illustrating an example process 1200 for monitoring the movement of objects inside of a room, according to various aspects of the present disclosure. At block 1202, image data of an area within the garage is received from an A/V recording and communication device. The area may be a predefined area, such as a specific area on the floor, a shelving unit (e.g., the shelves 140), or any other area within a garage. For example, the backend server 224 may receive, using the communication module 504, image data 406 generated by the A/V device 210 of the area of the garage. As described herein, areas other than the inside of a garage may also be monitored according to the process 1200 (e.g., other rooms in a building, an outside area, etc.). The image data 406 may depict objects within a field of view of the A/V device 210 (e.g., a field of view of the camera 314 and/or a field of view of the motion sensor(s) 326). In some examples, the backend server 224 may receive the image data 406 from the A/V device 210, the hub device 202, and/or the client device 214, 216, 230. In some examples, the backend server 224 may receive the image data 406 based on the A/V device 210 detecting motion within the line of sight of a camera and/or motion sensor(s). The area of the garage may be an whole area inside a garage or may be part of a garage. In various embodiments, multiple A/V devices may be used to monitor different areas and/or to provide higher confidence levels of monitoring one or more areas in common. The area monitored may be, for example, the area of a garage monitored by the security camera 142 of FIGS. 1B and 1C. The area monitored may be, for example, the area monitored by the security camera 118 of the garage 114 of FIG. 1A.

At block B1204 one or more objects are identified within the monitored area of the garage. The one or more objects may be identified by the various processes, methods, and/or algorithms described herein (e.g., an object recognition algorithm). In addition to identifying discrete objects within the monitored area, the system may identify what those objects are (e.g., a vehicle, a crate, a lawnmower, a box, a barrel, etc.). The system may also identify a location within the garage (and/or within the monitored area of the garage) associated with each of the one or more objects. In this way, an inventory may be created and stored that includes objects in a garage. In some embodiments, images of the objects in the garage may be timestamped or saved along with time and date information (e.g., as metadata). Other information stored with and/or superimposed over an image may include the object identities determined from the image data, locations of the objects, etc. This information may, for example, be stored as identification data associated with the predefined area and the recognized one or more objects. This identification data may be stored as part of the garage inventory data 422 as described herein.

At block B1206, movement information is determined for each identified object of the one or more objects. For example, movement information may include information about whether any of the identified objects have been moved, for example by comparing a current timestamped location associated with the object with a previous timestamped location associated with the object. In another example, movement information may be determined by comparing image data from a first time with image data taken at a second time. In another example, movement information may be determined based on identified movement within the garage. Movement information may be stored as part of the garage inventory data 422 as described herein.

In various embodiments, alerts may be transmitted to a client device when the object is determined to have been moved. For example, alerts may be transmitted from the A/V device 210, the backend server 224, the smart-home hub device 202, or another device to the client device 214, 216, 230. In some embodiments, movement of an object meets a particular criterion in order to trigger an alert. For example, an alert may be based on a determination that an object is no longer present within the garage and/or within the monitored area. In another example, an alert may be based on the type of object that has been identified. For example, expensive identified items like vehicles, lawnmowers, skis, etc. may trigger alerts, while small boxes or other items in a garage not identified or designated by a client as valuable may not trigger alerts. In another example, an alert may be triggered based on the presence and/or absence of a client device. If a client device is located in or around the garage, movement of objects may not trigger alerts. However, if a client device is not present or nearby when objects are moved, an alert may be triggered. In another example, alerts may be triggered based on recognition of persons in and around the garage. For example, facial recognition technology may be used to recognize a person in or around the garage. If the person is authorized and/or known, movement of objects may not trigger an alert, while movement when no recognized persons are present may trigger an alert. Regardless of whether an alert is triggered in any of these scenarios, movement of objects may still be recorded as part of the garage inventory data 422, including any persons or client devices present, what objects have moved, what objects have been removed, etc.

In various embodiments, the system may determine if the movement of an object is authorized. The determination of whether an object movement is authorized may be similar to the criteria for whether to send an alert regarding object movement discussed above. If movement of an object is not authorized, the system may transmit an audio command to a speaker of an A/V device, a client device, a smart-home hub device, etc. including an instruction to return a moved object to its previous location. The instruction may instruct a person to put an object back in a specific location that was previously determined by a client. The instruction may instruct a person to put an object back in a specific location that is/was determined based on historical image data of the object and where it is typically placed/located within a garage. The instruction may also be a generic instruction to put the object back without specifying a particular location where the object must be put back.

At block B1208, whether anew object is moved into the area is determined. Similar to how objects are identified in a first instance, new objects (e.g., the crate 150 of FIG. 1C) may be identified as added to a monitored area. Information about new objects may be reflected in the garage inventory data 422. Information about new objects may include a time the objects were added, what type of object was added, a person identified as present when the object was added, a client device present when the object was added, a location of the added object.

Information reflected in the garage inventory data 422 may also include points of ingress/egress through which tracked objects moved. For example, if an object is removed from the garage, an A/V device may capture data that indicates the object was taken out of the garage through a garage door opening. An object may also be taken out through a window or doorway of the garage. Similar information may be determined for how objects are added to the garage. Information about points of ingress/egress may be saved in and reflected in the garage inventory data 422. In various embodiments, location information for tracked objects in the garage may be determined based on a particular plane within the garage.

Figure 13:
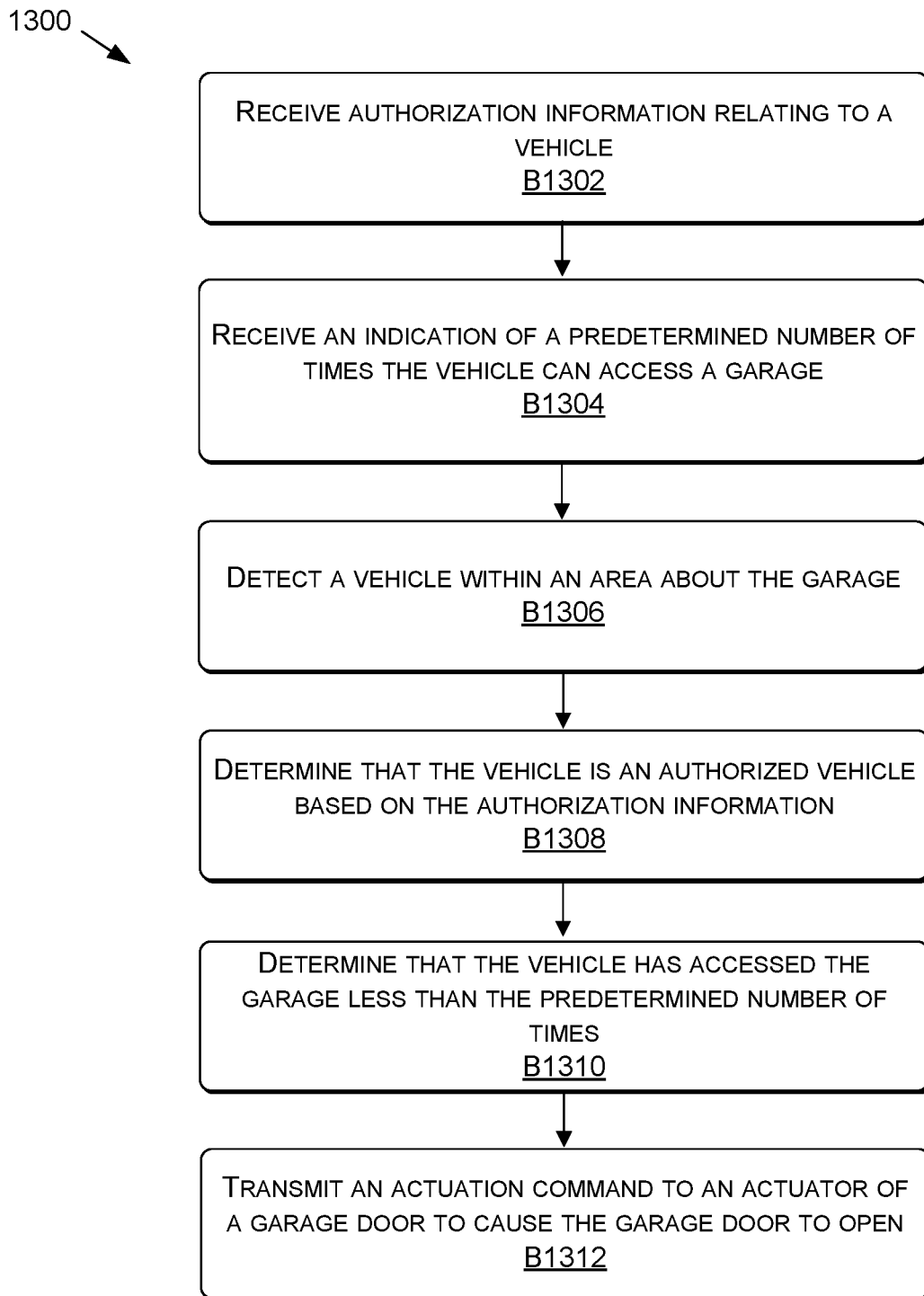
FIG. 13 is a flowchart illustrating an example process for providing guest authorization to access a garage, according to various aspects of the present disclosure.

FIG. 13 is a flowchart illustrating an example process 1300 for providing guest authorization to access a garage, according to various aspects of the present disclosure. At block B1302, authorization information relating to a vehicle is received. The vehicle may be, for example, a guest vehicle to whom a client that controls a garage wishes to grant access to. For example, the backend server 224 may receive, using the communication module 504, the authorization information from the hub device 202 and/or the client device 214, 216, 230.

At block B1304, an indication of a predetermined number of times the vehicle may access a garage is received. The predetermined number of times may be received from a client device, where the client inputs the number of times they wish for the guest vehicle to be able to access the garage. In various embodiments, the access may be granted for a predetermined period of time instead of a predetermined number of times. In another example, the guest vehicle may be able to access the garage for a predetermined number of times, as long as those times are within a predetermined period of time. In another example, the predetermined number of times and/or amount of time during which a guest may access a garage is a default setting rather than set by the client.

At block B1306, a vehicle is detected within an area about the garage (e.g., similar to block B802 of FIG. 8). At block B1308, the vehicle is determined to be an authorized vehicle based on the authorization information. The authorization information may include information about the guest vehicle such as a license plate number, make, model, color, or any other aspect of a vehicle used to identify a vehicle as described herein. The process to determine that the vehicle is an authorized vehicle may be similar to any or all of blocks B804, B806, B808, and/or B810 as described herein.

At block B1310, the vehicle is determined to have accessed the garage less than the predetermined number of times. If the vehicle had already accessed the garage equal to or more times than the predetermined number of times, access to the garage is denied (e.g., the garage door does not open). In various embodiments, a predetermined amount of time may be used instead of or in addition to a predetermined number of times that a guest vehicle is permitted to access a garage. In such embodiments, block B1310 may also or instead determine whether the vehicle is attempting to access the garage within the predetermined amount of time. If not, access is denied. If access to the garage is not denied, the process 1300 proceeds to block B1312. At the block B1312, an actuation command is transmitted to an actuator of a garage door to cause the garage door to open. In this way, a homeowner or other type of client may authorize guests to access their garage by entering information about the guests' vehicle into their client devices. Then when the guest vehicles approach the garage, the garage door is opened based on the embodiments described herein to provide access to the garage.

Figure 14:
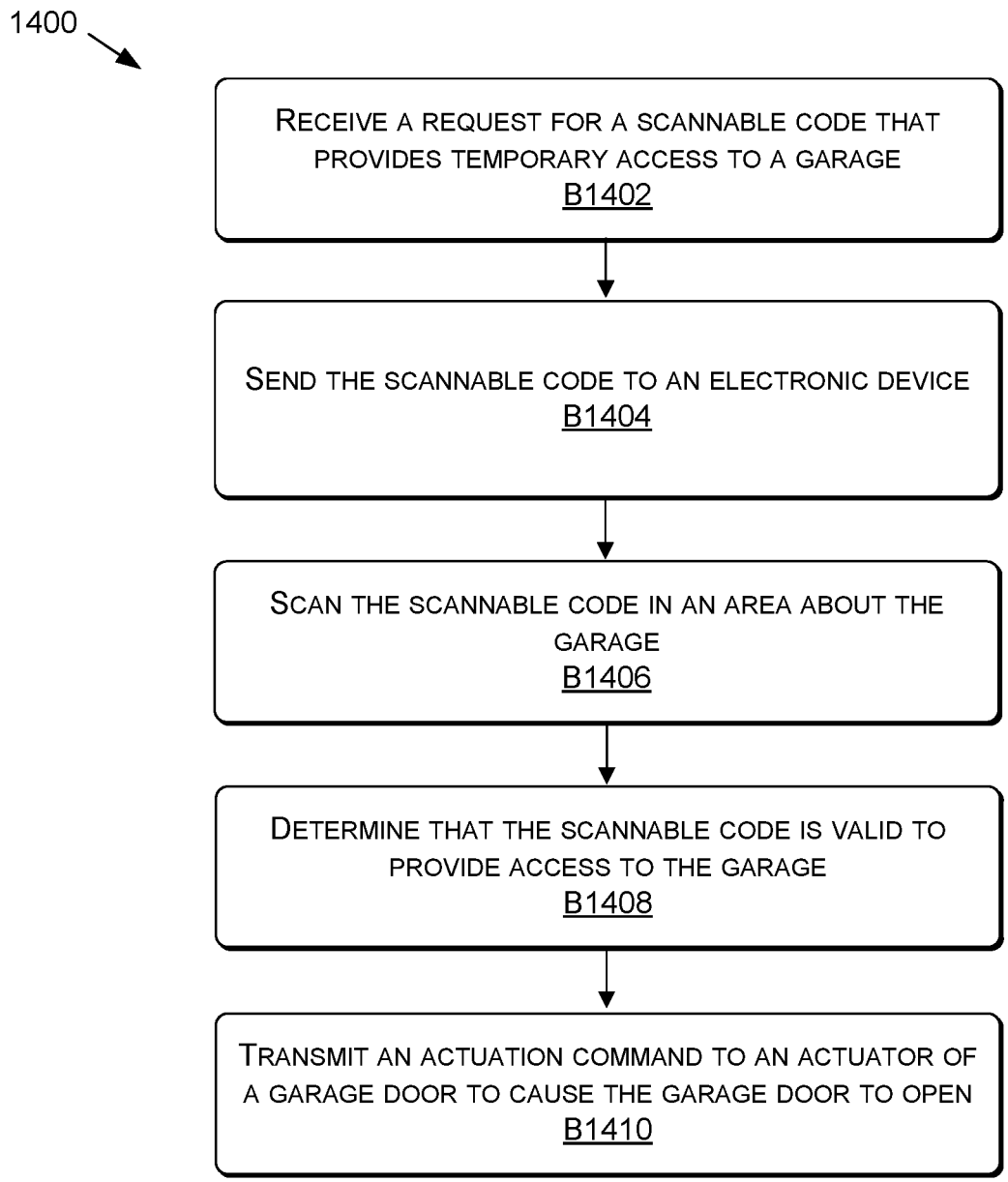
FIG. 14 is a flowchart illustrating an example process for providing scannable codes for authorizing access to a garage, according to various aspects of the present disclosure.

FIG. 14 is a flowchart illustrating an example process 1400 for providing scannable codes for authorizing access to a garage, according to various aspects of the present disclosure. At block B1402, a request for a scannable code that provides temporary, limited time, or other limited access to a garage (e.g., for a guest) is received. For example, the backend server 224 may receive, using the communication module 504, from the A/V device 210, the hub device 202, and/or the client device 214, 216, 230. Scannable codes may be an NFC code, Bluetooth code, QR code, bar code, RFID code, or any other type of scannable code, whether visually or electronically scannable.

At block B1404, the scannable code is sent to an electronic device. The scannable code is sent to an electronic device so that the scannable code may be presented using the electronic device to permit access to the garage (e.g., cause the garage door to open). The scannable code may be sent to the client device that requested the code, and the code may then be sent onto another electronic device that allows the possessor of the code to access the garage. In various embodiments, the scannable code may also be sent to an electronic device that did not request the code. For example, the original request for the code may also include information about an electronic device (e.g., an email address, phone number, other identifying information) to whom the scannable code should be sent.

At block B1406, the scannable code is scanned in an area about the garage. As described herein, scannable codes may be different types of codes and may be scanned in different ways. For example, an electronic scannable code may be scannable by using BLE, NFC, RFID, or other type of short range communication. A visually scannable code (e.g., a bar code, a QR code) may be scannable by a camera or other sensor of an A/V device and/or keypad.

At block B1408, the scannable code is determined to be valid to provide access to the garage. For example, the backend server 224 may receive information relating to a code scanned by the A/V device 210, and the backend server 224 may determine that the code is valid and send an actuation command to an actuator of the garage door (either directly or via another device such as the A/V device 210) as shown at block B1410.

Visually scannable codes may be presented to be scanned in different ways. For example, a scannable code may be presented on the screen of an electronic device so that it may be visually scanned. Paper with the code printed thereon may be used (e.g., a sticker), and affixed to a car window, bumper, or other part of a car.

In various embodiments, facial recognition technology may be used instead or in addition to the scannable codes described above. That is, a face of a person may be used as a visual scannable code. In such embodiments, a client device may capture with a camera one or more images of a guest to whom the client would like to grant access (including, e.g., an image of the face of the guest). Using facial recognition, the face of the guest itself is the scannable code. In various embodiments, other biometric information about a person may be used as a scannable code. In contrast to the process 1400, the scannable code (e.g., an image of a face) is provided by the client device, rather than the client device merely requesting a scannable code. The guest may then present their face to a camera or other sensor in an area about the garage. If the persons face is valid, access to the garage is granted (e.g., an actuation command is sent to the actuator of the garage door).

In various embodiments, scannable codes may be used to allow a delivery driver into a garage to place a package for delivery. For example, the scannable code may be part of a label on a package that is delivered. The scannable code may permit access to leave the package inside the garage. A scanned code may also trigger a notification to a client device that the package has been delivered. A notification to a client device may also be generated in response to an A/V device detecting that the package has been left in the garage (e.g., using internal garage monitoring as described herein such as in FIG. 12). In various embodiments, scannable codes as described herein may cause other signals to be sent, functions to be performed, etc. For example, a particular scannable code may cause the garage door to close after a predetermined amount of time (e.g., for a package delivery where the door does not need to be open very long). The predetermined amount of time may also be based on the number of packages to be delivered. In another example, the number of packages to be delivered may be known, and the scannable code causes the garage door to stay open until the correct number of packages have been placed inside the garage (and detected by A/V device(s)) and the delivery driver is detected to be out of the garage. In another example, the scannable code may cause an alert to be sent to a security system or security monitoring service or may cause a security system to be disarmed and armed again after the delivery is complete. In another example, the scannable code may cause certain lights to be turned on or off (e.g., in the garage).

Figure 15:
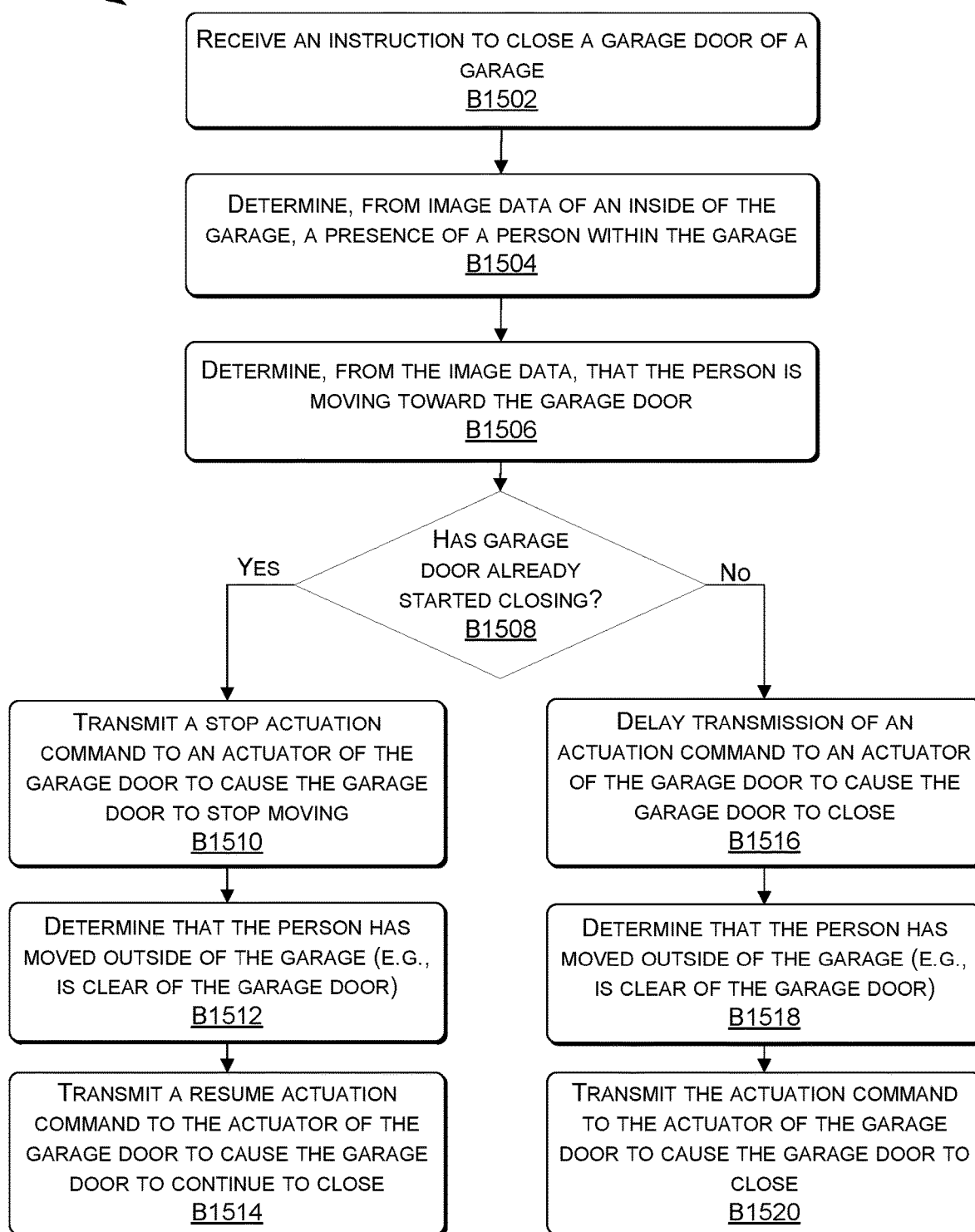
FIG. 15 is a flowchart illustrating an example process for providing a delay in closing a garage door to allow a person to exit a garage, according to various aspects of the present disclosure.

FIG. 15 is a flowchart illustrating an example process 1500 for providing a delay in closing a garage door to allow a person to exit a garage, according to various aspects of the present disclosure. At block B1502, an instruction is received to close a garage door of a garage. This instruction may come from a standard garage door opener remote, a button press of a keypad (e.g., the keypad 156), a button press of a garage door control interface (e.g., the garage door control interface 632), a voice command, or any other method. In an alternative embodiment, a device of the system (e.g., a device of FIG. 2) may not receive the instruction to close the garage door. Instead, a device of the system may determine that the garage door has begun to close. For example, a camera and/or sensor(s) of the A/V device 210 or any other device may capture data (e.g., image data) that indicates the garage door is closing. In various embodiments, a button may be pressed by a person in the garage, such that the instruction to close the garage door is sent directly to the garage door opener. In such embodiments, the instruction may not be received by any of the A/V device 210, the client devices 214, 216, 230, the smart hub 202, the backend server 224, etc. Rather, the system may determine, based on image data, information from a garage door opener system, and/or elsewhere that an instruction to close the garage door has been sent to the garage door opener.

At block B1504, a presence of a person within the garage is determined from image data of an inside of the garage. If a person is in the garage, at block B1506 the person is moving toward the garage door is determined from the image data. If the person is not moving toward the garage door (e.g., if they are still, if they are moving in direction away from the garage door such as toward a different doorway of the garage), the system may not be concerned about providing time for the person to get out of the garage before the garage door closes. For example, if a person has just parked her vehicle in a garage attached to a house, that person may then walk into the house from the garage. Accordingly, the system determines whether the person is walking toward the garage door (or an opening of the garage for the garage door) to determine whether to give the person more time to get out of the garage before closing the garage.

In some embodiments, the system may use other factors for context when determining whether a person is trying to exit out a garage opening after an instruction to close the garage door is received. For example, the system may analyze typical movement patterns of people within the garage, what objects are present or not present, and movement detected in the time preceding a person trying to leave through a garage door as its closing. For example, a person may commonly try to run out of the garage shortly after a car has pulled out of the garage (e.g., a family already in the car waiting for one member of the family in the driveway before leaving). In another example, the system may recognize that a person often tries to run out after closing a garage door after placing a lawnmower in the garage. By using movement and/or the presence/absence of objects as context, the system may more accurately determine if a person is trying to run out of the garage.

In various embodiments, the system may determine that a person is trying to run out of the garage based on a sensor in a garage door opening, such as the sensor 160 of FIGS. 1D and 1E. In such an embodiment, if the sensor is tripped while the garage door is moving (or is about to move), the system may determine that a person is trying to run out of the garage. In this example, the system may wait until the sensor 160 returns to a normal state (e.g., does not sense the presence of anyone in the opening of the garage 152) before closing the garage door (or finishing closing the garage door).

At block B1508, the garage door is determined to have already started closing. If the garage door has started closing (Yes) the process 1500 proceeds to block B1510. If the garage door has not started closing (No) the process 1500 proceeds to block B1516.

At the block B1510, a stop actuation command is transmitted to an actuator of the garage door to cause the garage door to stop moving. This allows for more time for the person moving toward the garage door to get out of the garage before the door closes. At the block B1512, that the person has moved outside of the garage is determined (e.g., is clear of the garage door, is clear of the opening 116 of the garage 114, etc.). At block B1514, a resume actuation command is transmitted to the actuator of the garage door to cause the garage door to continue to close. Once the person is clear of the garage door and completely outside a garage, the resume actuation command is sent so that the garage door may finish closing.

At the block B1516, transmission of an actuation command to an actuator of the garage door to cause the garage door to close is delayed. In other words, if the garage door has not started closing and the system determines that a person is going to try to get out of the garage before the garage door closes, the system may delay sending the actuation command until the person is out of the garage and clear of the garage door. At block B1518, it is determined that the person has moved outside of the garage (e.g., is clear of the garage door, is clear of the opening 116 of the garage 114, etc.). At block B1520, the actuation command is transmitted to the actuator of the garage door to cause the garage door to close.

In various embodiments, the system may also broadcast an audio message relating to a delay in closing a garage door (whether the garage door has started closing or not). This may be helpful for a person moving out of a garage because the person may be concerned that the garage will not actually close once they are outside of the garage. For example, with respect to the scenario where the garage door starts closing before the person gets out of the garage (e.g., blocks B1510, B1512, B1514), the system may play an audio message over a speaker in the garage or on a client device instructing the person that the garage door closing has been delayed until the person gets outside of the garage. In another example, with respect to the scenario where the garage door starts closing after the person gets out of the garage (e.g., blocks B1516, 1518, 1520), the system may play an audio message over a speaker in the garage or on a client device instructing the person that the garage door will begin closing after the person is outside of the garage.

In various embodiments, various devices may be used to determine when the person moves outside of the garage. For example, referring to FIG. 1A, a combination of the security camera 118 and the light camera 126 may be used to determine that the person has left the garage. In this example, image data captured by the security camera 118 may be used to determine that a person is trying to move out of the garage 114, while image data captured by the light camera 126 is used to determine/confirm that the person has moved outside of the garage 114. In another example, referring to FIGS. 1D and 1E, the sensor 160 installed at a garage door opening may also be used to help determine that the person has moved outside of the garage 152. Specifically, image data from an A/V device may be used to determine that person is moving toward a garage door (e.g., block B1506). A tripping of the sensor 160 may indicate (or help indicate in combination with other information such as image data) that the person has passed through the opening of the garage 152 and has moved outside the garage (e.g., blocks B1512 and B1518).

In various embodiments, A/V devices monitoring the inside of a garage may be used to determine that a person left the garage through a door other than the garage door (e.g., to a yard, to the inside of a house). Upon determining that the person has left the garage, the system may determine that the garage door can be closed.

Figure 16:
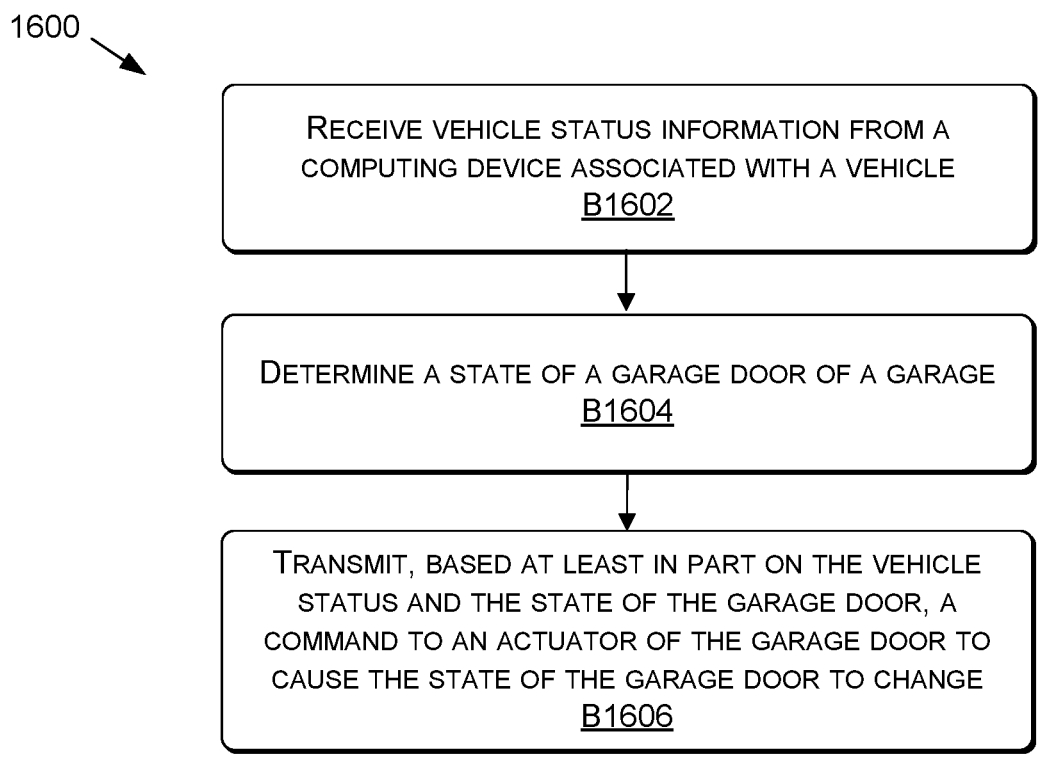
FIG. 16 is a flowchart illustrating an example process for changing the state of a garage door based on vehicle status information, according to various aspects of the present disclosure.

FIG. 16 is a flowchart illustrating an example process 1600 for changing the state of a garage door based on vehicle status information, according to various aspects of the present disclosure. At block B1602, vehicle status information is received from a computing device associated with a vehicle. The computing device may be the client device 230, an on-board diagnostic (OBD) computing device, or other type of computing device that measures or has access to vehicle status information. In one example, the computing device is the client device 230 and accesses the vehicle status information via the OBD interface 634.

At block B1604, a state of a garage door of a garage is determined. For example, the system may determine whether a garage door is open, closed, or in a state somewhere between open and closed. In various embodiments, the system may also determine whether the garage door is moving (e.g., closing, opening). The state of the garage door as determined here may be used along with the vehicle status information to determine if the state of a garage door should be changed (e.g., send an actuation command to an actuator of the garage door).

At block B1606, a command to an actuator of the garage door to cause the stat of the garage door to change is transmitted based at least in part on the vehicle status and the state of the garage door. For example, a vehicle may pull into a garage. The vehicle status information may indicate when the vehicle has been shut off (or if the vehicle is still running). If the garage door is open from the vehicle pulling in, the system waits until the vehicle status information indicates that the car is turned off to close the garage door. This may help, for example, prevent buildup of emissions from the vehicle in the interior of the garage. In another example, the vehicle status information may indicate that a vehicle parked in a garage has been started/turned on. If the garage door is closed or not fully open, the system may send the actuation command to open the garage door based on the assumption that whoever started the car will want to exit the garage soon. This too may help prevent buildup of emissions from the vehicle in the interior of the garage.

In various embodiments, different information than the vehicle status information from an electronic device of a vehicle may be used to determine vehicle status information. For example, an audio sensor such as the microphone 328 of the A/V device 210 may be used to hear engine noises and determine whether a car is turned on or off. In other examples, image data may be used to determine if a car is running or not. In these embodiments, the system may determine whether a vehicle is running or not, which may be used to determine whether a state of a garage door should be changed.

In another example, a garage door may be opened (or start opening) as a vehicle approaches a garage. However, the vehicle may stop in the driveway and be shut off (e.g., the driver is just planning to park the car in the driveway rather than the garage). In this scenario, the garage may be closed once the car is shut off, as the vehicle is not likely to be moved into the garage when it is shut off.

In various embodiments, the vehicle status may be used for other purposes, such as alerts or audio messages sent to the client device 214, 216, 230, the smart hub device 202, the A/V device 220, and/or any other device. For example, if a vehicle should be serviced (e.g., tire pressure adjusted, oil change, etc.), needs gas, or any other item related to the vehicle status information, a text alert, audio message, or other sort of notification may be sent to notify a client.

Figure 17:
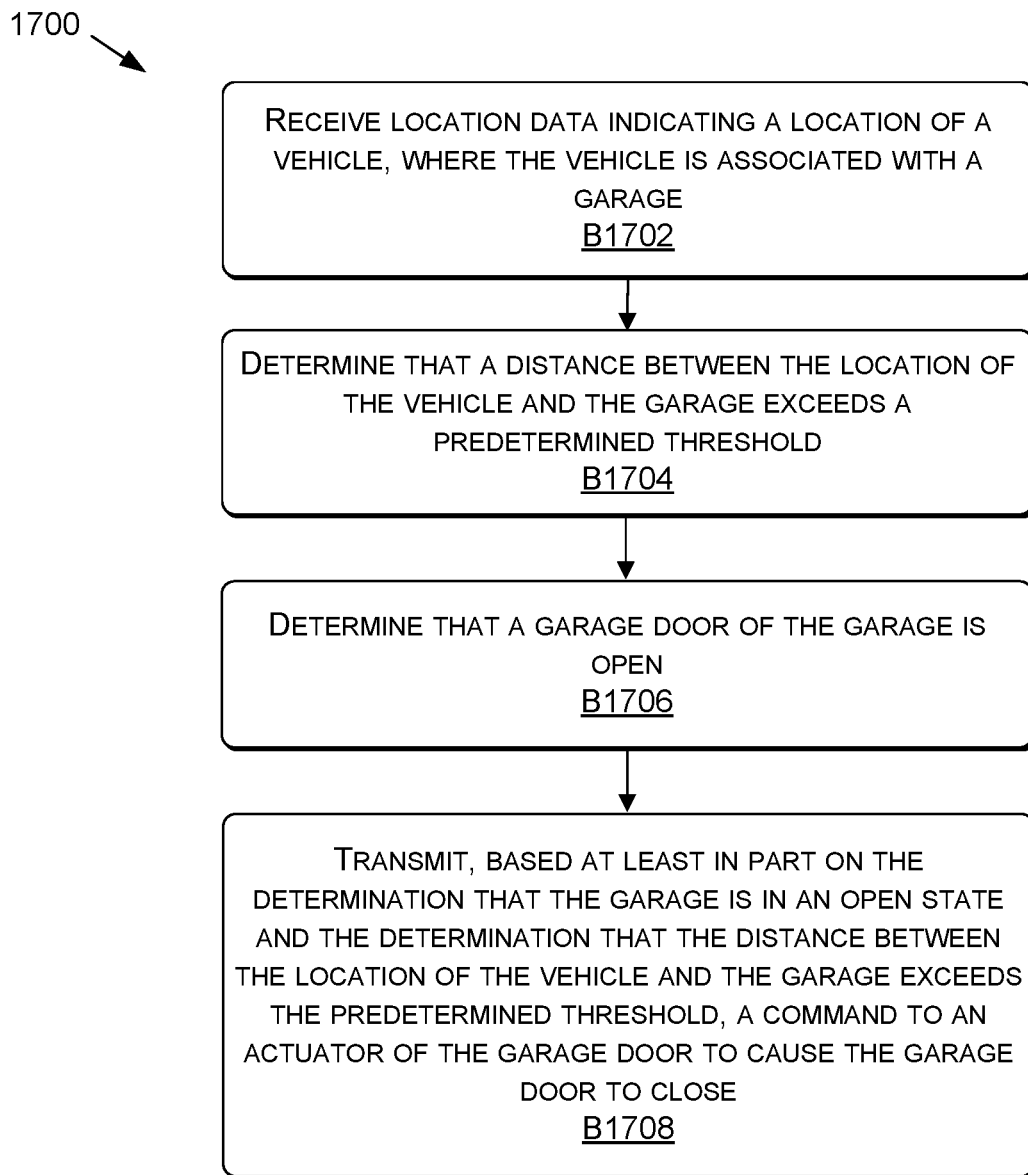
FIG. 17 is a flowchart illustrating an example process for using a vehicle location to determine whether a garage door should be closed, according to various aspects of the present disclosure.

FIG. 17 is a flowchart illustrating an example process 1700 for using a vehicle location to determine whether a garage door should be closed, according to various aspects of the present disclosure. At block B1702, location data is received indicating a location of a vehicle. The vehicle is associated with a garage. For example, the vehicle may belong to an owner or occupier of a home associated with the garage. The location data may be geolocation data from, for example, the client vehicle device 230.

At block B1704, a distance between the location of the vehicle and the garage is determined to exceed a predetermined threshold. That is, the system determines if the vehicle is a certain distance or greater away from the garage. At block B1706, a garage door of the garage is determined to be open. At block B1708, a command to an actuator of the garage door to cause the garage door to close is transmitted based at least in part on the determination that the garage is in an open state and the determination that the distance between the location of the vehicle and the garage exceeds the predetermined threshold. In this way, the system may determine that a door should be closed when a vehicle has moved or is a certain distance away from the garage. This may be valuable, for example, when a user prefers to send actuation commands to their garage door manually, but may forget to do so in certain instances. In various embodiments, an alert may be generated and sent to a client device, hub device, and/or a security monitoring service when a vehicle moves or is a predetermined distance from the garage and the garage door is open (whether or not an actuation command is automatically transmitted or not).

Figure 18:
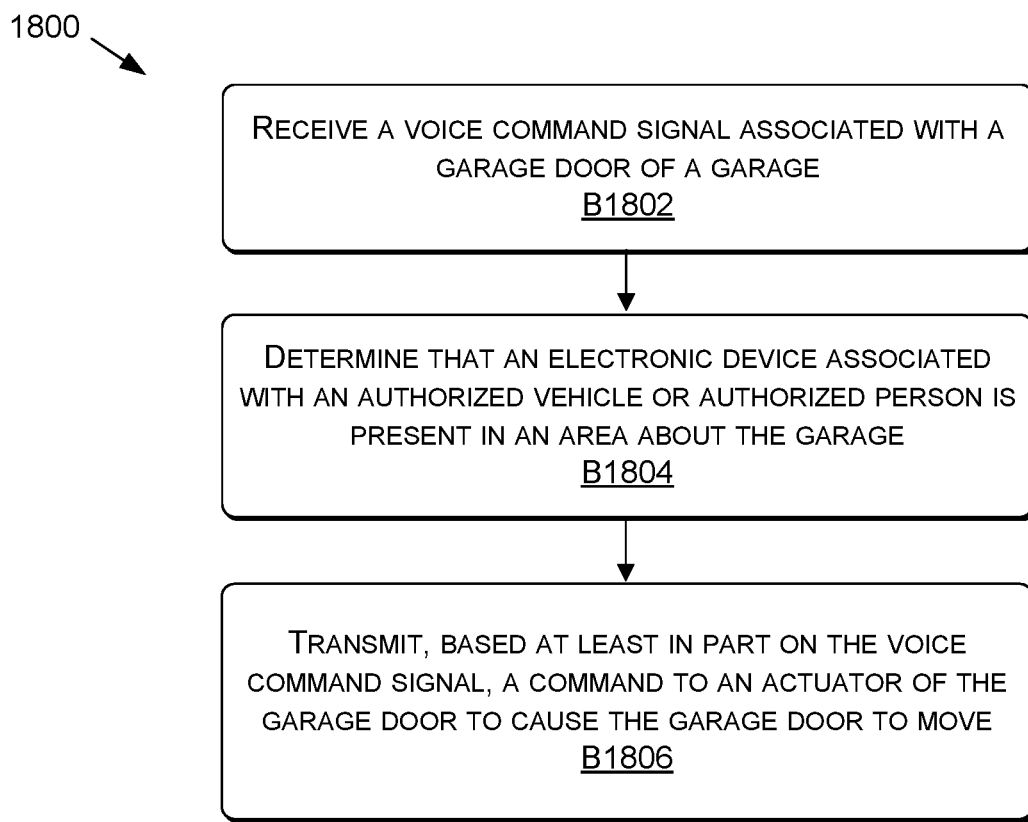
FIG. 18 is a flowchart illustrating an example process for controlling a garage door with a voice command, according to various aspects of the present disclosure.

FIG. 18 is a flowchart illustrating an example process 1800 for controlling a garage door with a voice command, according to various aspects of the present disclosure. At block B1802, a voice command signal associated with a garage door of a garage is received. The voice command signal is a signal generated when a voice command is spoken by a person and sensed by an audio sensor, such as a microphone. For example, the voice command signal may be received from the A/V device 210 using the microphone 328. The voice command signal may also be received from the smart hub device 202, the client device 214, 216, 230, or any other device. A person speaking the voice command may be in varying locations. For example, with reference to FIG. 1A, the person 110 is be in the living area 102 and speak a voice command that is sensed by an audio sensor of the smart-home hub device 108 and/or a client device of the person 110. In another example, the person 124 is in the garage 114 and may speak a voice command that is sensed by an audio sensor of the security camera 118, a client device of the person 124, and/or a client vehicle device of the vehicle 122. In another example, the person 112 is in the driveway 132 and may speak a voice command that is sensed by an audio sensor of the light camera 126, the video doorbell 104, a client device of the person 112, and/or a client vehicle device of the vehicle 130. In another example, a person in any one of the vehicles 122, 130, or 136 may speak a voice command that is sensed by an audio sensor of a client vehicle device of the respective vehicle.

At block B1804, an electronic device associated with an authorized vehicle or authorized person is determined to be present in an area about the garage. This may be used to ensure that a voice command is coming from a party authorized to control a garage door. Determining that the electronic device is present may be done in various ways. For example, the presence of the electronic device may be verified through electronic communication, such as short-range communications like NFC, BLE, Wi-Fi, or other short range electronic communication protocols. In another example, the presence of an electronic device may be determined from image data (e.g., that the device is visible in image data captured by a device in or near a garage).

In various embodiments, other methods may be used to determine that a voice command signal is valid and comes from a party authorized to control a garage door. For example, a voice command signal may be considered to be authorized if it comes from a known client device (e.g., the client device 214, 216, 230). In another example, a voice command signal may be considered authorized if it comes from a device that should be in a secure area (e.g., non-public, or not easily accessible), such as the smart-home hub device 108 in the living area 102, the security camera 118 in the garage 114, the security camera 142 in FIGS. 1B and 1C, the client vehicle device 230, etc. In these examples, the assumption is that if a person has access to the area in which these devices are located (e.g., inside a home, garage, vehicle), then the voice command is authorized. In various embodiments, a person may also be able to arm and/or disarm a security system using voice commands, and those voice commands may be determined to be authorized in similar ways. In various embodiments, the system may not make separate determinations that a voice command signal is authorized.

At block B1806, a command to an actuator of the garage door to cause the garage door to move is transmitted based at least in part on the voice command signal. For example, a user may cause the garage door to open, close, stop moving, start moving, etc. with a voice command (e.g., "close the garage door," "open the garage door," "stop," etc.). In various embodiments, voice commands may be used to control other aspects described herein, such as smart-home hub devices (e.g., the hub devices 202), the sensors 204, the automation devices 206, the virtual assistant (VA) device 208, the A/V devices 210, the client devices 214, 216, 230, or any other devices.

Figure 19:
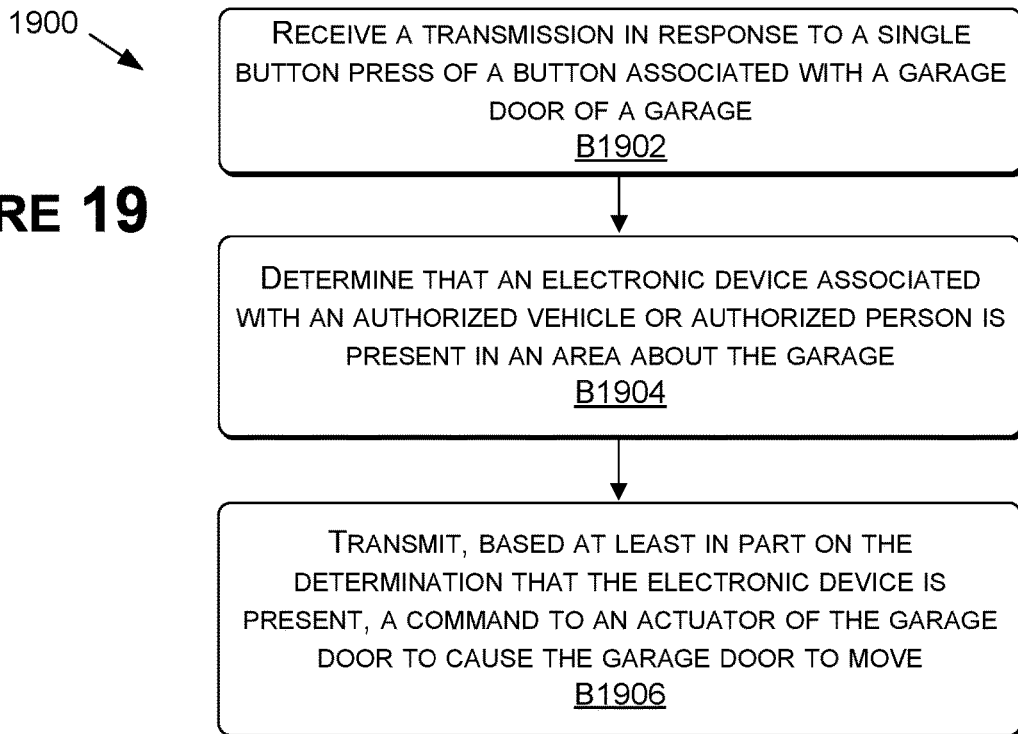
FIG. 19 is a flowchart illustrating an example process for authorizing a single button press to change a state of a garage door, according to various aspects of the present disclosure.

FIG. 19 is a flowchart illustrating an example process 1900 for authorizing a single button press to change a state of a garage door, according to various aspects of the present disclosure. At block B1902, a transmission is received in response to a single button press of a button associated with a garage door of a garage. For example, the button that is pressed may be a button of the keypad 156 of FIGS. 1D-1F. The button may also be mounted inside a garage. The button may also be integrated in the A/V device 210, the client device 214, 216, 230, the hub device 202, or any other device. The button may be a physical button, electronic sensor, a digital button displayed on a screen of an electronic device, or any other type of button that allows for a client to interface with.

At block B1904, an electronic device associated with an authorized vehicle or authorized person is determined to be present in an area about the garage. This determination is made to authorize that the button press has been made by a party authorized to actuate a garage door. The authorization may be, in various embodiments, similar to any of the embodiments discussed above with respect to block B1804. In some embodiments, the system may not authorize that a button press is authorized. However, authorizing the button press provides added security. For example, on some keypads (e.g., the keypad 156) associated with garage doors, a user must input a long alphanumeric code in order to authorize actuation of the garage door. In the process 1900, the user simply presses one button, and the system authorizes the button press through methods other than the long alphanumeric code. This saves the user time, and reduces the chance a user would not be able to access the garage because they forgot the long alphanumeric code. At block B1906, a command to an actuator of the garage door to cause the garage door to move is transmitted based at least in part on the determination that the electronic device is present. Accordingly, a process for securely actuating a garage door with a single button press is described herein.

In various embodiments, if a button press on a keypad or other device occurs that is not deemed to be authorized, an alert may be generated. The alert may be sent to the client device 214, 216, 230, smart-home hub device 202, the security monitoring service 228, or any other device.

Figure 20:
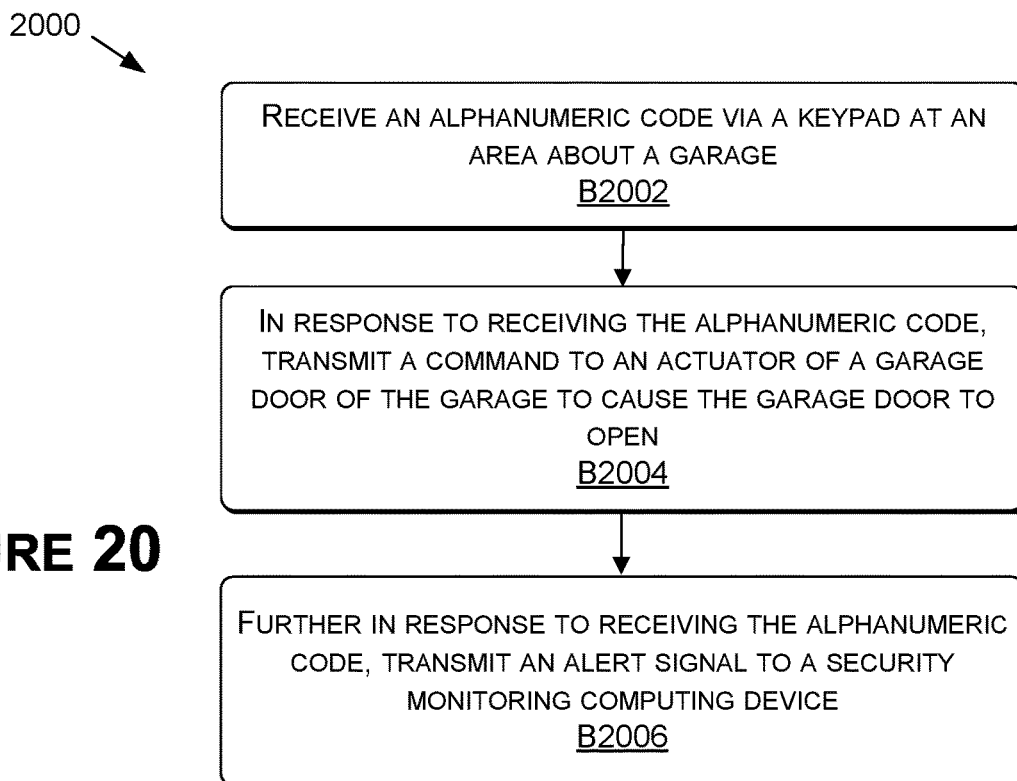
FIG. 20 is a flowchart illustrating an example process for using a distress code that opens a garage door and alerts a security monitoring service, according to various aspects of the present disclosure.

FIG. 20 is a flowchart illustrating an example process 2000 for using a distress code that opens a garage door and alerts a security monitoring service, according to various aspects of the present disclosure. At block B2002, an alphanumeric code is received via a keypad at an area about a garage. The keypad may be, for example, the keypad 156 as shown in FIGS. 1D-1F. In various embodiments, the alphanumeric code may be entered through a device other a keypad, such as the A/V device 210, the client device 214, 216, 230, the hub device 202, or any other device. In various embodiments, a different code may be used instead of an alphanumeric code. For example, voice recognition may be used to recognize an audio code. Biometrics (e.g., face recognition) may be used to recognize a particular biometric code.

At block B2004, a command to an actuator of a garage door of the garage to cause the garage door to open is transmitted in response to receiving the alphanumeric code. At block B2006, an alert signal to a security monitoring computing device is transmitted further in response to receiving the alphanumeric code. The security monitoring device may be part of the security monitoring service 228. In this way, a particular code entered by a user may open a garage door and send an alert to a security monitoring computing device. This allows a user to make an act such as opening a garage door and call for help using that act. If the user is under distress and/or duress, this may be helpful and keep the user safe until help arrives. In various embodiments, the code entered may be a distress code that does something other than open a garage door, such as control smart-home hub devices (e.g., the hub devices 202), the sensors 204, the automation devices 206, the virtual assistant (VA) device 208, the A/V devices 210, the client devices 214, 216, 230, or any other devices.

A code that is enterable through a keypad may cause any of the actions, signals, alerts, actuations, etc. as the scannable codes described herein. Similarly, a code for entering into a keypad may be generated similar to the scannable codes described herein. For example, the keypad codes may be used, generated, etc. in a similar way as described with respect to FIG. 14 herein.

Figure 21:
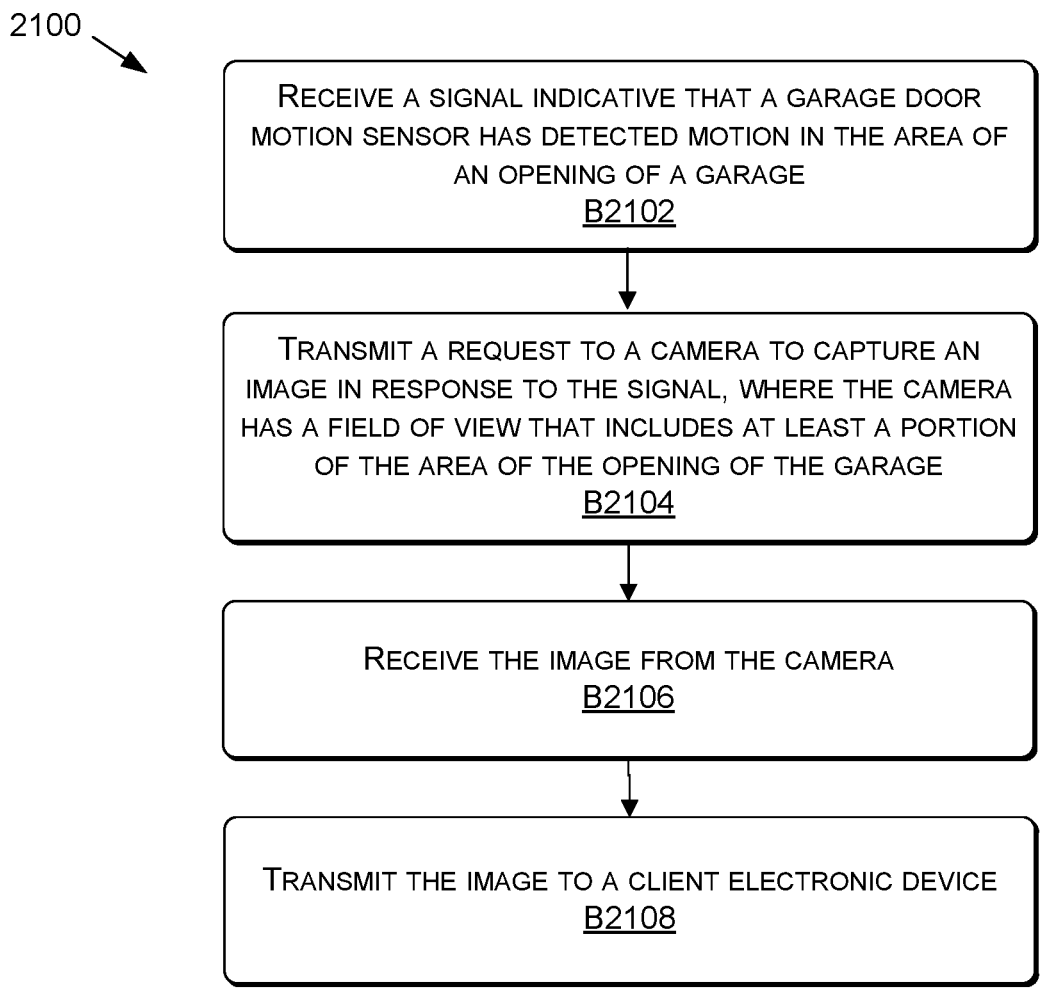
FIG. 21 is a flowchart illustrating an example process for capturing an image in an opening of a garage, according to various aspects of the present disclosure.

FIG. 21 is a flowchart illustrating an example process 2100 for capturing an image in an opening of a garage, according to various aspects of the present disclosure. At block B2102, a signal indicative that a garage door motion sensor has detected motion in the area of an opening of a garage is received. The garage door motion sensor may, for example, be the sensor 160 of FIGS. 1D and 1E. The garage door motion sensor may, for example, be the A/V device 210, or any other device capable of detecting motion.

At block B2104, a request to a camera to capture an image in response to the signal is transmitted, where the camera has a field of view that includes at least a portion of the area of the opening of the garage. At block B2106, the image from the camera received. At block B2108, the image is transmitted to a client electronic device. In this way, a device (or multiple devices) may detect motion in a garage and transmit an image of the garage at the time motion is detected to a device, such as the client device 214, 216, 230. In various embodiments, an image recognition and/or computer vision process may also analyze the image to determine what caused the movement (e.g., person, animal, vehicle, etc.). The system may also determine if a sensor is broken or malfunctioning (e.g., if nothing appears in the image that could have caused the motion). In various embodiments, movement in the garage may also trigger an alert or alarm to be sent or activated to a device in a house, such as the smart-home hub device 108 in the living area 102 of FIG. 1A.

Figure 22:
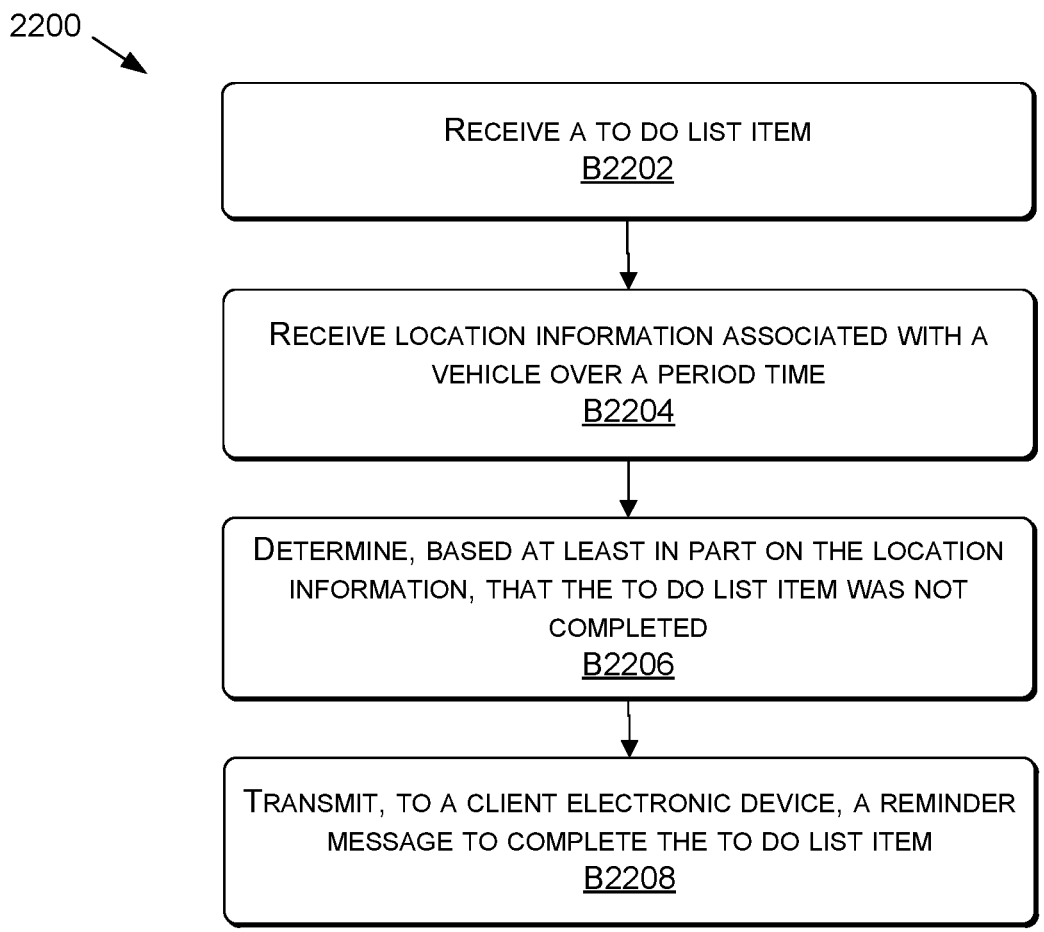
FIG. 22 is a flowchart illustrating an example process for transmitting a reminder message to complete a to-do list item based on vehicle location information, according to various aspects of the present disclosure.

FIG. 22 is a flowchart illustrating an example process 2200 for transmitting a reminder message to complete a to-do list item based on vehicle location information, according to various aspects of the present disclosure. At block B2202, a to-do list item is received. The to-do list item may be received from a smart-home hub device (e.g., the hub device 202), the automation devices 206, the virtual assistant (VA) device 208, the A/V devices 210, the client devices 214, 216, 230, or any other devices. A to-do list item may be manually or automatically generated. For example, a smart refrigerator may identify that a household is running out of (or is out of) milk. The smart refrigerator may then create a to-do list item that more milk should be bought. In another example, a user may manually input a to-do list item into an electronic device.

At block B2204, location information associated with a vehicle over a period of time is received. The period of time may be any period of time. For example, the period of time may be one hour, twelve hours, one day, two days, four days, one week, one month, etc. The period of time may be a time after a first time when a vehicle leaves a garage and a second time when the vehicle returns or is on its way to returning to the garage. The period of time may be from a first time when the to-do list item was received and a second time when a vehicle returns or is on its way to returning to the garage.

At block B2206, based at least in part on the location information, the to-do list item is determined to be not completed. For example, if the to-do list item was to buy milk, the location information may be used to determine if the vehicle ever stopped at a grocery or other location where milk could be purchased. If not, the system determines that the to-do list was not completed.

At block B2208, a reminder message to complete the to-do list item is transmitted to a client electronic device. For example, the reminder message may be sent to the client vehicle device 230 to be played over a speaker inside the vehicle as the vehicle is on its way home. The reminder message may also be a text message that is displayed in the vehicle. In this way, the driver will conveniently be reminded of the to-do list before they get home. The reminder message may also be sent as the vehicle arrives in a garage, after the vehicle arrives in a garage, or at any other time. In another example, the reminder message may be sent to the client device 214, 216, the hub device 202, or any other device in the form of an audio and/or text message.

Figure 23:
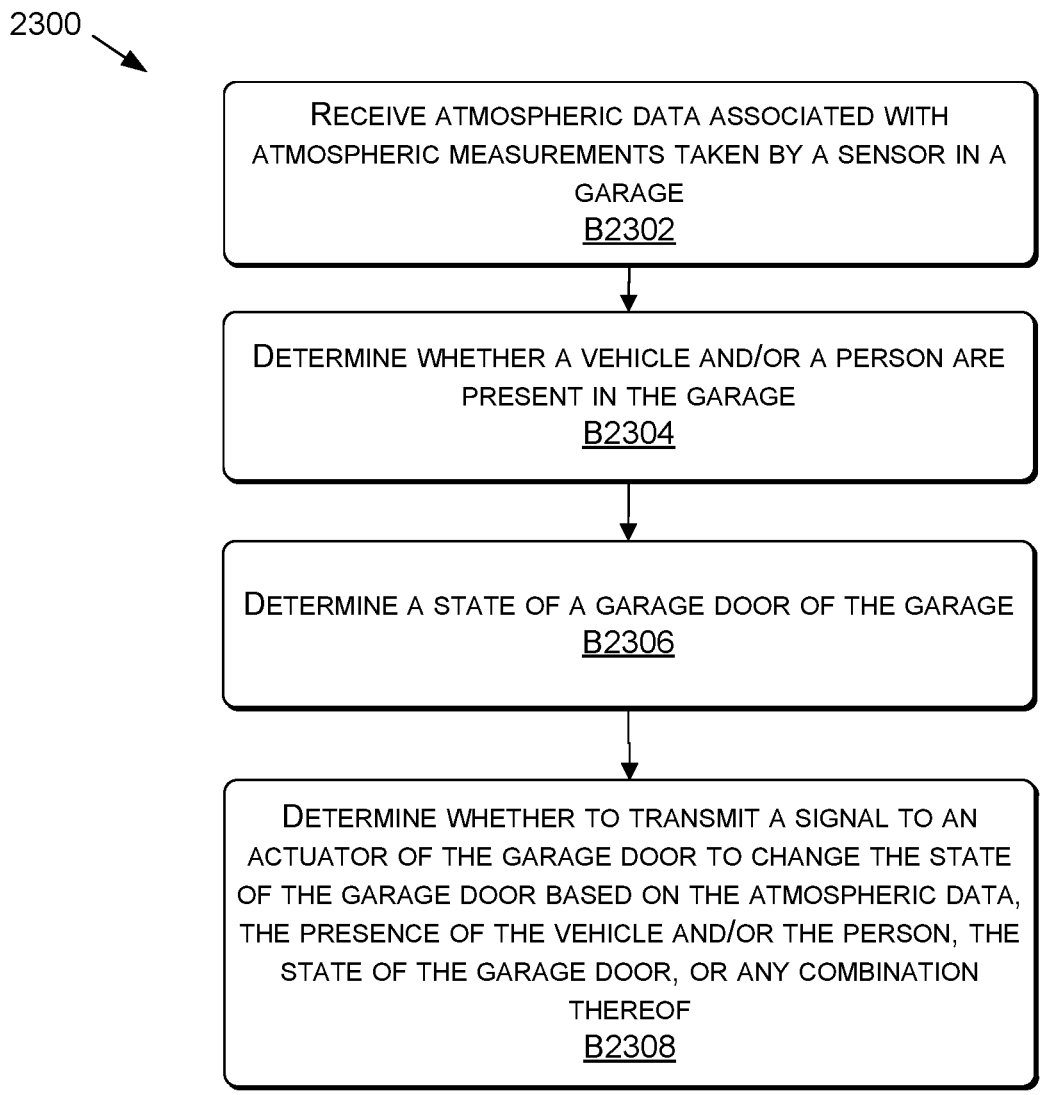
FIG. 23 is a flowchart illustrating an example process for determining whether to change a state of a garage door based on atmospheric data measured in a garage, according to various aspects of the present disclosure.

FIG. 23 is a flowchart illustrating an example process 2300 for determining whether to change a state of a garage door based on atmospheric data measured in a garage, according to various aspects of the present disclosure. In various embodiments, sensors other than atmospheric sensors may be used. For example, other environmental sensors, noise or sound sensors, light sensors, or any other type of sensor may be used as described herein. At block B2302, atmospheric data is received associated with atmospheric measurements taken by a sensor in a garage. For example, the sensor may be a carbon monoxide sensor, carbon dioxide sensor, thermometer, barometer, hygrometer, or any other type of sensor that senses an atmospheric condition may be used.

At block 2304, a determination of whether a vehicle and/or person are present in the garage is made. This determination may be based on image data, or may be determined according to any other embodiments described herein. At block B2306, a state of the garage is determined (e.g., whether the garage is open, closed, somewhere in between, moving up, moving down, etc.). At block B2308, whether to transmit a signal to an actuator of the garage door to change the state of the garage door is determined based on the atmospheric data, the presence of the vehicle and/or the person, the state of the garage door, or any combination thereof. Atmospheric sensors may be used to determine when to close or open a garage door. For example, an oxygen, carbon dioxide, carbon monoxide, or other type of air sensor may be used to sense air in the garage and determine when to open or close the garage door. Such sensors may also be incorporated into a vehicle, and the sensor values may be received via an OBD interface from the vehicle (e.g., the OBD 634). In another example, sensors in the garage may be configured to open or close the garage door to attempt to keep an atmospheric condition within the garage at, above, or below a predetermined level.

Accordingly, described herein are various embodiments for controlling a garage door that increase both the convenience of using a garage door and the security of the garage door. For example, a garage door of the garage 114 may open as the vehicle 130 approaches in the driveway 132. An A/V device such as a light camera 126 may capture image data of the vehicle 130, and then the system may determine aspects of the vehicle 130 from the image data (e.g., license plate number/state, make, model, color, etc.) and determine if those aspects match a known vehicle. If the aspects of the vehicle 130 match a known vehicle, the light camera 126 (or another device) may communicates with a client device (e.g., the client device 214, 216 (e.g., a smartphone) of a person in the vehicle 130, the client vehicle device 230 of the vehicle 130) to determine authorization information related to the vehicle. In various embodiments, the system may scan a code or short range wireless device instead of or in addition to communicating with a client device to determine authorization information. If the authorization is successful, the system may send an actuation command to an actuator of the garage door to cause it to open. The light camera 126 also captures image data of the vehicle 130 as it is leaving the garage 114. This image data is used to determine that the garage door may be safely closed. Once the vehicle is fully in view of the light camera 126, fully out of the driveway 132, fully out of the opening 116, or some other criteria, an actuation command may be sent to the actuator of the garage door to close the garage door.

Although several of the embodiments describe garage safety and convenience features with respect to a residential context, the various embodiments described herein may also be used in commercial, industrial, or other contexts. For example, the embodiments may be used in a larger residential garage, commercial garages (e.g., vehicle service establishments), industrial garages (e.g., manufacturing facilities, warehouses), etc. that have more than one door. A/V devices as described herein may be used in these contexts to improve safety, convenience, profitability, and other factors. For example, a car service establishment may use A/V devices to track vehicles moving in and out of the establishment. This may improve safety, as the A/V devices may be used to track movement within the establishment to prevent accidents. Alerts may be sent or broadcast to prevent a vehicle from hitting someone or something as described herein. Instructions on where to properly park within a commercial or industrial establishment may also be broadcast as described herein.

Image data captured of vehicles in a commercial or industrial setting may include license plate information. This information may be very useful to a commercial or industrial organization. For example, at a car service garage (e.g., oil change business), A/V devices may pick up license plate information, which may be used to identify and/or track a customer. If a customer has been to the business before, the vehicle and customer may be identified in the business's system with just the license plate information. This may cut down on data entry of the business's employees. License plate information may be used for industrial or other settings to track deliveries, vehicles in transit, etc. For example, if a semi-truck picks up goods at a manufacturing facility to deliver to a warehouse or other location, image data from an A/V device may provide automated, real time updates to a system of when a truck leaves and arrives at a location, how long a truck has to wait to be loaded and/or unloaded, how long it takes to load and/or unload the truck, etc. Similar performance metrics may be measured in a commercial setting (e.g., how long does it take to complete an oil change, how long is an average customer wait for an oil change, etc.).

Figure 24:
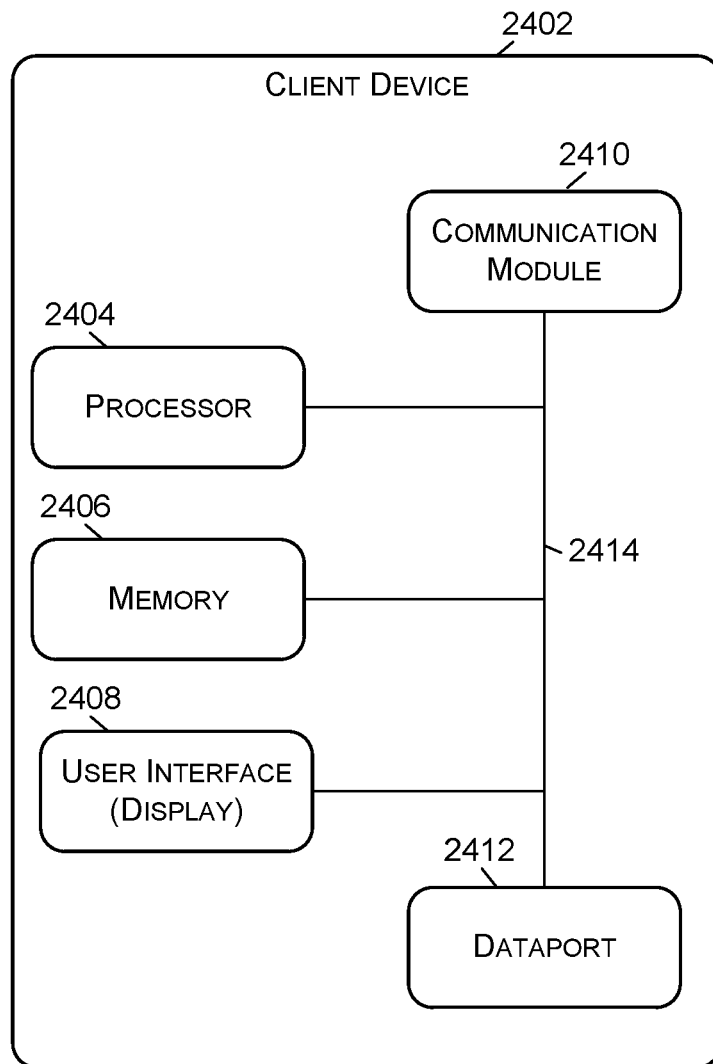
FIG. 24 is a functional block diagram of a client device on which the present embodiments may be implemented according to various aspects of the present disclosure.

FIG. 24 is a functional block diagram of a client device 2402 on which the present embodiments may be implemented according to various aspects of the present disclosure. The client device(s) 214, 216, 230 described with reference to FIG. 2 may include some or all of the components and/or functionality of the client device 2402. The client device 2402 may comprise, for example, a smartphone.

With reference to FIG. 24, the client device 2402 includes a processor 2404, a memory 2406, a user interface 2408, a communication module 2410, and a dataport 2412. These components are communicatively coupled together by an interconnect bus 2414. The processor 2404 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 2406 may include both operating memory, such as random-access memory (RAM), as well as data storage, such as read-only memory (ROM), hard drives, flash memory, or any other suitable memory/storage element. The memory 2406 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 2404 and the memory 2406 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2404 may be connected to the memory 2406 via the dataport 2412.

The user interface 2408 may include any user interface or presentation elements suitable for a smartphone and/or a portable computing device, such as a keypad, a display screen, a touchscreen, a microphone, and a speaker. The communication module 2410 is configured to handle communication links between the client device 2402 and other, external devices or receivers, and to route incoming/outgoing data appropriately. For example, inbound data from the dataport 2412 may be routed through the communication module 2410 before being directed to the processor 2404, and outbound data from the processor 2404 may be routed through the communication module 2410 before being directed to the dataport 2412. The communication module 2410 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2412 may be any type of connector used for physically interfacing with a smartphone and/or a portable computing device, such as a mini-USB port or an IPHONE®/IPOD® 30-pin connector or LIGHTNING® connector. In other embodiments, the dataport 2412 may include multiple communication channels for simultaneous communication with, for example, other processors, servers, and/or client terminals.

The memory 2406 may store instructions for communicating with other systems, such as a computer. The memory 2406 may store, for example, a program (e.g., computer program code) adapted to direct the processor 2404 in accordance with the present embodiments. The instructions also may include program elements, such as an operating system. While execution of sequences of instructions in the program causes the processor 2404 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 25:
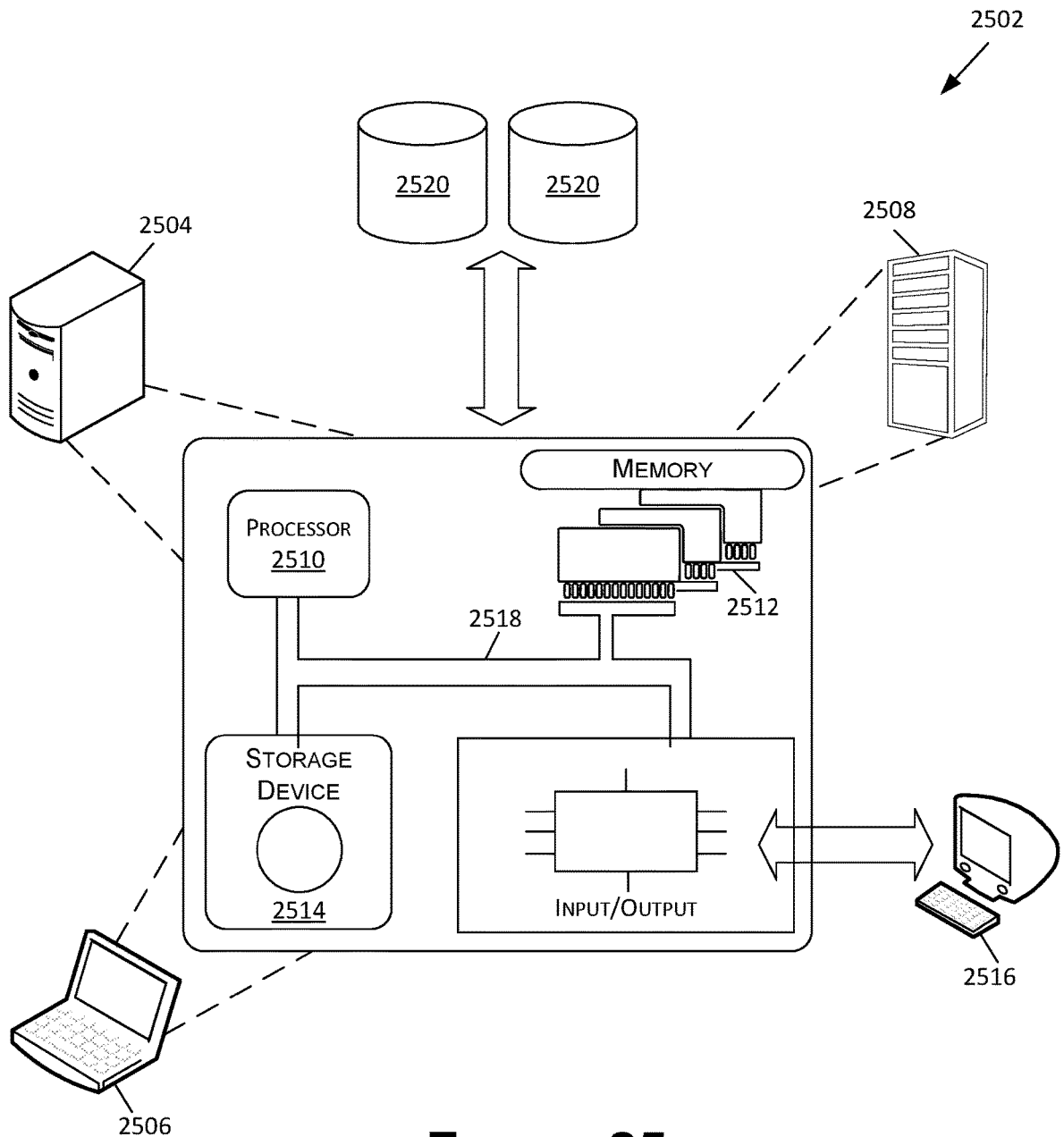
FIG. 25 is a functional block diagram of a general-purpose computing system on which the present embodiments may be implemented according to various aspects of present disclosure.

FIG. 25 is a functional block diagram of a general-purpose computing system on which the present embodiments may be implemented according to various aspects of the present disclosure. The computer system 2502 may be embodied in at least one of a personal computer (also referred to as a desktop computer) 2504, a portable computer (also referred to as a laptop or notebook computer) 2506, and/or a server 2508 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2502 may execute at least some of the operations described above. The computer system 2102 may include at least one processor 2510, memory 2512, at least one storage device 2514, and input/output (I/O) devices 2516. Some or all of the components 2510, 2512, 2514, 2516 may be interconnected via a system bus 2518. The processor 2510 may be single- or multi-threaded and may have one or more cores. The processor 2510 execute instructions, such as those stored in the memory 2512 and/or in the storage device 2514. Information may be received and output using one or more I/O devices 2516.

The memory 2512 may store information, and may be a computer-readable medium, such as volatile or non-volatile memory. The storage device(s) 2514 may provide storage for the system 2502 and, in some embodiments, may be a computer-readable medium. In various aspects, the storage device(s) 2514 may be a flash memory device, a hard disk device, an optical disk device, a tape device, or any other type of storage device.

The I/O devices 2516 may provide input/output operations for the system 2502. The I/O devices 2516 may include a keyboard, a pointing device, and/or a microphone. The I/O devices 2516 may further include a display unit for displaying graphical user interfaces, a speaker, and/or a printer. External data may be stored in one or more accessible external databases 2520.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed:

1. An electronic device comprising:
   a housing;
   a camera;
   one or more processors disposed at least partly within the housing; and
   one or more computer-readable media disposed at least partly within the housing, the one or more computer-readable media storing instructions that, when executed by the one or more processors, cause the electronic device to perform operations comprising:
      maintaining information about at least one client device to be granted access to a physical area;
      receiving location data associated with the at least one client device, wherein the location data comprises a position and a direction of movement of the client device;
      determining, based on image data obtained from the camera, that a user vehicle is approaching the physical area;
      determining, based on the location data, that the user vehicle is authorized to be granted access to the physical area; and
      transmitting an activation command to an access device.

2. The electronic device of claim 1, wherein the location data comprises global positioning systems (GPS) data obtained from a GPS device included in the client device.

3. The electronic device of claim 1, wherein the activation command causes the access device to grant the user vehicle access to the physical area.

4. The electronic device of claim 3, wherein the access device comprises a garage door actuator and the physical area comprises a garage interior.

5. The electronic device of claim 1, wherein the information about at least one client device includes information about one or more conditions under which the client device is to be granted access to a physical area, and wherein the operations further comprise:
      determining, based on the determining that the user vehicle is approaching the physical area, whether the one or more conditions have been met; and
      transmitting the activation command only if the one or more conditions have been met.

6. The electronic device of claim 5, wherein the client device is determined to be authorized to access the physical area if a current time is within a predetermined period of time.

7. The electronic device of claim 5, wherein the client device is associated with an access number, and wherein the client device is determined to be authorized to access the physical area if a number of times that the client device has previously accessed the physical area is less than the access number.

8. The electronic device of claim 1, wherein the operations further comprise:
      determining, based on second location data associated with the client device, that the client device is moving away from the physical area; and
      transmitting a second activation command to the access device.

9. The electronic device of claim 8, wherein the second activation command causes the access device to secure the physical area.

10. A method comprising:
    maintaining, at an electronic device, information about at least one client device to be granted access to a physical area;
    receiving, by the electronic device, location data associated with the at least one client device, the location data including a position of the client device;
    determining, by the electronic device, that a user vehicle is approaching the physical area;
    determining, based on determining that the user vehicle is approaching the physical area and the location data, that the user vehicle should be granted access to the physical area; and
    transmitting, by the electronic device based on the determining that the user vehicle should be granted access to the physical area, an activation command to an access device.

11. The method of claim 10, wherein the activation command causes the access device to grant the user vehicle access to the physical area.

12. The method of claim 10, further comprising:
    determining, by the electronic device based on second location data, that the client device is moving away from the physical area; and
    transmitting, by the electronic device based on the determining that the client device is moving away from the physical area, a second activation command to an access device.

13. The method of claim 12, wherein the second activation command causes the access device to secure the physical area.

14. The method of claim 10, wherein the determining that the user vehicle should be granted access to the physical area comprises determining that a distance between the client device and the electronic device is less than a predetermined threshold distance.

15. The method of claim 10, wherein the client device is determined to be associated with the user vehicle.

16. A system comprising:
    an access device configured to manage access to a physical area; and
    an electronic device comprising one or more processors and one or more computer-readable media storing instructions that, when executed by the one or more processors, cause the electronic device to:
       receive location data associated with a user device;

determine, based on the location data, that the user device is approaching the physical area;

determining that a vehicle is approaching the physical area; and transmitting, based on the determining that the user device is approaching the physical area and the vehicle approaching the physical area, an activation command to the access device to cause it to grant access to the physical area.

17. The system of claim 16, wherein the user device is determined to be associated with the vehicle.

18. The system of claim 16, wherein the electronic device further comprises one or more cameras, and wherein the instructions further cause the electronic device to:

obtain image data from the one or more cameras;

identify one or more objects within the image data, wherein the vehicle approaching the physical area is determined based on the one or more objects within the image data.

19. The system of claim 18, wherein the one or more objects is determined to include the vehicle upon detecting a license plate number associated with the vehicle within the image data.

20. The system of claim 16, wherein determining that the vehicle is approaching the physical area comprises determining that the vehicle is moving in a direction of the physical area and a distance between the vehicle and the physical area is less than a threshold distance.

* * * * *